(12) United States Patent
Zhang et al.

(10) Patent No.: US 11,134,244 B2
(45) Date of Patent: Sep. 28, 2021

(54) ORDER OF ROUNDING AND PRUNING IN LAMVR

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/071,139

(22) Filed: Oct. 15, 2020

(65) Prior Publication Data
US 2021/0029374 A1  Jan. 28, 2021

Related U.S. Application Data

(63) Continuation of application No. PCT/IB2019/055621, filed on Jul. 2, 2019.

(30) Foreign Application Priority Data

Jul. 2, 2018 (WO) .............. PCT/CN2018/093987

(51) Int. Cl.
H04N 19/52 (2014.01)
H04N 19/105 (2014.01)
(Continued)

(52) U.S. Cl.
CPC .............. *H04N 19/105* (2014.11); *G06F 1/03* (2013.01); *H04N 19/137* (2014.11);
(Continued)

(58) Field of Classification Search
CPC ....... H04N 19/139; H04N 19/52; H04N 19/55
See application file for complete search history.

(56) References Cited

U.S. PATENT DOCUMENTS 9,350,970 B2  5/2016  Kang et al.
9,762,900 B2 *  9/2017  Park ...................... H04N 19/11
(Continued)

FOREIGN PATENT DOCUMENTS

CN    1898715 A    1/2007
CN    1925614 A    3/2007
(Continued)

OTHER PUBLICATIONS

Reducing coding cost of merge index by dynamic merge reallocation; 2012. (Year: 2012).*
(Continued)

*Primary Examiner* — Luis Perez-Fuentes
(74) *Attorney, Agent, or Firm* — Perkins Coie LLP

(57) ABSTRACT

Devices, systems and methods for encoding and decoding digital video historical information such as tables containing coding candidates are described. In a representative aspect, a method for video processing includes maintaining an Advanced Motion Vector Prediction (AMVP) candidate list for a conversion between a video block of a video and a bitstream representation of the video with a motion vector precision of M-Pel or sub-pel selected from multiple available motion vector precisions, M being a positive integer. The method also includes comparing an AMVP candidate associated with the video block with existing AMVP candidates in the AMVP candidate list, adding the AMVP candidate to the AMVP candidate list upon determining that the AMVP candidate is different than the existing candidates, and performing the conversion based on the AMVP candidate list.

14 Claims, 45 Drawing Sheets

(51) Int. Cl.
*H04N 19/159* (2014.01)
*H04N 19/176* (2014.01)
*H04N 19/70* (2014.01)
*H04N 19/184* (2014.01)
*H04N 19/186* (2014.01)
*H04N 19/513* (2014.01)
*H04N 19/96* (2014.01)
*H04N 19/137* (2014.01)
*G06F 1/03* (2006.01)
*H04N 19/139* (2014.01)
*H04N 19/11* (2014.01)
*H04N 19/117* (2014.01)

(52) U.S. Cl.
CPC ......... *H04N 19/139* (2014.11); *H04N 19/159* (2014.11); *H04N 19/176* (2014.11); *H04N 19/184* (2014.11); *H04N 19/186* (2014.11); *H04N 19/513* (2014.11); *H04N 19/52* (2014.11); *H04N 19/70* (2014.11); *H04N 19/96* (2014.11); *H04N 19/11* (2014.11); *H04N 19/117* (2014.11)

(56) References Cited

U.S. PATENT DOCUMENTS

| | | |
|---|---|---|
| 9,872,016 B2 | 1/2018 | Chuang et al. |
| 9,918,102 B1 | 3/2018 | Kohn et al. |
| 10,021,414 B2 | 7/2018 | Seregin et al. |
| 10,200,709 B2 | 2/2019 | Chen et al. |
| 10,362,330 B1 | 7/2019 | Li et al. |
| 10,440,378 B1 | 10/2019 | Xu et al. |
| 10,448,010 B2 | 10/2019 | Chen et al. |
| 10,491,902 B1 | 11/2019 | Xu et al. |
| 10,560,718 B2 | 2/2020 | Lee et al. |
| 10,778,997 B2* | 9/2020 | Zhang .................... H04N 19/52 |
| 2007/0025444 A1 | 2/2007 | Okada et al. |
| 2009/0180538 A1 | 7/2009 | Visharam et al. |
| 2011/0109964 A1 | 5/2011 | Kim et al. |
| 2011/0194608 A1 | 8/2011 | Rusert et al. |
| 2011/0194609 A1 | 8/2011 | Rusert et al. |
| 2012/0082229 A1 | 4/2012 | Su et al. |
| 2012/0134415 A1 | 5/2012 | Lin et al. |
| 2012/0195368 A1 | 8/2012 | Chien et al. |
| 2012/0257678 A1 | 10/2012 | Zhou et al. |
| 2012/0263231 A1 | 10/2012 | Zhou |
| 2012/0300846 A1 | 11/2012 | Sugio et al. |
| 2012/0307903 A1 | 12/2012 | Sugio et al. |
| 2012/0320984 A1 | 12/2012 | Zhou |
| 2013/0064301 A1 | 3/2013 | Guo et al. |
| 2013/0070855 A1 | 3/2013 | Zheng et al. |
| 2013/0094580 A1 | 4/2013 | Zhou et al. |
| 2013/0114717 A1 | 5/2013 | Zheng et al. |
| 2013/0114723 A1 | 5/2013 | Bici et al. |
| 2013/0128982 A1 | 5/2013 | Kim et al. |
| 2013/0163668 A1 | 6/2013 | Chen et al. |
| 2013/0188715 A1 | 7/2013 | Seregin et al. |
| 2013/0208799 A1* | 8/2013 | Srinivasamurthy .. H04N 19/119 375/240.16 |
| 2013/0243093 A1 | 9/2013 | Chen et al. |
| 2013/0265388 A1 | 10/2013 | Zhang et al. |
| 2013/0272377 A1 | 10/2013 | Karczewicz et al. |
| 2013/0272410 A1 | 10/2013 | Seregin et al. |
| 2013/0272412 A1 | 10/2013 | Seregin et al. |
| 2013/0272413 A1 | 10/2013 | Seregin et al. |
| 2013/0336406 A1 | 12/2013 | Zhang et al. |
| 2014/0078251 A1 | 3/2014 | Kang et al. |
| 2014/0086327 A1 | 3/2014 | Ugur et al. |
| 2014/0105302 A1 | 4/2014 | Takehara et al. |
| 2014/0126629 A1 | 5/2014 | Park et al. |
| 2014/0161186 A1 | 6/2014 | Zhang et al. |
| 2014/0185685 A1 | 7/2014 | Asaka et al. |
| 2014/0219356 A1 | 8/2014 | Nishitani et al. |
| 2014/0241434 A1 | 8/2014 | Lin et al. |
| 2014/0286427 A1 | 9/2014 | Fukushima et al. |
| 2014/0334557 A1 | 11/2014 | Schierl et al. |
| 2014/0341289 A1 | 11/2014 | Schwarz et al. |
| 2014/0355685 A1 | 12/2014 | Chen et al. |
| 2014/0376614 A1 | 12/2014 | Fukushima et al. |
| 2014/0376626 A1 | 12/2014 | Lee |
| 2014/0376638 A1 | 12/2014 | Nakamura et al. |
| 2015/0110197 A1 | 4/2015 | Kim et al. |
| 2015/0189313 A1 | 7/2015 | Shimada et al. |
| 2015/0195558 A1 | 7/2015 | Kim |
| 2015/0281733 A1 | 10/2015 | Fu et al. |
| 2015/0312588 A1 | 10/2015 | Yamamoto et al. |
| 2015/0341635 A1 | 11/2015 | Seregin et al. |
| 2016/0044332 A1 | 2/2016 | Maaninen |
| 2016/0050430 A1 | 2/2016 | Xiu et al. |
| 2016/0227214 A1 | 8/2016 | Rapaka et al. |
| 2016/0241867 A1 | 8/2016 | Sugio et al. |
| 2016/0277761 A1 | 9/2016 | Li et al. |
| 2016/0295240 A1 | 10/2016 | Kim et al. |
| 2016/0330471 A1 | 11/2016 | Zhu et al. |
| 2016/0337661 A1 | 11/2016 | Pang et al. |
| 2016/0366416 A1 | 12/2016 | Liu et al. |
| 2017/0013269 A1 | 1/2017 | Kim et al. |
| 2017/0054996 A1 | 2/2017 | Xu et al. |
| 2017/0078699 A1 | 3/2017 | Park et al. |
| 2017/0099495 A1 | 4/2017 | Rapaka et al. |
| 2017/0163999 A1 | 6/2017 | Li et al. |
| 2017/0188045 A1 | 6/2017 | Zhou et al. |
| 2017/0214932 A1 | 7/2017 | Huang et al. |
| 2017/0223352 A1 | 8/2017 | Kim et al. |
| 2017/0238011 A1 | 8/2017 | Pettersson et al. |
| 2017/0280159 A1 | 9/2017 | Xu et al. |
| 2017/0289570 A1 | 10/2017 | Zhou et al. |
| 2017/0332084 A1 | 11/2017 | Seregin et al. |
| 2017/0332095 A1 | 11/2017 | Zou et al. |
| 2017/0332099 A1* | 11/2017 | Lee ....................... H04N 19/122 |
| 2018/0041769 A1 | 2/2018 | Chuang et al. |
| 2018/0070100 A1* | 3/2018 | Chen .................... H04N 19/139 |
| 2018/0098063 A1 | 4/2018 | Chen et al. |
| 2018/0184085 A1 | 6/2018 | Yang et al. |
| 2018/0192069 A1 | 7/2018 | Chen et al. |
| 2018/0192071 A1 | 7/2018 | Chuang et al. |
| 2018/0262753 A1 | 9/2018 | Sugio et al. |
| 2018/0278949 A1 | 9/2018 | Karczewicz et al. |
| 2018/0310018 A1 | 10/2018 | Guo et al. |
| 2018/0332284 A1* | 11/2018 | Liu ....................... H04N 19/182 |
| 2018/0332312 A1 | 11/2018 | Liu et al. |
| 2018/0343467 A1 | 11/2018 | Lin |
| 2018/0352223 A1 | 12/2018 | Chen et al. |
| 2018/0359483 A1* | 12/2018 | Chen ..................... H04N 19/44 |
| 2018/0376149 A1 | 12/2018 | Zhang et al. |
| 2018/0376160 A1 | 12/2018 | Zhang et al. |
| 2018/0376164 A1 | 12/2018 | Zhang et al. |
| 2019/0098329 A1 | 3/2019 | Han et al. |
| 2019/0116374 A1 | 4/2019 | Zhang et al. |
| 2019/0116381 A1* | 4/2019 | Lee ....................... H04N 19/105 |
| 2019/0141334 A1 | 5/2019 | Lim et al. |
| 2019/0158827 A1 | 5/2019 | Sim et al. |
| 2019/0158866 A1 | 5/2019 | Kim |
| 2019/0200040 A1 | 6/2019 | Lim et al. |
| 2019/0215529 A1 | 7/2019 | Laroche |
| 2019/0230362 A1 | 7/2019 | Chen et al. |
| 2019/0230376 A1 | 7/2019 | Hu et al. |
| 2019/0297325 A1 | 9/2019 | Lim et al. |
| 2019/0297343 A1 | 9/2019 | Seo et al. |
| 2019/0320180 A1 | 10/2019 | Yu et al. |
| 2020/0014948 A1* | 1/2020 | Lai ....................... H04N 19/139 |
| 2020/0029088 A1 | 1/2020 | Xu et al. |
| 2020/0036997 A1 | 1/2020 | Li et al. |
| 2020/0077116 A1* | 3/2020 | Lee ....................... H04N 19/51 |
| 2020/0099951 A1 | 3/2020 | Hung et al. |
| 2020/0112715 A1 | 4/2020 | Hung et al. |
| 2020/0112741 A1 | 4/2020 | Han et al. |
| 2020/0120334 A1 | 4/2020 | Xu et al. |
| 2020/0128238 A1 | 4/2020 | Lee et al. |
| 2020/0169726 A1 | 5/2020 | Kim et al. |
| 2020/0169745 A1 | 5/2020 | Han et al. |
| 2020/0186793 A1 | 6/2020 | Racape et al. |
| 2020/0195959 A1 | 6/2020 | Zhang et al. |

(56) References Cited

U.S. PATENT DOCUMENTS

| | | | |
|---|---|---|---|
| 2020/0195960 | A1 | 6/2020 | Zhang et al. |
| 2020/0204820 | A1* | 6/2020 | Zhang ............... H04N 19/52 |
| 2020/0228825 | A1 | 7/2020 | Lim et al. |
| 2020/0244954 | A1* | 7/2020 | Heo ............... H04N 19/11 |
| 2020/0267408 | A1 | 8/2020 | Lee et al. |
| 2020/0280735 | A1 | 9/2020 | Lim et al. |
| 2020/0288150 | A1 | 9/2020 | Jun et al. |
| 2020/0296414 | A1 | 9/2020 | Park et al. |
| 2020/0322628 | A1 | 10/2020 | Lee et al. |
| 2020/0366923 | A1 | 11/2020 | Zhang et al. |
| 2020/0374542 | A1 | 11/2020 | Zhang et al. |
| 2020/0382770 | A1 | 12/2020 | Zhang et al. |
| 2020/0396446 | A1 | 12/2020 | Zhang et al. |
| 2020/0396447 | A1 | 12/2020 | Zhang et al. |
| 2020/0396466 | A1 | 12/2020 | Zhang et al. |
| 2020/0404285 | A1 | 12/2020 | Zhang et al. |
| 2020/0404316 | A1 | 12/2020 | Zhang et al. |
| 2020/0404320 | A1 | 12/2020 | Zhang et al. |
| 2020/0413038 | A1 | 12/2020 | Zhang et al. |
| 2020/0413044 | A1 | 12/2020 | Zhang et al. |
| 2020/0413045 | A1 | 12/2020 | Zhang et al. |
| 2021/0006819 | A1 | 1/2021 | Zhang et al. |
| 2021/0006823 | A1 | 1/2021 | Zhang et al. |
| 2021/0014520 | A1 | 1/2021 | Zhang et al. |
| 2021/0014525 | A1 | 1/2021 | Zhang et al. |
| 2021/0029351 | A1 | 1/2021 | Zhang et al. |

FOREIGN PATENT DOCUMENTS

| | | |
|---|---|---|
| CN | 101193302 A | 6/2008 |
| CN | 101933328 A | 12/2010 |
| CN | 102474619 A | 5/2012 |
| CN | 102860006 A | 1/2013 |
| CN | 102907098 A | 1/2013 |
| CN | 103004204 A | 3/2013 |
| CN | 103096071 A | 5/2013 |
| CN | 103370937 A | 10/2013 |
| CN | 103444182 A | 12/2013 |
| CN | 103518374 A | 1/2014 |
| CN | 103609123 A | 2/2014 |
| CN | 103828364 A | 5/2014 |
| CN | 103891281 A | 6/2014 |
| CN | 104041042 A | 9/2014 |
| CN | 104054350 A | 9/2014 |
| CN | 104079944 A | 10/2014 |
| CN | 104126302 A | 10/2014 |
| CN | 104247434 A | 12/2014 |
| CN | 104350749 A | 2/2015 |
| CN | 104365102 A | 2/2015 |
| CN | 104539950 A | 4/2015 |
| CN | 104584549 A | 4/2015 |
| CN | 104756499 A | 7/2015 |
| CN | 104915966 A | 9/2015 |
| CN | 105245900 | 1/2016 |
| CN | 105556971 A | 5/2016 |
| CN | 105681807 A | 6/2016 |
| CN | 105917650 A | 8/2016 |
| CN | 106464864 A | 2/2017 |
| CN | 106716997 A | 5/2017 |
| CN | 106851046 A | 6/2017 |
| CN | 106851267 A | 6/2017 |
| CN | 106851269 A | 6/2017 |
| CN | 107071458 A | 8/2017 |
| CN | 107079162 A | 8/2017 |
| CN | 107087165 A | 8/2017 |
| CN | 107113424 A | 8/2017 |
| CN | 107113442 A | 8/2017 |
| CN | 107113446 A | 8/2017 |
| CN | 107197301 A | 9/2017 |
| CN | 107211156 A | 9/2017 |
| CN | 107295348 A | 10/2017 |
| CN | 107347159 A | 11/2017 |
| CN | 107690809 A | 2/2018 |
| CN | 107690810 A | 2/2018 |
| CN | 107710764 A | 2/2018 |
| CN | 107959853 A | 4/2018 |
| CN | 108134934 A | 6/2018 |
| CN | 108200437 A | 6/2018 |
| CN | 108235009 A | 6/2018 |
| CN | 109076218 A | 12/2018 |
| CN | 109089119 A | 12/2018 |
| EP | 2532160 A1 | 12/2012 |
| EP | 2668784 A1 | 12/2013 |
| EP | 2983365 A1 | 2/2016 |
| GB | 201111867 | 8/2011 |
| GB | 2488815 A | 9/2012 |
| GB | 2492778 A | 1/2013 |
| KR | 20170058871 A | 5/2017 |
| TW | 201444349 A | 11/2017 |
| WO | 2011095260 A1 | 8/2011 |
| WO | 2012074344 A2 | 6/2012 |
| WO | 2015006920 A1 | 1/2015 |
| WO | 2018012886 A1 | 1/2015 |
| WO | 2015042432 A1 | 3/2015 |
| WO | 2015052273 A1 | 4/2015 |
| WO | 2016008409 A1 | 1/2016 |
| WO | 2016054979 A1 | 4/2016 |
| WO | 2016091161 A1 | 6/2016 |
| WO | 2017043734 A1 | 3/2017 |
| WO | 2017197126 A1 | 11/2017 |
| WO | 2018048904 A1 | 3/2018 |
| WO | 2018058526 A1 | 4/2018 |
| WO | 2018237299 A1 | 12/2018 |
| WO | 2019223746 A1 | 11/2019 |

OTHER PUBLICATIONS

Modification of merge candidate derivation ATMVP simplification & merge pruning; 2016. (Year: 2016).*

International Search Report and Written Opinion from International Patent Application No. PCT/CN2020/072391 dated Mar. 6, 2020 (11 pages).

International Search Report and Written Opinion from International Patent Application No. PCT/IB2019/055554 dated Aug. 20, 2019 (16 pages).

International Search Report and Written Opinion from International Patent Application No. PCT/IB2019/055556 dated Aug. 29, 2019 (15 pages).

International Search Report and Written Opinion from International Patent Application No. PCT/IB2019/055581 dated Aug. 29, 2019 (25 pages).

International Search Report and Written Opinion from International Patent Application No. PCT/IB2019/055586 dated Sep. 16, 2019 (16 pages).

International Search Report and Written Opinion from International Patent Application No. PCT/IB2019/055587 dated Sep. 16, 2019 (23 pages).

International Search Report and Written Opinion from International Patent Application No. PCT/IB2019/055588 dated Sep. 16, 2019 (21 pages).

International Search Report and Written Opinion from International Patent Application No. PCT/IB2019/055591 dated Jan. 10, 2019 (16 pages).

International Search Report and Written Opinion from International Patent Application No. PCT/IB2019/055593 dated Sep. 16, 2019 (23 pages).

International Search Report and Written Opinion from International Patent Application No. PCT/IB2019/055595 dated Sep. 16, 2019 (25 pages).

International Search Report and Written Opinion from International Patent Application No. PCT/IB2019/055619 dated Sep. 16, 2019 (26 pages).

International Search Report and Written Opinion from International Patent Application No. PCT/IB2019/055620 dated Sep. 25, 2019 (18 pages).

International Search Report and Written Opinion from International Patent Application No. PCT/IB2019/055621 dated Sep. 30, 2019 (18 pages).

(56) References Cited

OTHER PUBLICATIONS

International Search Report and Written Opinion from International Patent Application No. PCT/IB2019/055622 dated Sep. 16, 2019 (13 pages).
International Search Report and Written Opinion from International Patent Application No. PCT/IB2019/055623 dated Sep. 26, 2019 (17 pages).
International Search Report and Written Opinion from International Patent Application No. PCT/IB2019/055624 dated Sep. 26, 2019 (17 pages).
International Search Report and Written Opinion from International Patent Application No. PCT/IB2019/055625 dated Sep. 26, 2019 (19 pages).
International Search Report and Written Opinion from International Patent Application No. PCT/IB2019/055626 dated Sep. 16, 2019 (17 pages).
International Search Report and Written Opinion from International Patent Application No. PCT/IB2019/057690 dated Dec. 16, 2019 (17 pages).
International Search Report and Written Opinion from International Patent Application No. PCT/IB2019/057692 dated Jan. 7, 2020 (16 pages).
International Search Report and Written Opinion from International Patent Application No. PCT/IB2019/055571 dated Sep. 16, 2019 (20 pages).
International Search Report and Written Opinion from International Patent Application No. PCT/CN2020/080597 dated Jun. 30, 2020(11 pages).
Non-Final Office Action from U.S. Appl. No. 16/803,706 dated Apr. 17, 2020.
Non-Final Office Action from U.S. Appl. No. 16/796,693 dated Apr. 28, 2020.
Non-Final Office Action from U.S. Appl. No. 16/796,708 dated May 29, 2020.
Non-Final Office Action from U.S. Appl. No. 16/993,598 dated Oct. 14, 2020.
Final Office Action from U.S. Appl. No. 16/796,693 dated Oct. 27, 2020.
Non-Final Office Action from U.S. Appl. No. 17/019,675 dated Nov. 10, 2020.
Non-Final Office Action from U.S. Appl. No. 17/005,634 dated Nov. 13, 2020.
Non-Final Office Action from U.S. Appl. No. 17/019,753 dated Nov. 17, 2020.
Non-Final Office Action from U.S. Appl. No. 17/031,322 dated Nov. 17, 2020.
Non-Final Office Action from U.S. Appl. No. 17/011,068 dated Nov. 19, 2020.
Non-Final Office Action from U.S. Appl. No. 17/018,200 dated Nov. 20, 2020.
Non-Final Office Action from U.S. Appl. No. 16/998,296 dated Nov. 24, 2020.
Non-Final Office Action from U.S. Appl. No. 16/998,258 dated Nov. 25, 2020.
Non-Final Office Action from U.S. Appl. No. 17/005,702 dated Nov. 27, 2020.
Non-Final Office Action from U.S. Appl. No. 17/005,574 dated Dec. 1, 2020.
Non-Final Office Action from U.S. Appl. No. 17/011,058 dated Dec. 15, 2020.
Final Office Action from U.S. Appl. No. 17/019,675 dated Mar. 19, 2021.
Notice of Allowance from U.S. Appl. No. 16/998,296 dated Mar. 23, 2021.
Notice of Allowance from U.S. Appl. No. 16/998,258 dated Mar. 24, 2021.
Final Office Action from U.S. Appl. No. 17/019,753 dated Mar. 8, 2021.
Non-Final Office Action from U.S. Appl. No. 16/993,561 dated Dec. 24, 2020.
Non-Final Office Action from U.S. Appl. No. 17/031,404 dated Dec. 24, 2020.
Notice of Allowance from U.S. Appl. No. 16/796,693 dated Feb. 10, 2021.
Notice of Allowance from U.S. Appl. No. 17/011,068 dated Mar. 1, 2021.
Notice of Allowance from U.S. Appl. No. 17/018,200 dated Mar. 1, 2021.
Bandyopadhyay, Saurav, "Cross-Check of JVET-M0436:AHG2: Regarding HMVO Table Size," Joint Video Experts Team (JVET) of ITU-T SG 16 WP 3 and ISO/IEC JTC 1/SC 29/WG 11, 13th Meeting: Marrakech, MA Jan. 9-18, 2019, document JVET-M0562, Jan. 2019.
Hordes et al. "Description of SDR, HDR and 360° video coding technology proposal by Qualcomm and Technicolor—medium complexity version", JVET Meeting, JVET-J0022 (Apr. 2018).
Bross et al. "Versatile Video Coding (Draft 2)", JVET 11th Meeting, JVET-K1001-v5 (Jul. 2018).
Chen et al. "Description of SDR, HDR and 360° video coding technology proposal by Qualcomm and Technicolor—low and high complexity versions", Joint Video Exploration Team (JVET) of ITU-T SG 16 WP 3 and ISO/IEC JTC 1/SC 29/WG 11, 10th Meeting: San Diego, US, JVET-J0021 (Apr. 2018).
Chen et al. "CE4.3.1: Shared merging candidate list", JVET 13th Meeting, JVET-M0170-v1 (Jan. 2019).
Chen et al. "Symmetrical mode for bi-prediction" JVET Meeting,,JVET-J0063 (Apr. 2018).
Chen et al. "Internet Video Coding Test Model (ITM) v 2.0" "Information Technology—Coding of audio-visual objects—Internet Video Coding", Geneva; XP030019221 (May 2012).
Chen et al. "Algorithm description of Joint Exploration Test Model 7 (JEM7)," JVET-G1001, (Jul. 2017).
Chien et al. "Enhanced AMVP Mechanism Based Adaptive Motion Search Range Decision Algorithm for Fast HEVC Coding," IEEE, Institute of Computer and Communication Engineering, 2014, pp. 3696-3699.
Esenlik et al. "Description of Core Experiment 9 (CE9): Decoder Side Motion Vector Derivation" JVET-J1029-r4, (Apr. 2018).
Han et al. "A dynamic motion vector referencing scheme for video coding" IEEE International Conference on Image Processing (ICIP), (Sep. 2016).
Information Technology—High efficiency coding and media delivery in heterogeneous environments—Part 2: "High Efficiency Video Coding" ISO/IEC JTC 1/SC 29/WG 11 N 17661, ISO/IEC DIS 23008-2_201x(4th Ed.) (Apr. 2018).
Itu-T H.265 "High efficiency video coding" Series H: Audiovisual and Multimedia Systems Infrastructure of audiovisual services—Coding of moving video,Telecommunication Standardization Sector of ITU, Available at address: https://www.itu.int/rec/T-REC-H. 265 (Nov. 2019).
Kudo et al. "Motion Vector Prediction Methods Considering Prediction Continuity in HEVC," Picture Coding Symposium (PCS), 2016.
Lee et al. "Non-CE4:HMVP Unification between the Merge and MVP List," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0373, Mar. 2019.
Li et al. JVET-D0117r1 "Multi-Type-Tree" Joint Video Exploration Team (JVET) of ITU-T SG 16 WP 3 and ISO/IEC JTC 1/SC 29/WG 11, 4th Meeting: Chengdu, CN, Oct. 15-21, 2016.
Lin et al. "CE3: Summary report on motion prediction for texture coding" JCT-3V Meeting, JCT3V-G0023 (Jan. 2014).
Luthra et al., "Overview of the H.264/AVC video coding standard", Proceedings of SPIE vol. 5203 Applications of Digital Image Processing XXVI., 2003.
Ma et al. "Eleventh Five-Year Plan" teaching materials for ordinary colleges and universities, Principle and Application of S7-200 PLC and Digital Speed Control Systems, Jul. 31, 2009.
Park et al. "Hardware-friendly Advanced Motion Vector Predictor Generation for an HEVC Encoder," Journal of Semiconductor Technology and Science, Dec. 2018, 18(6):737-747.
Rapaka et al. "On intra block copy merge vector handling" JCT-VC Meeting, JCTVC-V0049 (Oct. 2015).

(56) References Cited

OTHER PUBLICATIONS

Robert et al. "High precision FRUC with additional candidates" JVET Meeting JVET-D0046 (Oct. 2016).

Sjoberg et al. "Description of SDR and HDR video coding technology proposal by Ericsson and Nokia" JVET Meeting, JVET-J0012-v1 (Apr. 2018).

Solovyev et al. "CE-4.6: Simplification for Merge List Derivation in Triangular Prediction Mode," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0454, Mar. 2019.

Sprljan et al. "TE3 subtest 3: Local intensity compensation (LIC) for inter prediction", JCT-VC of ITU-T SG16 WP3 and ISO/IEC JTC1/SC29/WG11, 3rd Meeting: Guangzhou, CN, JCTVC-C233 (Oct. 2010).

Sullivan et al., "Overview of the High Efficiency Video Coding (HEVC) Standard", IEEE Transactions on Circuits and Systems for Video Technology, vol. 22, No. 12, Dec. 2012.

Toma et al. "Description of SDR video coding technology proposal by Panasonic", Joint Video Experts Team (JVET) of ITU-T SG 16 WP 3 and ISO/IEC JTC 1/Sc 29/WG 11, 10th Meeting: San Diego, US, JVET-J0020-v1and v2 (Apr. 2018).

"Versatile Video Coding (VVC)", JVET, JEM-7.0, Available at address: https://jvet.hhi.fraunhofer.de/svn/svn_HMJEMSoftware/tags/ HM-16.6-JEM-7.0. Accessed on Feb. 11, 2020.

Wang et al. "Spec text for the agreed starting point on slicing and tiling", JVET 12th Meeting, JVET-L0686-v2 (Oct. 2018).

Xu et al. "Intra block copy improvement on top of Tencent's CfP response" JVET Meeting, JVET-J0050-r2 (Apr. 2018).

Yang et al. "Description of Core Experiment 4 (CE4): Inter prediction and motion vector coding" JVET-K1024 (Jul. 2018).

Yang et al. Description of Core Experiment 4 (CE4); Interprediction and Motion Vector Coding,JVET Meeting, The Joint Video Exploration Team of ISO/IEC JTC1/SC29/WG11 and ITU-TSG.16 No Meeting San Diego, Apr. 20, 2018, Document JVET-J1024, Apr. 20, 2018.

Yu et al. "Parallel AMVP Candidate List Construction for HEVC," Conference: Visual Communications and Image Processing (VCIP), Nov. 2012, IEEE, retrieved May 12, 2016.

Zhang et al. "CE2-related: Early awareness of accessing temporal blocks in sub-block merge list construction", JVET-M0273 (Jan. 2019).

Zhang et al. "CE4: History-based Motion Vector Prediction(Test 4.4.7)", Joint Video Experts Team (JVET) of ITU-T SG 16 WP 3 and ISO/IEC JTC 1/SC 29/WG 11, 12th meeting: Macao, CN, Oct. 3-12, 2018, Document JVET-L0266-v1and v2, Oct. 12, 2018.

Zhang et al. "CE4-related: History-based Motion Vector Prediction", Joint Video Experts Team (JVET) of ITU-T SG 16 WP 3 and ISO/IEC JTC 1/SC 29/WG 11, Document JVET-K0104-v5, Meeting Report of the 11th meeting of the Joint Video Experts Team (JVET), Ljubljana, SI, Jul. 10-18, 2018.

Zhang et al. "CE4-related: Restrictions on History-based Motion Vector Prediction", JVET-M0272 (Jan. 2019).

Zhang et al., "History-Based Motion Vector Prediction in Versatile Video Coding", 2019 Data Compression Conference (DCC), IEEE, pp. 43-52, XP033548557 (Mar. 2019).

Zhang et al. "CE4-4.4: Merge List Construction for Triangular Prediction Mode," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0269, Mar. 2019.

Zhang et al. "CE10-related: Merge List Construction Process for Triangular Protection Mode," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0271, Jan. 2019.

Zhu et al. "Simplified HMVP," Joint Video Experts Team (JVET) of ITU-T SG 16 WP 3 and ISO/IEC JTC 1/SC 29/WG 11, 13th Meeting: Marrakech, MA, Jan. 9-18, 2019, Document JVET-M0473, Jan. 2019.

International Search Report and Written Opinion from International Patent Application No. PCT/IB2019/055549 dated Aug. 20, 2019 (16 pages).

International Search Report and Written Opinion from International Patent Application No. PCT/IB2019/055575 dated Aug. 20, 2019 (12 pages).

International Search Report and Written Opinion from International Patent Application No. PCT/IB2019/055576 dated Sep. 16, 2019 (15 pages).

International Search Report and Written Opinion from International Patent Application No. PCT/IB2019/055582 dated Sep. 20, 2019 (18 pages).

International Search Report and Written Opinion from International Patent Application No. PCT/CN2020/071656 dated Apr. 3, 2020(12 pages).

International Search Report and Written Opinion from International Patent Application No. PCT/CN2020/071332 dated Apr. 9, 2020(9 pages).

International Search Report and Written Opinion from International Patent Application No. PCT/CN2020/072387 dated Apr. 20, 2020(10 pages).

Non-Final Office Action from U.S. Appl. No. 17/011,058 dated Apr. 13, 2021.

Non-Final Office Action from U.S. Appl. No. 17/229,019 dated Jun. 25, 2021.

Non-Final Office Action from U.S. Appl. No. 17/019,753 dated Jul. 22, 2021.

Non-Final Office Action from U.S. Appl. No. 15/796,708 dated Aug. 11, 2021.

* cited by examiner

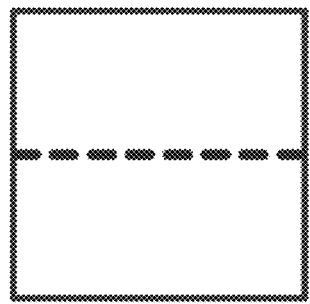
FIG. 6B
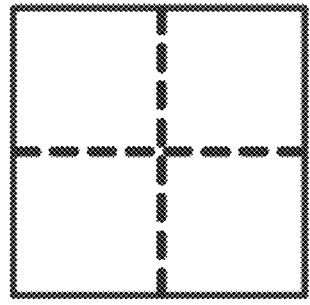
FIG. 6A
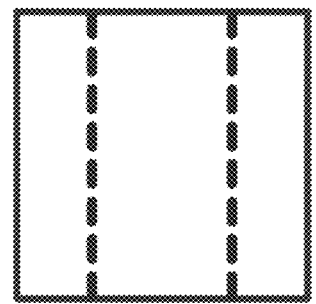
FIG. 6E
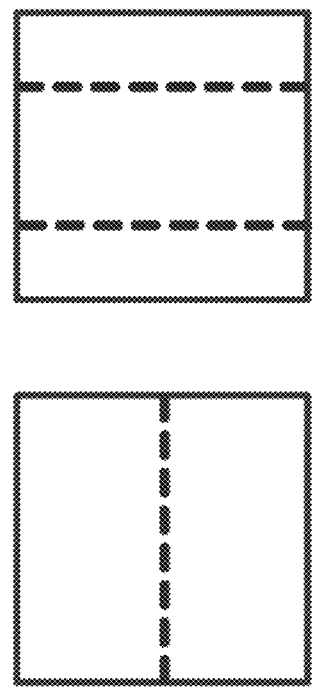
FIG. 6D
FIG. 6C

4400

4402 — performing, using a merge index, a conversion between a block of video data of a video and a bitstream representation of the video, wherein the bitstream representation comprises the merge index indicative of a merge candidate for the conversion that is split into a first part and a second part

FIG. 44

ORDER OF ROUNDING AND PRUNING IN LAMVR

CROSS-REFERENCE TO RELATED APPLICATIONS

This application is a continuation of International Application No. PCT/IB2019/055621, filed on Jul. 2, 2019, which claims the priority to and benefits of International Patent Application No. PCT/CN2018/093987, filed on Jul. 2, 2018. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to encoding and decoding digital video using a set of look-up tables (LUTs) containing coding candidates are described. The described methods may be applied to both the existing video coding standards (e.g., High Efficiency Video Coding (HEVC)) and future video coding standards or video codecs.

In one representative aspect, the disclosed technology can be used to provide a method for video processing. This method includes performing a conversion between a first block of video data of a video and a bitstream representation of the video and updating, based on a coding characteristic of the first block of video data, a table of motion candidates using motion information associated with the first block.

In another representative aspect, the disclosed technology can be used to provide a method for processing a video. This method includes maintaining one or more tables of motion candidates during a conversion between a current video block and a bitstream representation of the video, comparing a motion candidate associated with the current video block with a number of entries in the one or more tables, and updating the one or more tables based on the comparing.

In another representative aspect, the disclosed technology can be used to provide a method for video processing. This method includes performing a conversion between video blocks of a video and a bitstream representation of the video while maintaining one or more tables of motion candidates in the conversion, determining, based on a coding characteristic of a current video block in the video blocks, a suitability of using the one or more tables of motion candidates for performing a conversion between the current video block and the bitstream representation of the video, performing the conversion between the current video block and the bitstream representation of the video according to the suitability, and selectively updating the one or more tables of motion candidates using a motion candidate associated with the current video block.

In another representative aspect, the disclosed technology can be used to provide a method for video processing. This method includes maintaining one or more tables of motion candidates during a conversion between a current video block and a bitstream representation of a video including the current video block, determining that the current video block is coded using a merge mode or an Advanced Motion Vector Prediction (AMVP) mode, and performing, based on the determining, the conversion between the current video block of and the bitstream representation of the video using one or more tables of motion candidates.

In another representative aspect, the disclosed technology can be used to provide a method for video processing. This method includes determining a list of motion candidates for a block of video data of a video by combining one or more tables of motion candidates and a set of non-adjacent candidates from one or more non-adjacent blocks. The method also includes performing a conversion between the block of video data and a bitstream representation of the video using the list of motion candidates.

In another representative aspect, the disclosed technology can be used to provide a method for video processing. This method includes maintaining an Advanced Motion Vector Prediction (AMVP) candidate list for a conversion between a video block of a video and a bitstream representation of the video with a motion vector precision of M-Pel or sub-pel selected from multiple available motion vector precisions. M is a positive integer. The method includes performing, for each available Advanced Motion Vector Prediction (AMVP) candidate associated with the video block: rounding the AMVP candidate, comparing the rounded AMVP candidate against existing candidates in the AMVP candidate list, and adding the AMVP candidate to the AMVP candidate list upon determining that the rounded AMVP candidate is different than the existing candidates. The method also includes combining the AMVP candidate list with one or more motion candidates from one or more tables of motion candidates to obtain a combined list and performing the conversion based on the combined list.

In another representative aspect, the disclosed technology can be used to provide a method for video processing. This method includes maintaining an Advanced Motion Vector Prediction (AMVP) candidate list for a conversion between a video block of a video and a bitstream representation of the video with a motion vector precision of M-Pel or sub-pel selected from multiple available motion vector precisions, M being a positive integer. The method also includes comparing an AMVP candidate associated with the video block with existing AMVP candidates in the AMVP candidate list, adding the AMVP candidate to the AMVP candidate list upon determining that the AMVP candidate is different than the existing candidates, and performing the conversion based on the AMVP candidate list.

In another representative aspect, the disclosed technology can be used to provide a method for video processing. This method includes performing, using a merge index, a conversion between a block of video data of a video and a bitstream representation of the video. The bitstream representation comprises a merge index indicative of a merge candidate for the conversion. The merge index is split into a first part and a second part. The first part is coded using a first binarization method, and the second part is coded using a second binarization method that is different from the first binarization method.

In another representative aspect, the disclosed technology can be used to provide a method for video processing. This method includes maintaining one or more tables of intra prediction mode candidates based on one or more previous video blocks of a video and performing a conversion between a current video block of the video and a bitstream representation of the video using the one or more tables of intra prediction mode candidates.

In another representative aspect, the disclosed technology can be used to provide a method for video processing. This method includes determining a set of intra prediction mode predictors based on an intra prediction mode of a non-adjacent block of a video block of a video and performing a conversion between the video block and the bitstream representation of the video using the set of intra prediction mode predictors.

In another representative aspect, the disclosed technology can be used to provide a method for video processing. This method includes maintaining one or more tables of illumination compensation (IC) parameters based on one or more previous video blocks of a video and performing a conversion between a current video block of the video and a bitstream representation of the video using the one or more tables of IC parameters.

In another representative aspect, the disclosed technology can be used to provide a method for video processing. This method includes deriving illumination compensation (IC) parameters of a current video block of a video based on IC parameters of a non-adjacent block of the current video block and performing a conversion between the current video block and a bitstream representation of the video using the derived IC parameters.

In another representative aspect, the disclosed technology may be used to provide a method for video coding. This method includes receiving a bitstream representation of a first block of video data, and processing the bitstream representation based on at a set of look-up tables (LUTs) to generate the first block of video data, where the set of LUTs comprises coding candidates.

In another representative aspect, the disclosed technology may be used to provide another method for video coding. This method includes receiving a bitstream representation of a block of video data, and processing the bitstream representation based on coding candidates from non-adjacent blocks, where the coding candidates are non-motion candidates.

In yet another representative aspect, the disclosed technology may be used to provide another method for video coding. This method includes receiving a bitstream representation of a block of video data, and processing, using multiple motion vector (MV) precisions and based on an Advanced Motion Vector Prediction (AMVP) candidate list, the bitstream representation to generate the block of video data, where the block of video data comprises low MV precision, and where each AMVP candidate is rounded and pruned with available AMVP candidates prior to insertion into the AMVP candidate list.

In yet another representative aspect, the disclosed technology may be used to provide another method for video coding. This method includes receiving a bitstream representation of a block of video data, and processing, using merge index coding, the bitstream representation to generate the block of video data, where the bitstream representation comprises a merge index that is split into a first part and a second part, wherein the first part is processed by a first binarization method, and wherein the second part is processed by a second binarization method that is different from the first binarization method.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 6A shows an example of quad-tree (QT) partitioning.

FIG. 6B shows an example of vertical binary-tree (BT) partitioning.

FIG. 6C shows an example of horizontal binary-tree (BT) partitioning.

FIG. 6D shows an example of vertical ternary-tree (TT) partitioning.

FIG. 6E shows an example of horizontal ternary-tree (TT) partitioning.

FIG. 44 shows another flowchart of an example method for video processing in accordance with the presently disclosed technology.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Example Embodiments of Video Coding

Figure 1:
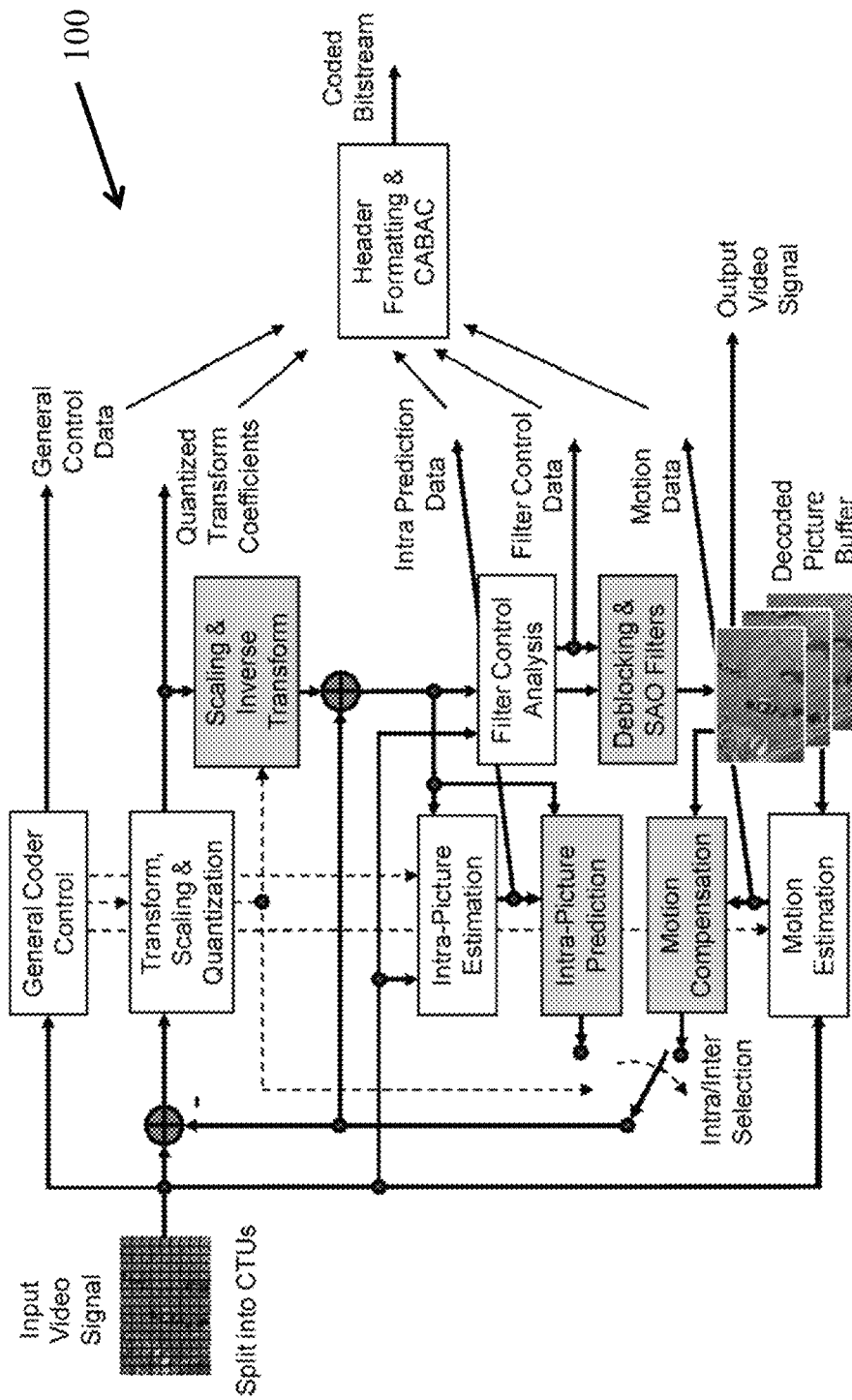
FIG. 1 shows an example block diagram of a typical High Efficiency Video Coding (HEVC) video encoder and decoder.

FIG. 1 shows an example block diagram of a typical HEVC video encoder and decoder. An encoding algorithm producing an HEVC compliant bitstream would typically proceed as follows. Each picture is split into block-shaped regions, with the exact block partitioning being conveyed to the decoder. The first picture of a video sequence (and the first picture at each clean random access point into a video sequence) is coded using only intra-picture prediction (that uses some prediction of data spatially from region-to-region within the same picture, but has no dependence on other pictures). For all remaining pictures of a sequence or between random access points, inter-picture temporally predictive coding modes are typically used for most blocks. The encoding process for inter-picture prediction consists of choosing motion data comprising the selected reference picture and motion vector (MV) to be applied for predicting the samples of each block. The encoder and decoder generate identical inter-picture prediction signals by applying motion compensation (MC) using the MV and mode decision data, which are transmitted as side information.

The residual signal of the intra- or inter-picture prediction, which is the difference between the original block and its prediction, is transformed by a linear spatial transform. The transform coefficients are then scaled, quantized, entropy coded, and transmitted together with the prediction information.

The encoder duplicates the decoder processing loop (see gray-shaded boxes in FIG. 1) such that both will generate identical predictions for subsequent data. Therefore, the quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures. In general, the order of encoding or decoding processing of pictures often differs from the order in which they arrive from the source; necessitating a distinction between the decoding order (e.g., bitstream order) and the output order (e.g., display order) for a decoder.

Video material to be encoded by HEVC is generally expected to be input as progressive scan imagery (either due to the source video originating in that format or resulting from deinterlacing prior to encoding). No explicit coding features are present in the HEVC design to support the use of interlaced scanning, as interlaced scanning is no longer used for displays and is becoming substantially less common for distribution. However, a metadata syntax has been provided in HEVC to allow an encoder to indicate that interlace-scanned video has been sent by coding each field (i.e., the even or odd numbered lines of each video frame) of interlaced video as a separate picture or that it has been sent by coding each interlaced frame as an HEVC coded picture. This provides an efficient method of coding interlaced video without burdening decoders with a need to support a special decoding process for it.

1.1. Examples of Partition Tree Structures in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
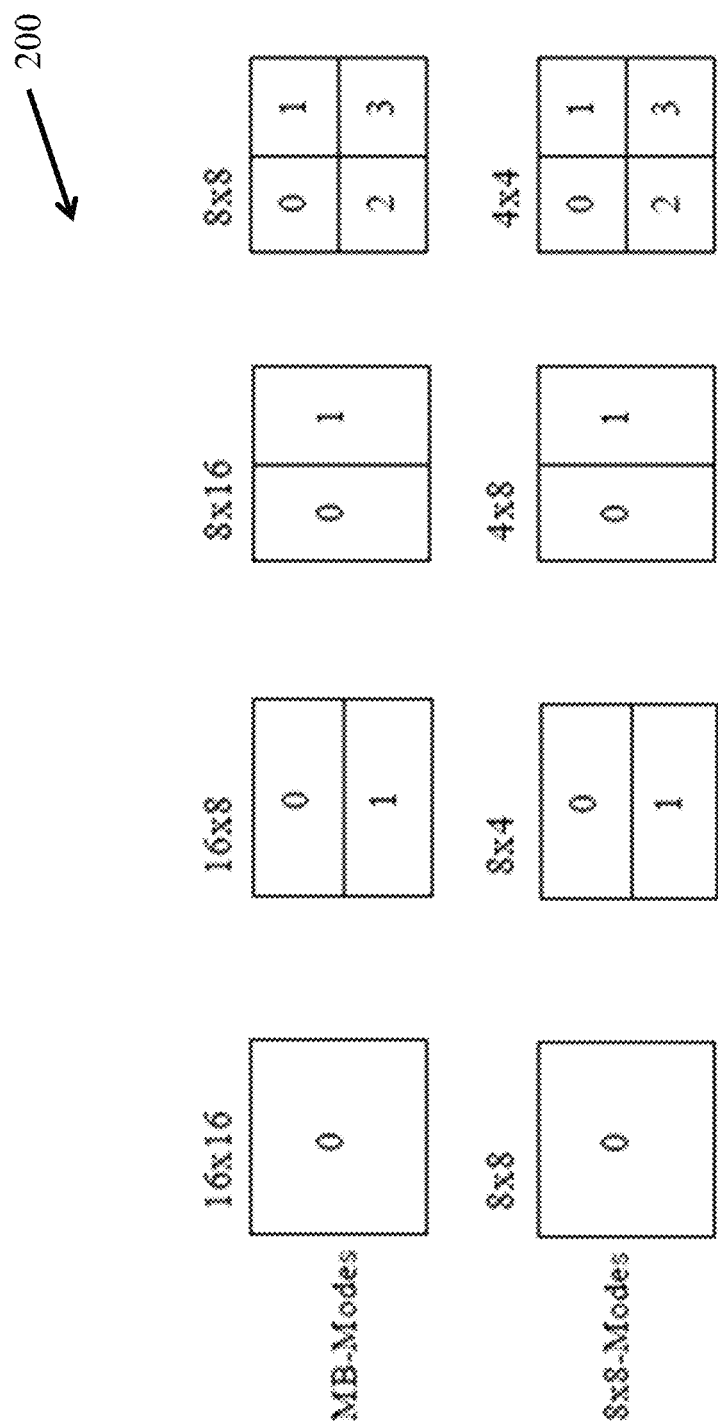
FIG. 2 shows examples of macroblock (MB) partitions in H.264/AVC.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4, as shown in FIG. 2. Only one motion vector (MV) per sub-macroblock partition is allowed.

1.2 Examples of Partition Tree Structures in HEVC

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

Certain features involved in hybrid video coding using HEVC include:

(1) Coding tree units (CTUs) and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

(2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
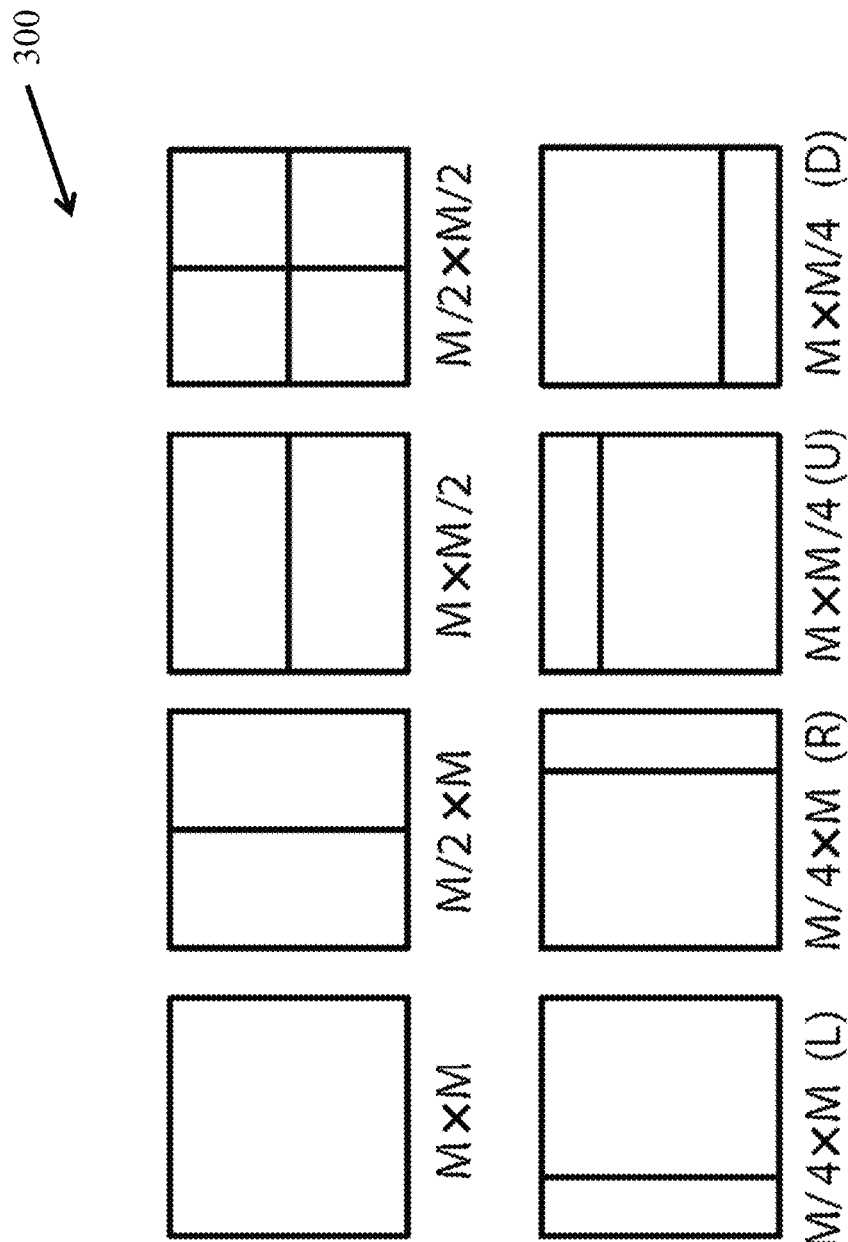
FIG. 3 shows examples of splitting coding blocks (CBs) into prediction blocks (PBs).

(3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for an M×M CU.

(4) Transform units (Tus) and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

1.2.1. Examples of Tree-Structured Partitioning into TBs and TUs

Figure 4A:
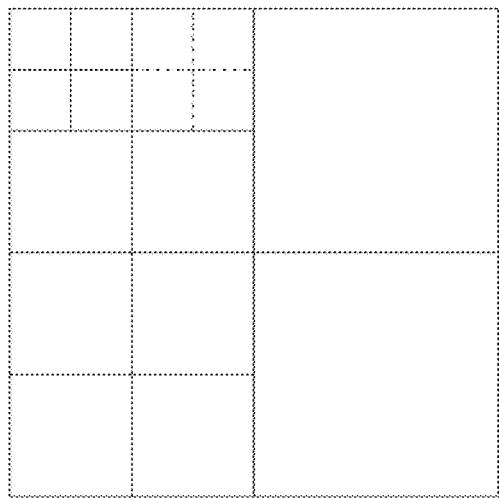
FIGS. 4A and 4B show an example of the subdivision of a coding tree block (CTB) into CBs and transform blocks (TBs), and the corresponding quadtree, respectively.
Figure 4B:
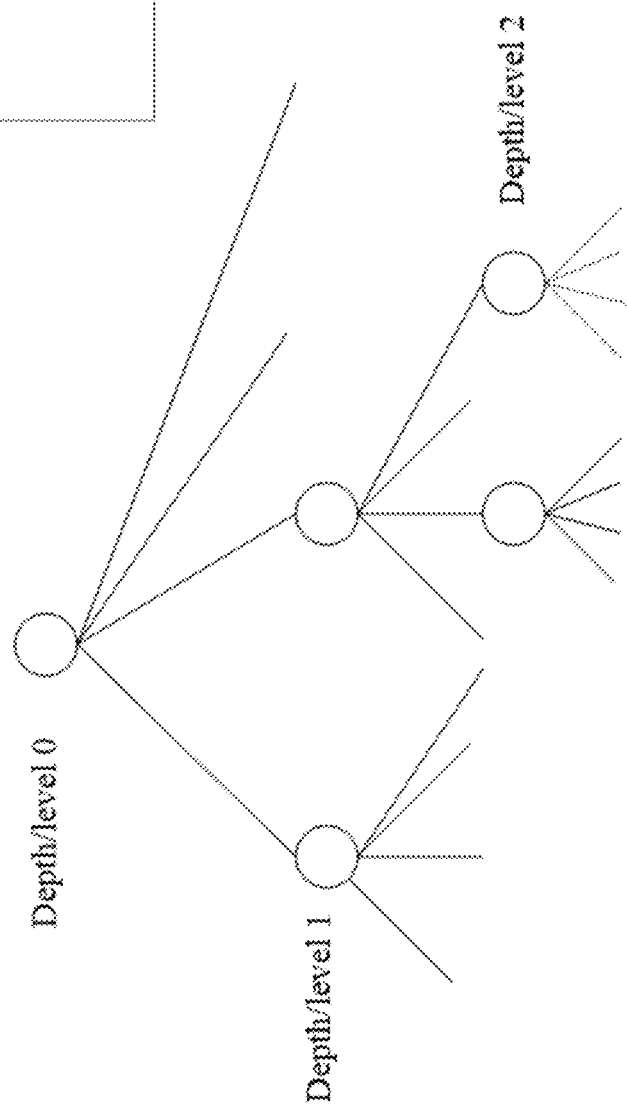

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the sequence parameter set (SPS), each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

1.2.2. Parent and Child Nodes

A CTB is divided according to a quad-tree structure, the nodes of which are coding units. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

1.3. Examples of Quadtree Plus Binary Tree Block Structures with Larger CTUs in Joint Exploration Model (JEM)

In some embodiments, future video coding technologies are explored using a reference software known as the Joint Exploration Model (JEM). In addition to binary tree structures, JEM describes quadtree plus binary tree (QTBT) and ternary tree (TT) structures.

1.3.1. Examples of the QTBT Block Partitioning Structure

Figure 5A:
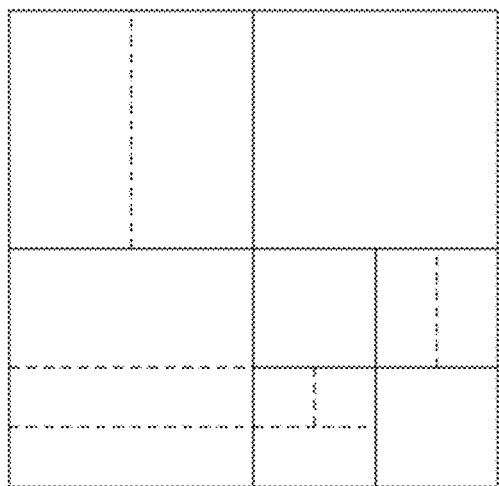
FIGS. 5A and 5B show an example of the subdivisions and a corresponding Quadtree plus Binary Tree (QTBT) for a largest coding unit (LCU).

In contrast to HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 5A, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme:

CTU size: the root node size of a quadtree, the same concept as in HEVC
MinQTSize: the minimally allowed quadtree leaf node size
MaxBTSize: the maximally allowed binary tree root node size
MaxBTDepth: the maximally allowed binary tree depth
MinBTSize: the minimally allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

Figure 5B:
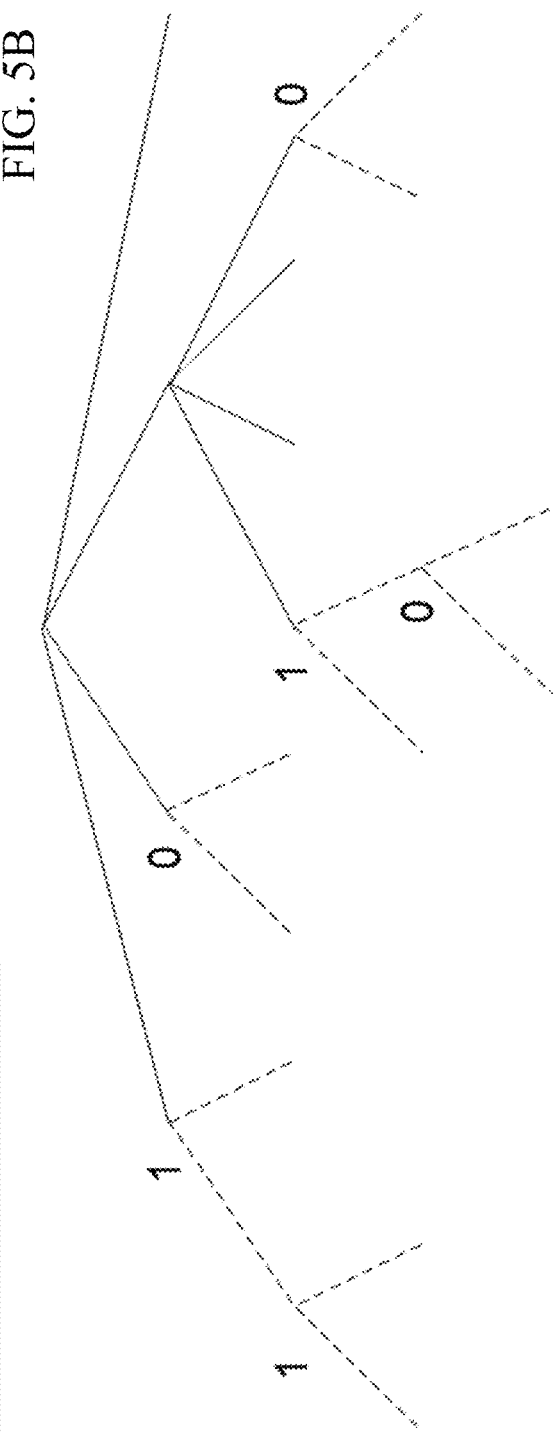

FIG. 5A shows an example of block partitioning by using QTBT, and FIG. 5B shows the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

1.4. Ternary-Tree (TT) for Versatile Video Coding (VVC)

FIG. 6A shows an example of quad-tree (QT) partitioning, and FIGS. 6B and 6C show examples of the vertical and horizontal binary-tree (BT) partitioning, respectively. In some embodiments, and in addition to quad-trees and binary-trees, ternary tree (TT) partitions, e.g., horizontal and vertical center-side ternary-trees (as shown in FIGS. 6D and 6E) are supported.

In some implementations, two levels of trees are supported: region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

Figure 7:
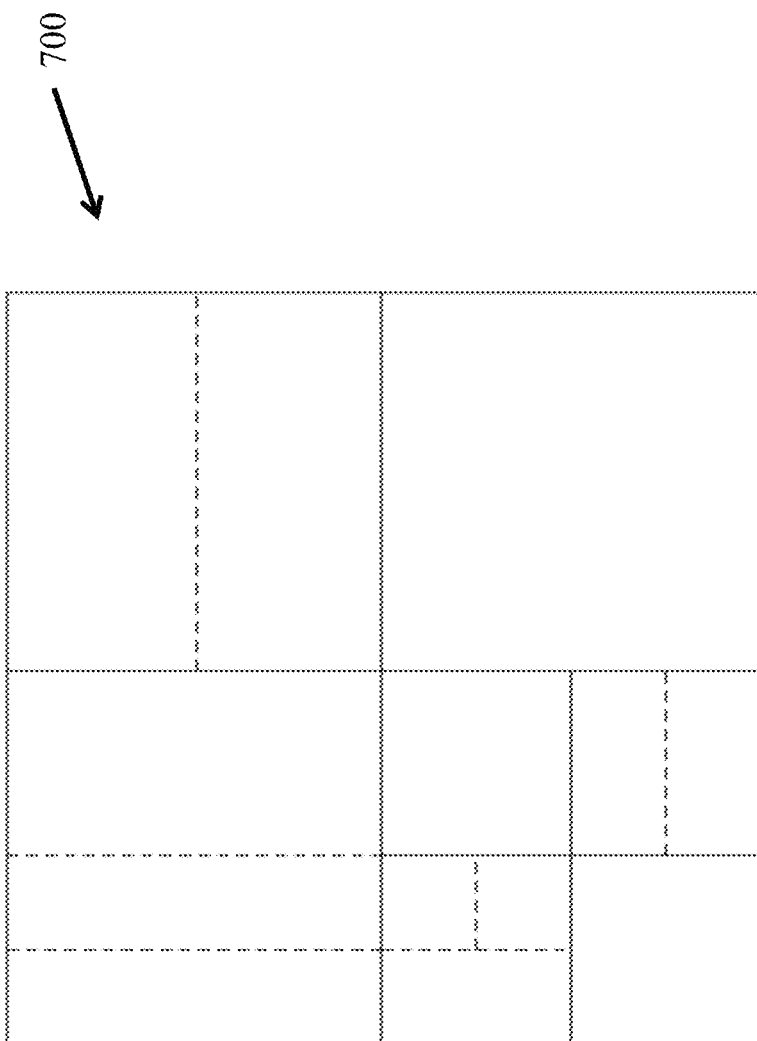
FIG. 7 shows an example subdivision of a CB based on a QTBT.
Figure 8E:
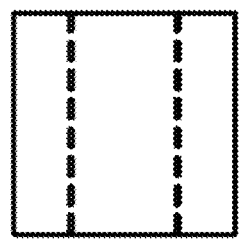
FIGS. 8A-8I show examples of the partitions of a CB supported the multi-tree type (MTT), which is a generalization of the QTBT.
Figure 8D:
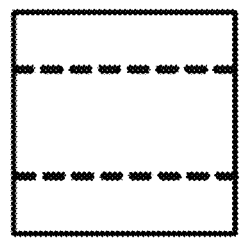
Figure 8I:
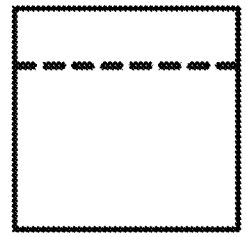
Figure 8C:
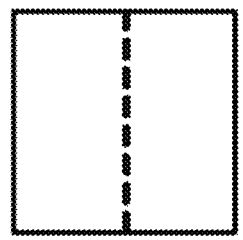
Figure 8H:
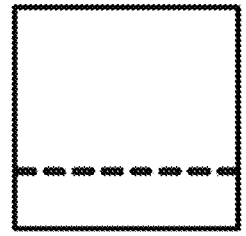
Figure 8B:
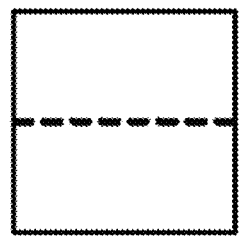
Figure 8G:
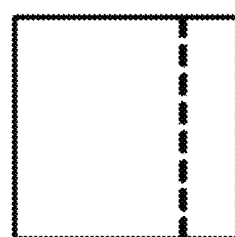
Figure 8A:
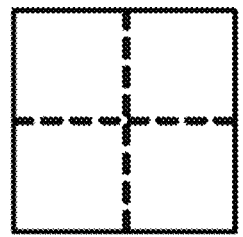
Figure 8F:
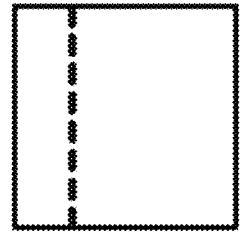

1.5. Examples of Partitioning Structures in Alternate Video Coding Technologies In some embodiments, a tree structure called a Multi-Tree Type (MTT), which is a generalization of the QTBT, is supported. In QTBT, as shown in FIG. 7, a Coding Tree Unit (CTU) is firstly partitioned by a quad-tree structure. The quad-tree leaf nodes are further partitioned by a binary-tree structure.

The structure of the MTT constitutes of two types of tree nodes: Region Tree (RT) and Prediction Tree (PT), supporting nine types of partitions, as shown in FIG. 8. A region tree can recursively split a CTU into square blocks down to a 4×4 size region tree leaf node. At each node in a region tree, a prediction tree can be formed from one of three tree types: Binary Tree, Ternary Tree, and Asymmetric Binary Tree. In a PT split, it is prohibited to have a quadtree partition in branches of the prediction tree. As in JEM, the luma tree and the chroma tree are separated in I slices.

2 Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

2.1 Examples of Prediction Modes

Each inter-predicted prediction unit (PU) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

In the H.264/MPEG-4 AVC standard, the granularity of prediction types is brought down to the "slice level." A slice is a spatially distinct region of a frame that is encoded separately from any other region in the same frame. When signaling indicates that one of the two reference picture lists is to be used, the PU is produced from one motion vector and reference index. This is referred to as 'uni-prediction'. Uni-prediction is available both for P-slices and B-slices. When signaling indicates that both of the reference picture lists are to be used, the PU is produced from two motion vectors and reference indices. This is referred to as 'bi-prediction'. Bi-prediction is available for B-slices only.

2.1.1 Embodiments of Constructing Candidates for Merge Mode

Figure 9:
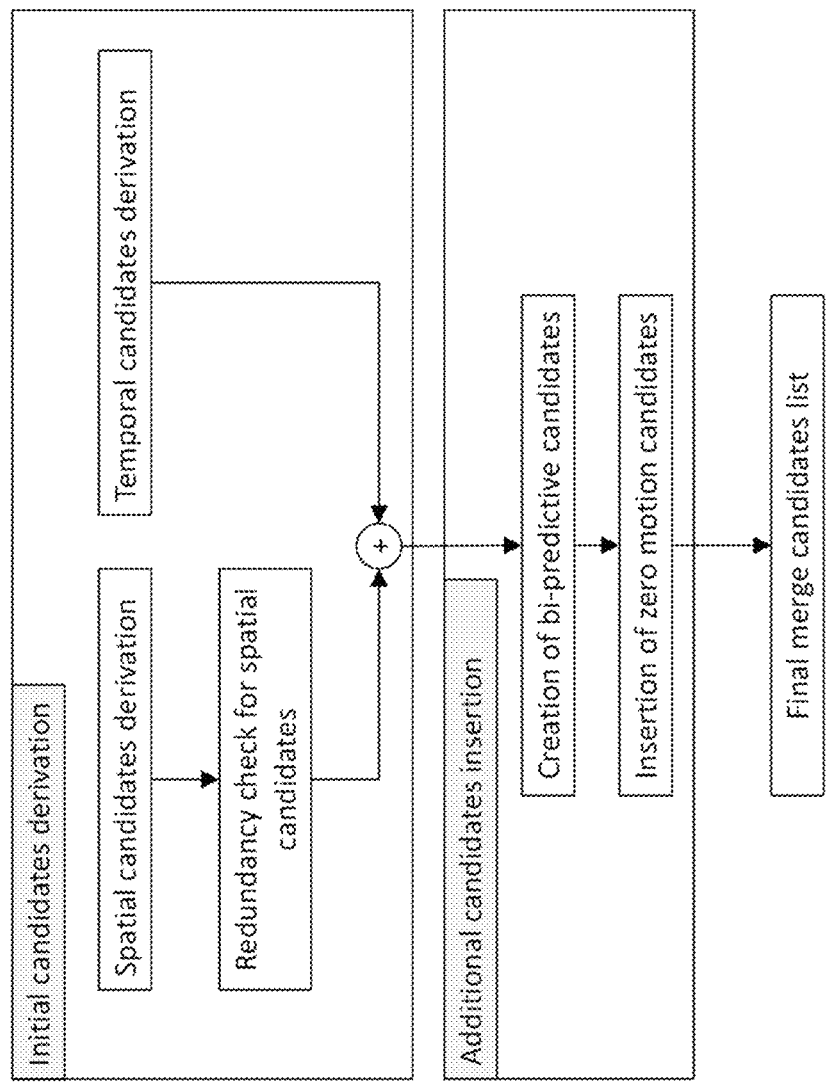
FIG. 9 shows an example of constructing a merge candidate list.

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates FIG. 9 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

2.1.2 Constructing Spatial Merge Candidates

Figure 10:
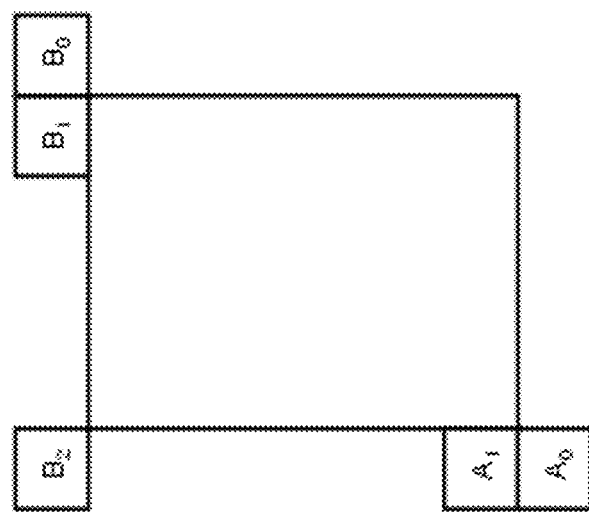
FIG. 10 shows an example of positions of spatial candidates.

In the derivation of spatial merge candidates, a maximum of four merge candidates are selected among candidates located in the positions depicted in FIG. 10. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 11:
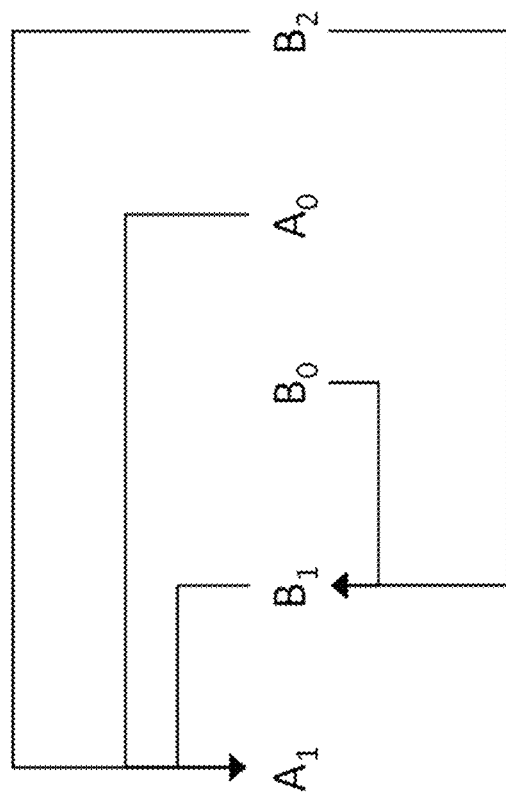
FIG. 11 shows an example of candidate pairs subject to a redundancy check of spatial merge candidates.
Figure 12B:
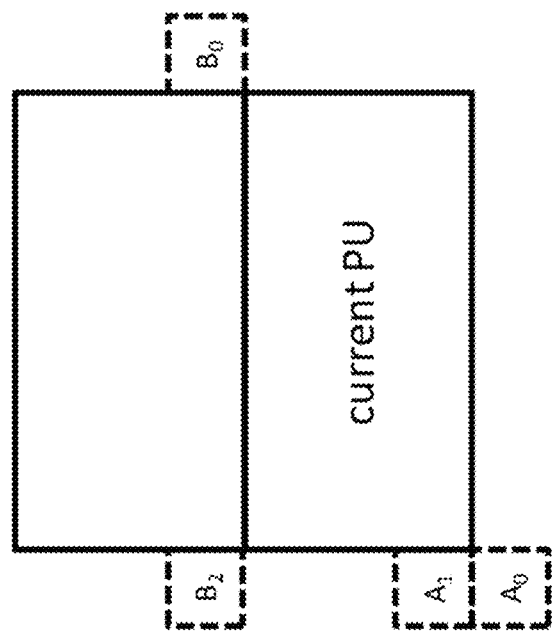
FIGS. 12A and 12B show examples of the position of a second prediction unit (PU) based on the size and shape of the current block.
Figure 12A:
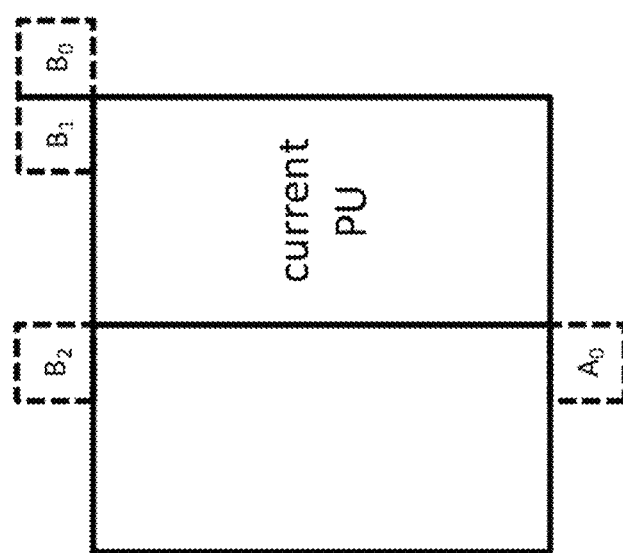

To reduce computational complexity, not all possible candidate pairs are considered in the mentioned redundancy check. Instead only the pairs linked with an arrow in FIG. 11 are considered and a candidate is only added to the list if the corresponding candidate used for redundancy check has not the same motion information. Another source of duplicate motion information is the "second PU" associated with partitions different from 2N×2N. As an example, FIGS. 12A and 12B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

2.1.3 Constructing Temporal Merge Candidates

In this step, only one candidate is added to the list. Particularly, in the derivation of this temporal merge candidate, a scaled motion vector is derived based on co-located PU belonging to the picture which has the smallest Picture Order Count (POC) difference with current picture within the given reference picture list. The reference picture list to be used for derivation of the co-located PU is explicitly signaled in the slice header.

Figure 13:
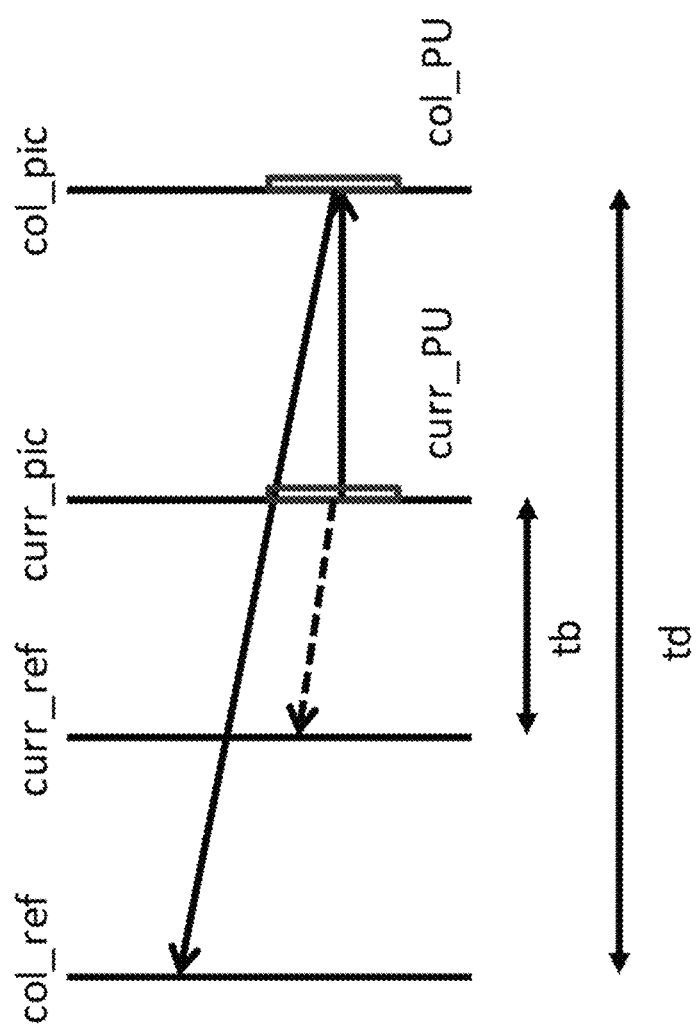
FIG. 13 shows an example of motion vector scaling for temporal merge candidates.

FIG. 13 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 14:
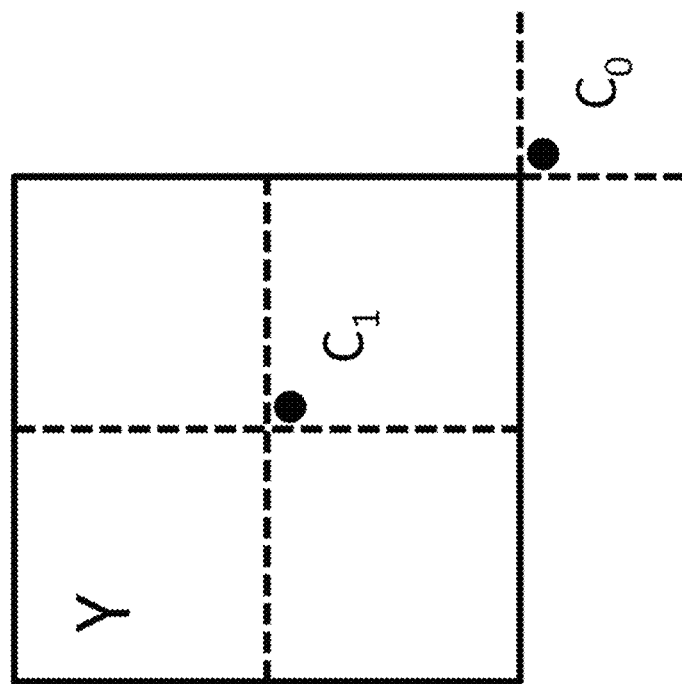
FIG. 14 shows an example of candidate positions for temporal merge candidates.

In the co-located PU (Y) belonging to the reference frame, the position for the temporal candidate is selected between candidates $C_0$ and $C_1$, as depicted in FIG. 14. If PU at position $C_0$ is not available, is intra coded, or is outside of the current CTU, position $C_1$ is used. Otherwise, position $C_0$ is used in the derivation of the temporal merge candidate.

2.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 15:
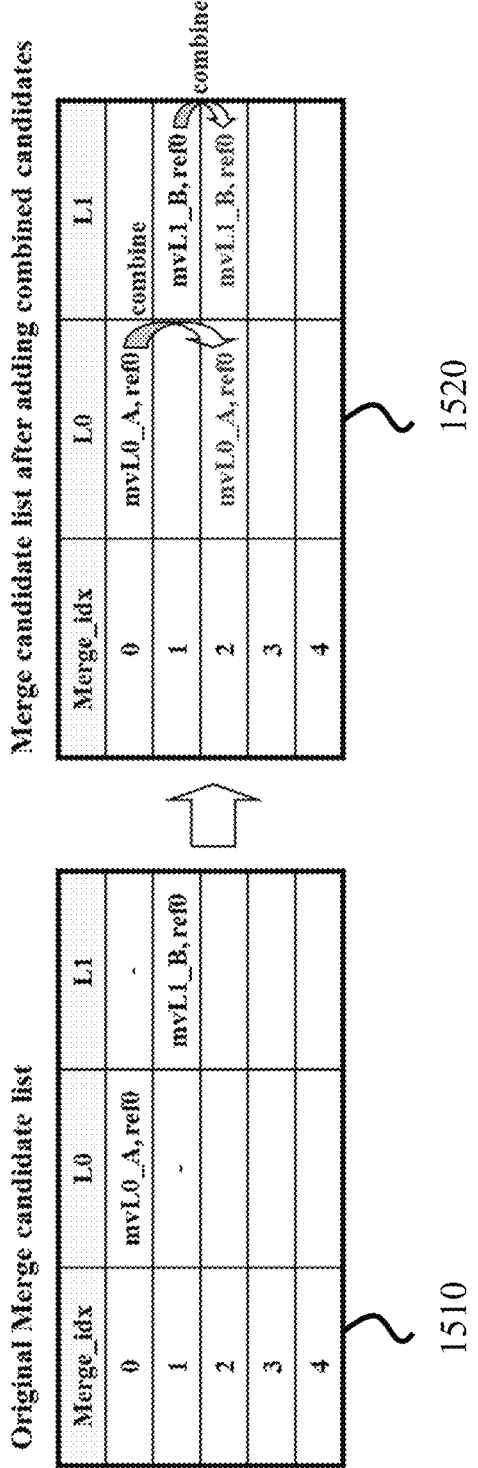
FIG. 15 shows an example of generating a combined bi-predictive merge candidate.

FIG. 15 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

2.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log 2_parallel_merge_level_minus2" syntax element. When a MER is defined, merge candidates falling in the same region are marked as unavailable and therefore not considered in the list construction.

The picture parameter set (PPS) raw byte sequence payload (RBSP) syntax is shown in Table 1, where log 2_parallel_merge_level_minus2 plus 2 specifies the value of the variable Log2ParMrgLevel, which is used in the derivation process for luma motion vectors for merge mode and the derivation process for spatial merging candidates as specified in an existing video coding standard. The value of log 2_parallel_merge_level_minus2 shall be in the range of 0 to CtbLog2SizeY−2, inclusive.

The variable Log2ParMrgLevel is derived as follows:

Log2ParMrgLevel=log 2_parallel_merge_level_minus2+2

Note that the value of Log2ParMrgLevel indicates the built-in capability of parallel derivation of the merging candidate lists. For example, when Log2ParMrgLevel is equal to 6, the merging candidate lists for all the prediction units (PUs) and coding units (CUs) contained in a 64×64 block can be derived in parallel.

TABLE 1

General picture parameter set RBSP syntax

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| ... | |
| pps_scaling_list_data_present_flag | u(1) |
| if( pps_scaling_list_data_present_flag ) | |
| scaling_list_data( ) | |
| lists_modification_present_flag | u(1) |
| log2_parallel_merge_level_minus2 | ue(v) |
| slice_segment_header_extension_present_flag | u(1) |
| pps_extension_present_flag | u(1) |
| ... | |
| rbsp_trailing_bits( ) | |
| } | |

2.2 Embodiments of Motion Vector Prediction in AMVP Mode

Motion vector prediction exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary.

2.2.1 Examples of Constructing Motion Vector Prediction Candidates

Figure 16:
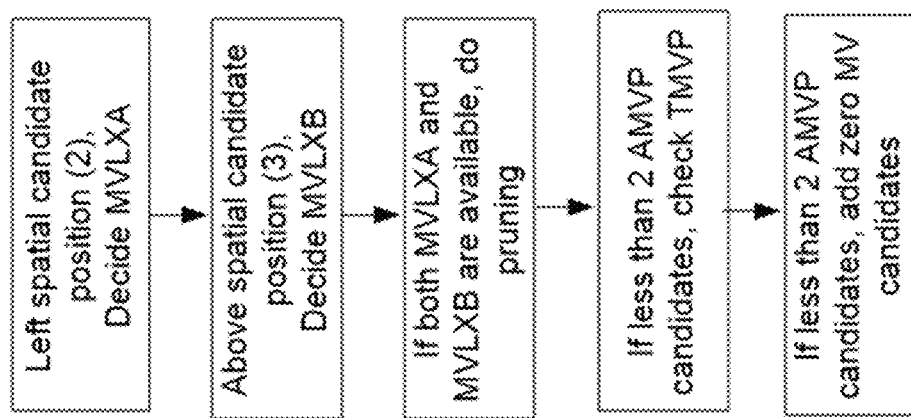
FIG. 16 shows an example of a derivation process for motion vector prediction candidates.

FIG. 16 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 10.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2 Constructing Spatial Motion Vector Candidates

In the derivation of spatial motion vector candidates, a maximum of two candidates are considered among five potential candidates, which are derived from PUs located in positions as previously shown in FIG. 10, those positions being the same as those of motion merge. The order of derivation for the left side of the current PU is defined as $A_0$, $A_1$, scaled $A_0$, and scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling (1) Same reference picture list, and same reference picture index (same POC)

(2) Different reference picture list, but same reference picture (same POC)

Spatial scaling (3) Same reference picture list, but different reference picture (different POC)

(4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 17:
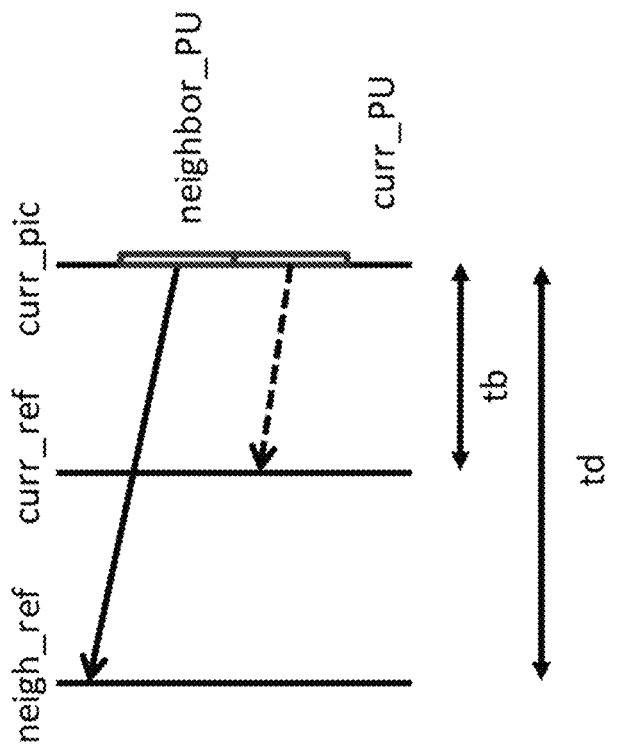
FIG. 17 shows an example of motion vector scaling for spatial motion vector candidates.

As shown in the example in FIG. 17, for the spatial scaling case, the motion vector of the neighbouring PU is scaled in a similar manner as for temporal scaling. One difference is that the reference picture list and index of current PU is given as input; the actual scaling process is the same as that of temporal scaling.

2.2.3 Constructing Temporal Motion Vector Candidates

Apart from the reference picture index derivation, all processes for the derivation of temporal merge candidates are the same as for the derivation of spatial motion vector candidates (as shown in the example in FIG. 14). In some embodiments, the reference picture index is signaled to the decoder.

2.2.4 Signaling of Merge/AMVP Information

For the AMVP mode, four parts may be signalled in the bitstream, e.g., prediction direction, reference index, MVD and mv predictor candidate index, which are described in the context of the syntax shown in Table 2-4. While for the merge mode, only a merge index may need to be signalled.

TABLE 2

General slice segment header syntax

| slice_segment_header( ) { | Descriptor |
|---|---|
| ... | |
| if( slice_type == P \|\| slice_type == B ) { | |
|   if( ( weighted_pred_flag && slice_type == P ) \|\| | |
|     ( weighted_bipred_flag && slice_type == B ) ) | |
|     pred_weight_table( ) | |
|   five_minus_max_num_merge_cand | ue(v) |
|   if( motion_vector_resolution_control_idc == 2 ) | |
|     use_integer_mv_flag | u(1) |
| } | |
| ... | |

TABLE 3

Prediction unit syntax

| prediction_unit( x0, y0, nPbW, nPbH ) { | Descriptor |
|---|---|
| if( cu_skip_flag[ x0 ][ y0 ] ) { | |
|   if( MaxNumMergeCand > 1 ) | |
|     merge_idx[ x0 ][ y0 ] | ae(v) |
| } else { /* MODE_INTER */ | |
|   merge_flag[ x0 ][ y0 ] | ae(v) |
|   if( merge_flag[ x0 ][ y0 ] ) { | |
|     if( MaxNumMergeCand > 1 ) | |
|       merge_idx[ x0 ][ y0 ] | ae(v) |
|   } else { | |
|     if( slice_type == B ) | |
|       inter_pred_idc[ x0 ][ y0 ] | ae(v) |
|     if( inter_pred_idc[ x0 ][ y0 ] != PRED_L1 ) { | |
|       if( num_ref_idx_l0_active_minus1 > 0 ) | |
|         ref_idx_l0[ x0 ][ y0 ] | ae(v) |
|       mvd_coding( x0, y0, 0 ) | |
|       mvp_l0_flag[ x0 ][ y0 ] | ae(v) |
|     } | |
|     if( inter_pred_idc[ x0 ][ y0 ] != PRED_L0 ) { | |
|       if( num_ref_idx_l1_active_minus1 > 0 ) | |
|         ref_idx_l1[ x0 ][ y0 ] | ae(v) |
|       if( mvd_l1_zero_flag && | |
|   inter_pred_idc[ x0 ][ y0 ] == PRED_BI ) { | |
|         MvdL1[ x0 ][ y0 ][ 0 ] = 0 | |
|         MvdL1[ x0 ][ y0 ][ 1 ] = 0 | |
|       } else | |
|         mvd_coding( x0, y0, 1 ) | |
|       mvp_l1_flag[ x0 ][ y0 ] | ae(v) |
|     } | |
|   } | |
| } | |

TABLE 4

Motion vector difference syntax

| mvd_coding( x0, y0, refList ) { | Descriptor |
|---|---|
| abs_mvd_greater0_flag[ 0 ] | ae(v) |
| abs_mvd_greater0_flag[ 1 ] | ae(v) |
| if( abs_mvd_greater_flag[ 0 ] ) | |
|   abs_mvd_greater1_flag[ 0 ] | ae(v) |
| if( abs_mvd_greater_flag[ 1 ] ) | |
|   abs_mvd_greater1_flag[ 1 ] | ae(v) |
| if( abs_mvd_greater_flag[ 0 ] ) | |
| { | |
|   if( abs_mvd_greater1_flag[ 0 ] ) | |
|     abs_mvd_minus2[ 0 ] | ae(v) |
|   mvd_sign_flag[ 0 ] | ae(v) |
| } | |
| if( abs_mvd_greater_flag[ 1 ] ) | |
| { | |
|   if( abs_mvd_greater1_flag[ 1 ] ) | |
|     abs_mvd_minus2[ 1 ] | ae(v) |
|   mvd_sign_flag[ 1 ] | ae(v) |
| } | |
| } | |

The corresponding semantics include:

five_minus_max_num_merge_cand specifies the maximum number of merging MVP candidates supported in the slice subtracted from 5. The maximum number of merging MVP candidates, MaxNumMergeCand is derived as follows:

MaxNumMergeCand=5−five_minus_max_num_merge_cand

The value of MaxNumMergeCand shall be in the range of 1 to 5, inclusive.

merge_flag[x0][y0] specifies whether the inter prediction parameters for the current prediction unit are inferred from a neighboring inter-predicted partition. The array indices x0, y0 specify the location (x0, y0) of the top-left luma sample of the considered prediction block relative to the top-left luma sample of the picture.

When merge_flag[x0][y0] is not present, it is inferred as follows:

If CuPredMode[x0][y0] is equal to MODE_SKIP, merge_flag[x0][y0] is inferred to be equal to 1.

Otherwise, merge_flag[x0][y0] is inferred to be equal to 0.

merge_idx[x0][y0] specifies the merging candidate index of the merging candidate list where x0, y0 specify the location (x0, y0) of the top-left luma sample of the considered prediction block relative to the top-left luma sample of the picture.

3. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

3.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector prediction and spatial neighbouring motion vector. In some embodiments, and to preserve more accurate motion field for sub-CU motion prediction, the motion compression for the reference frames may be disabled.

3.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 18:
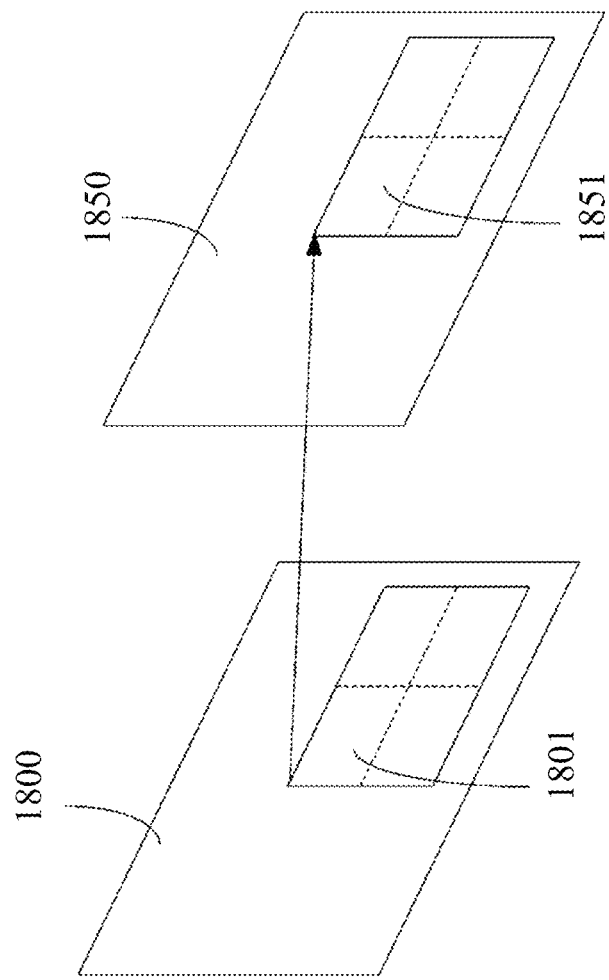
FIG. 18 shows an example of motion prediction using the alternative temporal motion vector prediction (ATMVP) algorithm for a coding unit (CU).
Figure 18:
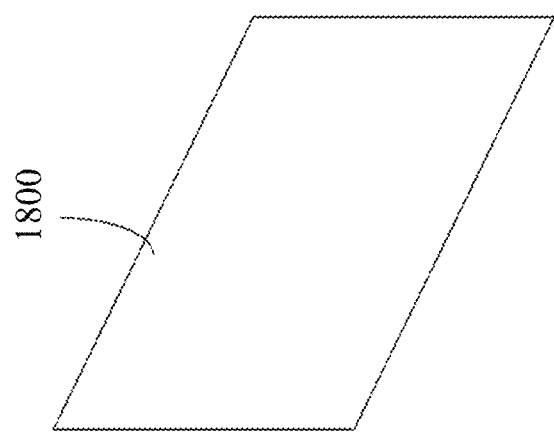

FIG. 18 shows an example of ATMVP motion prediction process for a CU 1800. The ATMVP method predicts the motion vectors of the sub-CUs 1801 within a CU 1800 in two steps. The first step is to identify the corresponding block 1851 in a reference picture 1850 with a temporal vector. The reference picture 1850 is also referred to as the motion source picture. The second step is to split the current CU 1800 into sub-CUs 1801 and obtain the motion vectors as well as the reference indices of each sub-CU from the block corresponding to each sub-CU.

In the first step, a reference picture 1850 and the corresponding block is determined by the motion information of the spatial neighboring blocks of the current CU 1800. To avoid the repetitive scanning process of neighboring blocks, the first merge candidate in the merge candidate list of the current CU 1800 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

Figure 19:
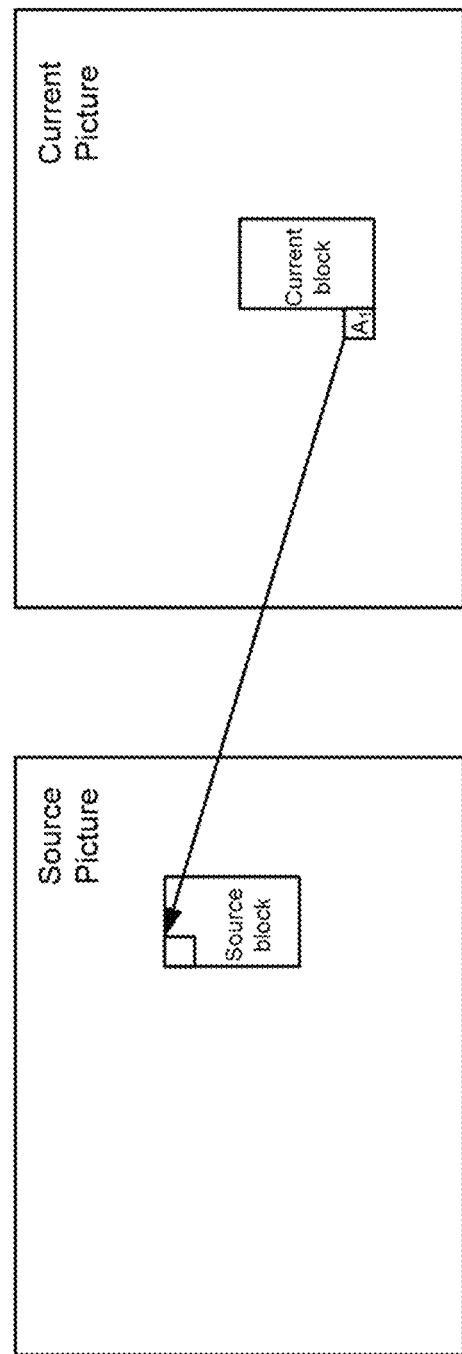
FIG. 19 shows an example of the identification of a source block and source picture.

In one example, if the first merge candidate is from the left neighboring block (i.e., $A_1$ in FIG. 19), the associated MV and reference picture are utilized to identify the source block and source picture.

In the second step, a corresponding block of the sub-CU 1851 is identified by the temporal vector in the motion source picture 1850, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

3.1.2 Examples of Spatial-Temporal Motion Vector Prediction (STMVP)

Figure 20:
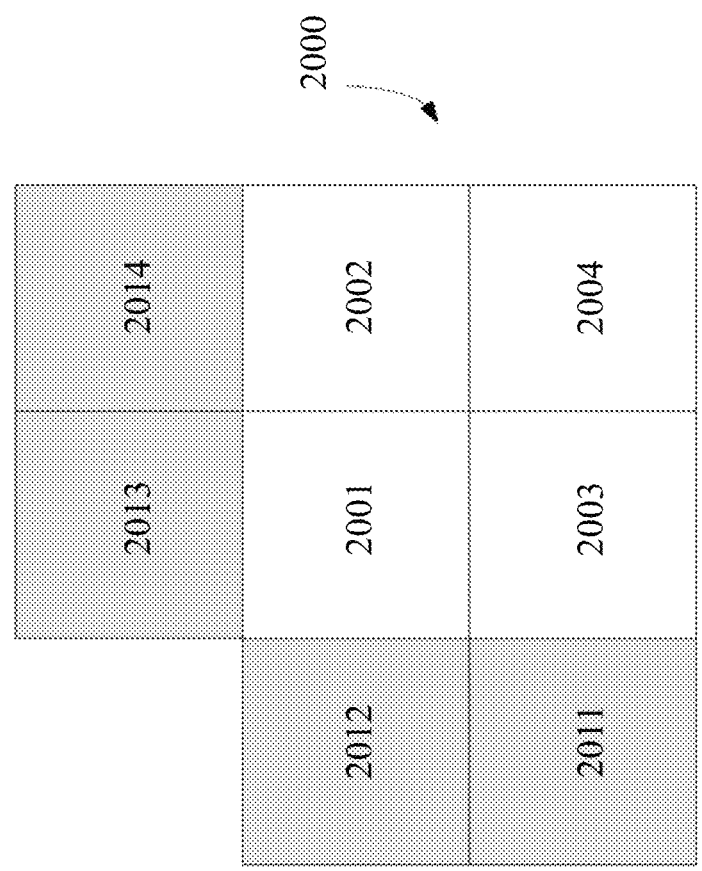
FIG. 20 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 20 shows an example of one CU with four sub-blocks and neighboring blocks. Consider an 8×8 CU 2000 that includes four 4×4 sub-CUs A (2001), B (2002), C (2003), and D (2004). The neighboring 4×4 blocks in the current frame are labelled as a (2011), b (2012), c (2013), and d (2014).

The motion derivation for sub-CU A starts by identifying its two spatial neighbors. The first neighbor is the N×N block above sub-CU A 1101 (block c 2013). If this block c (2013) is not available or is intra coded the other N×N blocks above sub-CU A (2001) are checked (from left to right, starting at block c 2013). The second neighbor is a block to the left of the sub-CU A 2001 (block b 2012). If block b (2012) is not available or is intra coded other blocks to the left of sub-CU A 2001 are checked (from top to bottom, staring at block b 2012). The motion information obtained from the neighboring blocks for each list is scaled to the first reference frame for a given list. Next, temporal motion vector prediction (TMVP) of sub-block A 2001 is derived by following the same procedure of TMVP derivation as specified in HEVC. The motion information of the collocated block at block D 2004 is fetched and scaled accordingly. Finally, after retrieving and scaling the motion information, all available motion vectors are averaged separately for each reference list. The averaged motion vector is assigned as the motion vector of the current sub-CU.

3.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

3.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

3.2.1 Examples of AMVP Candidate List Construction

In JEM, the procedure is similar to the HEVC design. However, when the current block chooses a lower precision of MVs (e.g., integer-precision), rounding operations may be applied. For example, rounding a motion vector can be performed by right or left shifting the motion vector to the motion vector precision of the current block. In the current implementation, after selecting the 2 candidates from spatial positions, if both are available, these two are rounded, followed by pruning.

3.3 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad \text{Eq. (3)}$$

Figure 21:
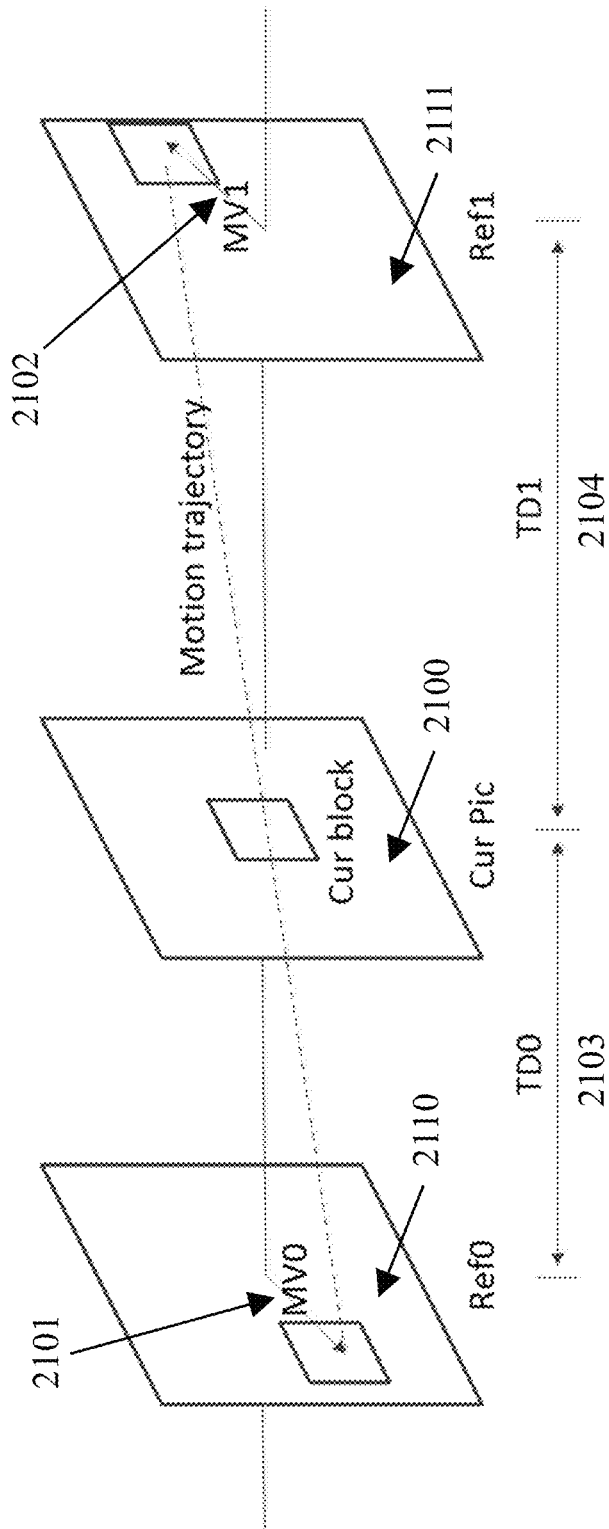
FIG. 21 shows an example of bilateral matching in pattern matched motion vector derivation (PMMVD) mode, which is a special merge mode based on the frame-rate up conversion (FRUC) algorithm.

FIG. 21 shows an example of bilateral matching used in the Frame-Rate Up Conversion (FRUC) method. The bilateral matching is used to derive motion information of the current CU by finding the closest match between two blocks along the motion trajectory of the current CU (2100) in two different reference pictures (2110, 2111). Under the assumption of continuous motion trajectory, the motion vectors MV0 (2101) and MV1 (2102) pointing to the two reference blocks are proportional to the temporal distances, e.g., TD0 (2103) and TD1 (2104), between the current picture and the two reference pictures. In some embodiments, when the current picture 2100 is temporally between the two reference pictures (2110, 2111) and the temporal distance from the current picture to the two reference pictures is the same, the bilateral matching becomes mirror based bi-directional MV.

Figure 22:
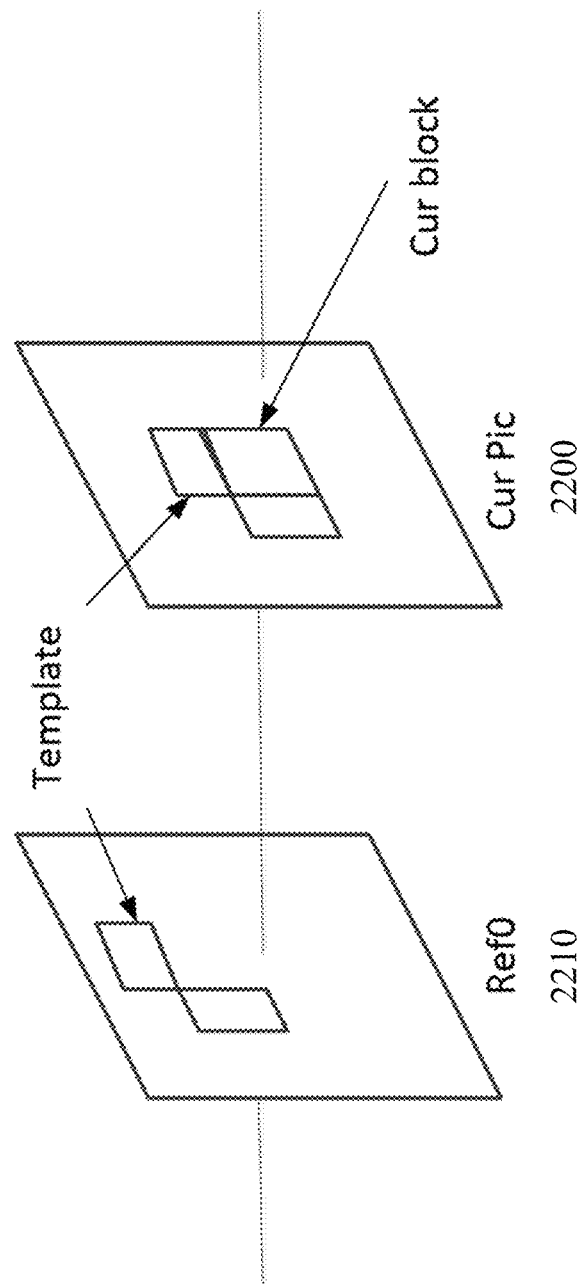
FIG. 22 shows an example of template matching in the FRUC algorithm.

FIG. 22 shows an example of template matching used in the Frame-Rate Up Conversion (FRUC) method. Template matching can be used to derive motion information of the current CU 2200 by finding the closest match between a template (e.g., top and/or left neighboring blocks of the current CU) in the current picture and a block (e.g., same size to the template) in a reference picture 2210. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $ref_a$) at reference list A. Then the reference picture $ref_b$ of its paired bilateral MV is found in the other reference list B so that $ref_a$ and $ref_b$ are temporally at different sides of the current picture. If such a $ref_b$ is not available in reference list B, $ref_b$ is determined as a reference which is different from $ref_a$ and its temporal distance to the current picture is the minimal one in list B. After $ref_b$ is determined, MVb is derived by scaling MVa based on the temporal distance between the current picture and $ref_a$, $ref_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 23:
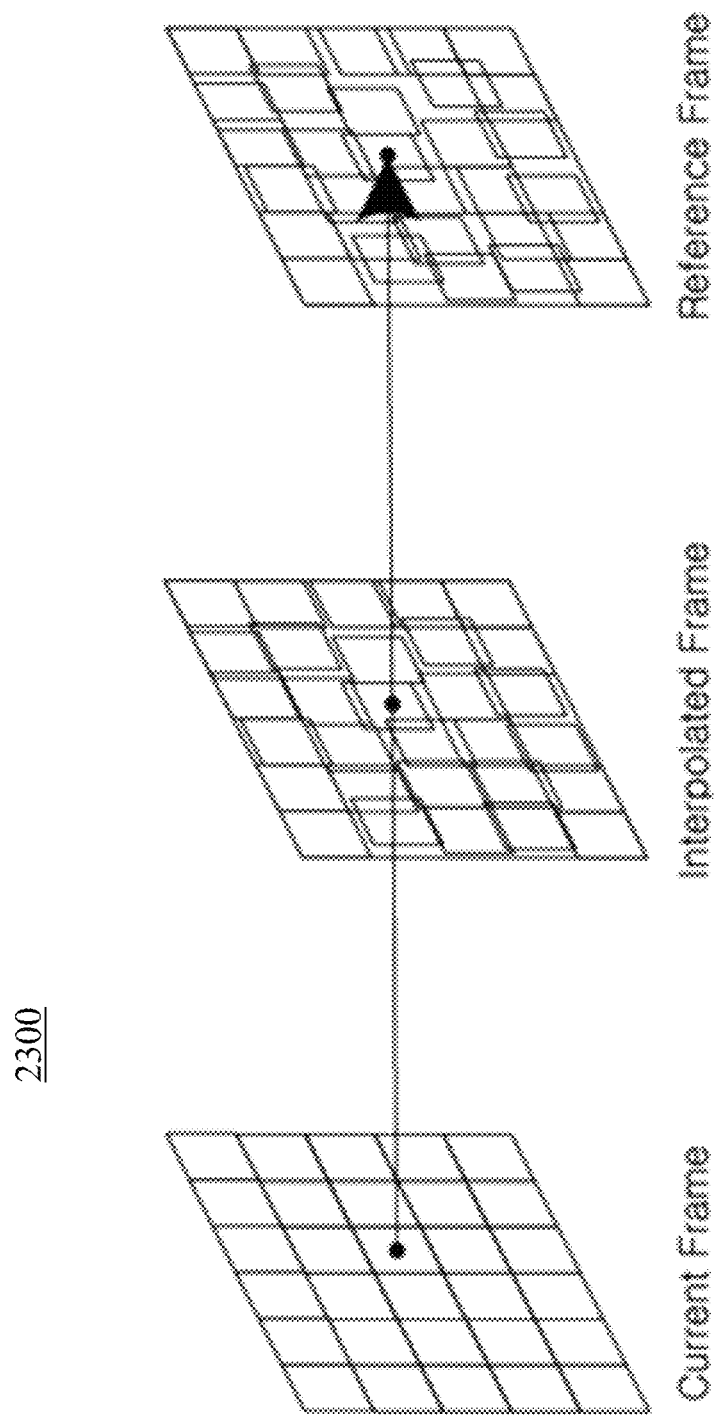
FIG. 23 shows an example of unilateral motion estimation in the FRUC algorithm.

In some embodiments, the motion field of each reference pictures in both reference lists is traversed at 4×4 block level. FIG. 23 shows an example of unilateral Motion Estimation (ME) 2300 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \qquad \text{Eq. (4)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor*min (cost0, cost1)
bi-prediction is used;
Otherwise, if cost0<=cost1
uni-prediction from list0 is used;
Otherwise,
uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

3.4 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 24:
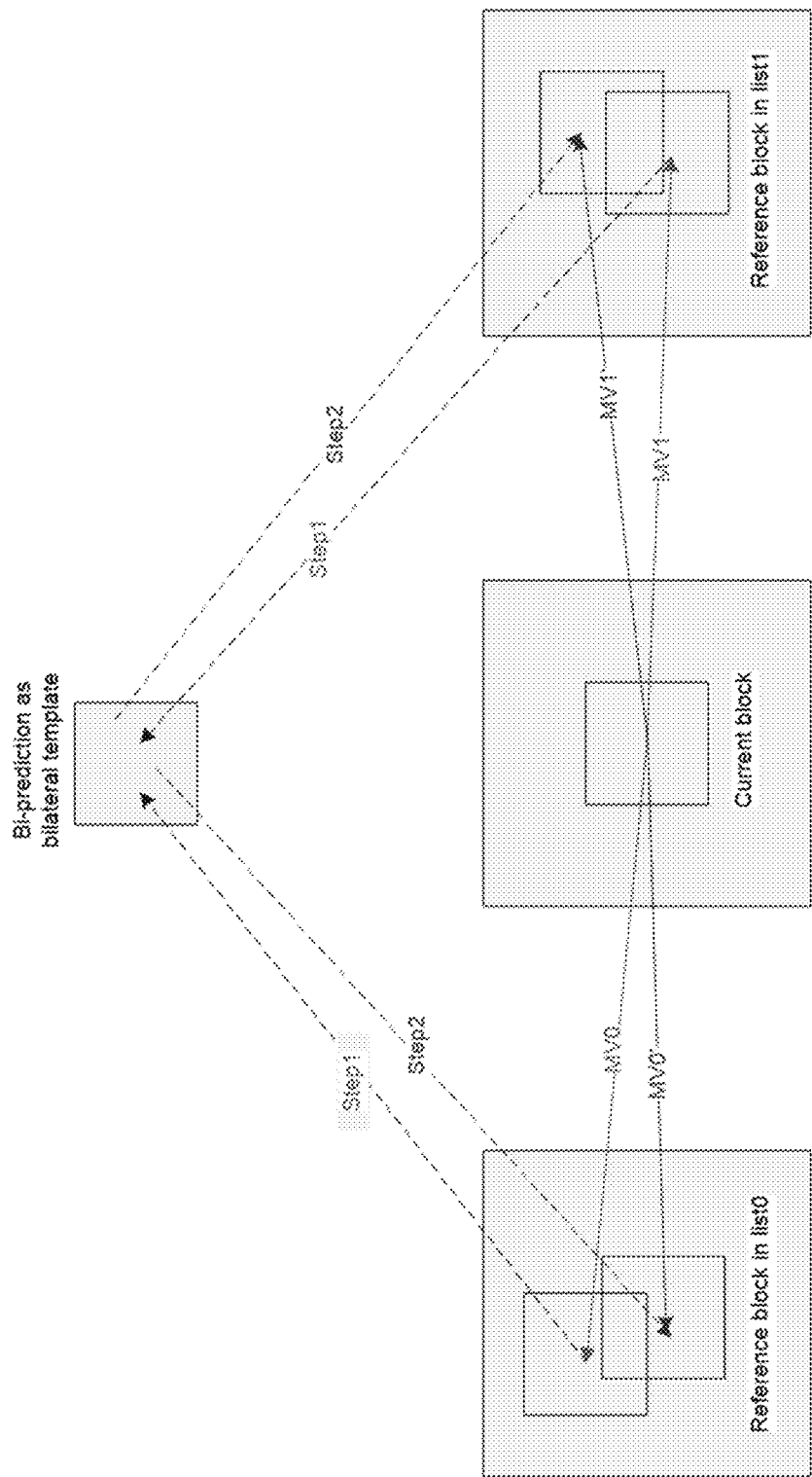
FIG. 24 shows an example of the decoder-side motion vector refinement (DMVR) algorithm based on bilateral template matching.

In DMVR, a bilateral template is generated as the weighted combination (i.e. average) of the two prediction blocks, from the initial MV0 of list0 and MV1 of list1, respectively, as shown in FIG. 24. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

3.5 Local Illumination Compensation

Local Illumination Compensation (IC) is based on a linear model for illumination changes, using a scaling factor a and an offset b. And it is enabled or disabled adaptively for each inter-mode coded coding unit (CU).

Figure 25:
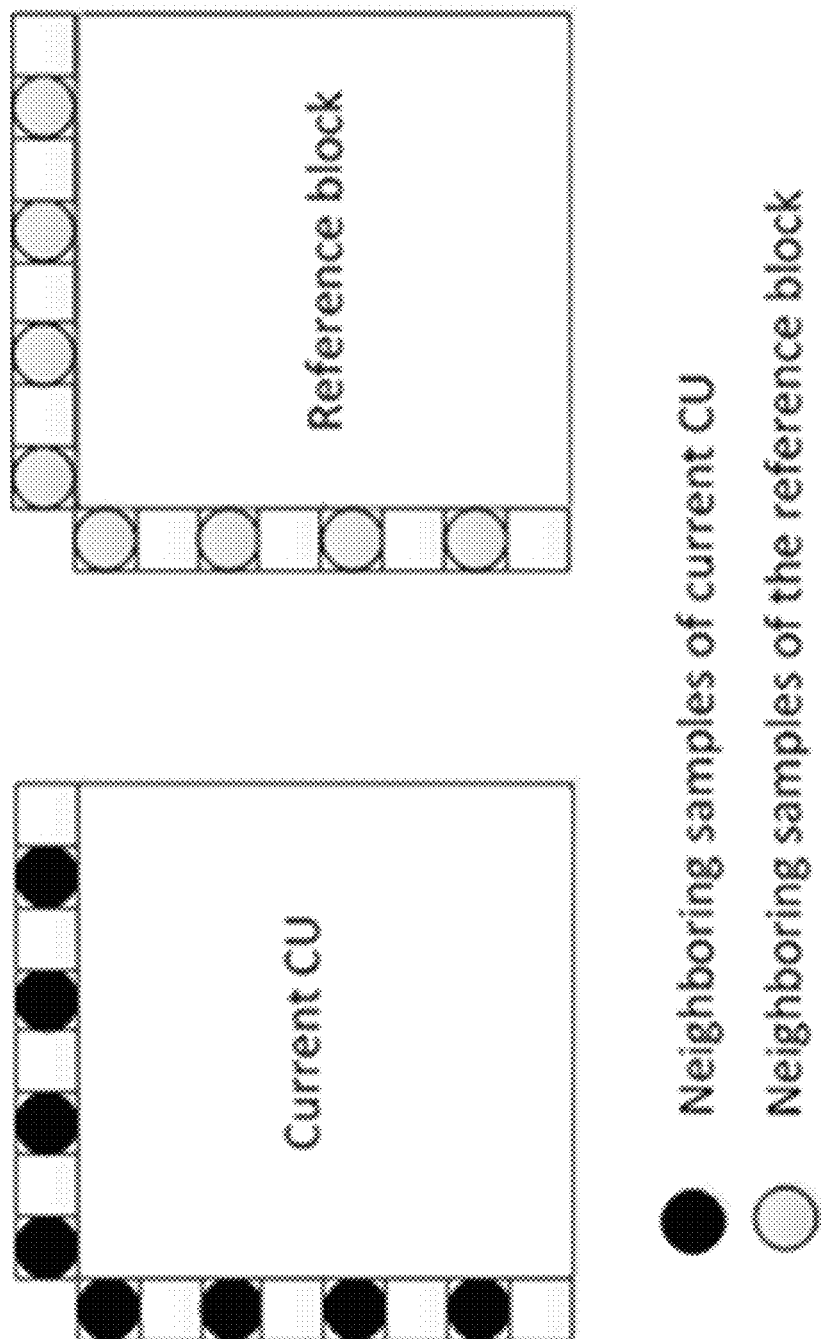
FIG. 25 shows an example of neighboring samples used for deriving illumination compensation (IC) parameters.
Figure 26:
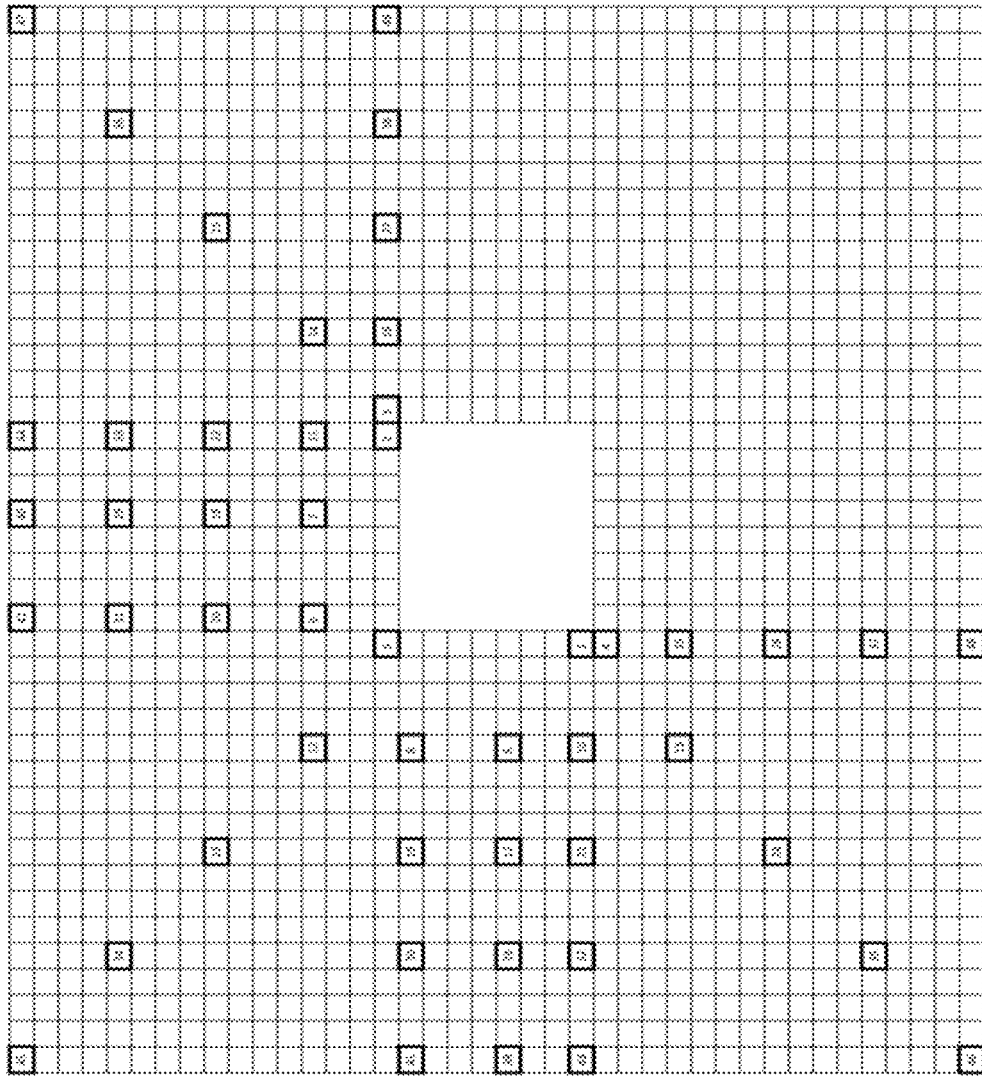
FIG. 26 shows an example of neighboring blocks used to derive the spatial merge candidates.

When IC applies for a CU, a least square error method is employed to derive the parameters a and b by using the neighbouring samples of the current CU and their corresponding reference samples. More specifically, as illustrated in FIG. 25, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the IC flag is copied from neighbouring blocks, in a way similar to motion information copy in merge mode; otherwise, an IC flag is signalled for the CU to indicate whether LIC applies or not.

When IC is enabled for a picture, additional CU level RD check is needed to determine whether LIC is applied or not for a CU. When IC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM. IC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, IC is disabled for the current picture; otherwise, IC is enabled for the current picture.

3.6 Examples of Merge/Skip Mode with Bilateral Matching Refinement

A merge candidate list is first constructed by inserting the motion vectors and reference indices of the spatial neighboring and temporal neighboring blocks into the candidate list with redundancy checking until the number of the available candidates reaches the maximum candidate size of 19. The merge candidate list for the merge/skip mode is constructed by inserting spatial candidates, temporal candidates, affine candidates, advanced temporal MVP (ATMVP) candidate, spatial temporal MVP (STMVP) candidate and the additional candidates as used in HEVC (Combined candidates and Zero candidates) according to a pre-defined insertion order, and in the context of the numbered blocks shown in FIG. 25:

(1) Spatial candidates for blocks 1-4

(2) Extrapolated affine candidates for blocks 1-4

(3) ATMVP (4) STMVP (5) Virtual affine candidate (6) Spatial candidate (block 5) (used only when the number of the available candidates is smaller than 6)

(7) Extrapolated affine candidate (block 5)

(8) Temporal candidate (derived as in HEVC)

(9) Non-adjacent spatial candidate followed by extrapolated affine candidate (blocks 6 to 49)

(10) Combined candidates

(11) Zero candidates

It may be noted that IC flags are also inherited from merge candidates except for STMVP and affine. Moreover, for the first four spatial candidates, the bi-prediction ones are inserted before the ones with uni-prediction.

4. Examples of Binarization Methods and Merge Index Coding

In some embodiments, several binarization methods could be selected. For one syntax element, the related value should be firstly binarized to a bin string based on the distribution. For each bin, it may be coded with context or bypass coding methods.

4.1 Exemplary Unary and Truncated Unary (TU) Binarization Process

For each unsigned integer valued symbol $x \geq 0$ the unary code word in CABAC consists of x "1" bits plus a terminating "0" bit. The truncated unary (TU) code is only defined for x with $0 \leq x \leq S$, where for $x<S$ the code is given by the unary code, whereas for $x=S$ the terminating "0" bit is neglected such that the TU code of $x=S$ is given by codeword consisting of x "1" bits only.

TABLE 5

| | Bin string of the unary binarization | | | | | |
|---|---|---|---|---|---|---|
| prefix Val | | | Bin string | | | |
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| . . . | | | | | | |
| binIdx | 0 | 1 | 2 | 3 | 4 | 5 |

TABLE 6

Bin string of the truncated unary binarization

| prefix Val | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| binIdx | 0 | 1 | 2 | 3 | 4 | 5 |

4.2 Exemplary K-Th Order Exp-Golomb (EGk) Binarization Process

For the EGk binarization the number of symbols having the same code length of $k+2\cdot l(x)+1$ is geometrically growing. By inverting Shannon's relationship between ideal code length and symbol probability, we can e.g. easily deduce that EG0 is the optimal code for a pdf $p(x)=\frac{1}{2}\cdot(x+1)-2$ with $x\geq 0$. This implies that for an appropriately chosen parameter k the EGk code represents a fairly good first-order approximation of the ideal prefix-free code for tails of typically observed pdfs.

TABLE 7

Bin string of the EG0 binarization

| prefix Val | K = 0 Bin string | | | | | | |
|---|---|---|---|---|---|---|---|
| 0 | 0 | | | | | | |
| 1 | 1 | 0 | 0 | | | | |
| 2 | 1 | 0 | 1 | | | | |
| 3 | 1 | 1 | 0 | 0 | 0 | | |
| 4 | 1 | 1 | 0 | 0 | 1 | | |
| 5 | 1 | 1 | 0 | 1 | 0 | | |
| 6 | 1 | 1 | 0 | 1 | 1 | | |
| 7 | 1 | 1 | 1 | 0 | 0 | 0 | 0 |
| ... | | | | | | | |
| binIdx | 0 | 1 | 2 | 3 | 4 | 5 | 6 |

4.3 Exemplary Truncated Rice (TR) Binarization Process

Input to this process is a request for a TR binarization, cMax, and cRiceParam.

Output of this process is the TR binarization associating each value symbolVal with a corresponding bin string.

A TR bin string is a concatenation of a prefix bin string and, when present, a suffix bin string.

For the derivation of the prefix bin string, the following applies:

The prefix value of symbolVal, prefixVal, is derived as follows:

prefixVal=symbolVal>>cRiceParam

The prefix of the TR bin string is specified as follows:

If prefixVal is less than cMax>>cRiceParam, the prefix bin string is a bit string of length prefixVal+1 indexed by binIdx. The bins for binIdx less than prefixVal are equal to 1. The bin with binIdx equal to prefixVal is equal to 0.

When cMax is greater than symbolVal and cRiceParam is greater than 0, the suffix of the TR bin string is present and it is derived as follows:

The suffix value suffixVal is derived as follows:

suffixVal=symbolVal−((prefixVal)<<cRiceParam)

The suffix of the TR bin string is specified by invoking the fixed-length (FL) binarization process for suffixVal with a cMax value equal to (1<<cRiceParam)−1.

Note that for the input parameter cRiceParam=0 the TR binarization is exactly a truncated unary binarization and it is always invoked with a cMax value equal to the largest possible value of the syntax element being decoded.

4.4 Exemplary Fixed-Length (FL) Binarization Process

Inputs to this process are a request for a FL binarization and cMax.

Output of this process is the FL binarization associating each value symbolVal with a corresponding bin string.

FL binarization is constructed by using the fixedLength-bit unsigned integer bin string of the symbol value symbolVal, where fixedLength=Ceil(Log2(cMax+1)). The indexing of bins for the FL binarization is such that the binIdx=0 relates to the most significant bit with increasing values of binIdx towards the least significant bit.

TABLE 8

Bin string of the FL binarization (cMax = 7)

| prefixVal | Bin String | | |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| ... | | | |
| binIdx | 0 | 1 | 2 |

4.5 Exemplary Coding of merge_idx

As specified in the HEVC specification, the merge index is firstly binarized to a bin string if the total number of allowed merge candidate is larger than 1.

TABLE 9 binarization and ways of coding bins for merge_idx

| merge_idx[ ][ ] | TR/TU | cMax = MaxNumMergeCand − 1, cRiceParam = 0 | | | |
|---|---|---|---|---|---|

| | binIdx | | | | |
|---|---|---|---|---|---|
| Syntax element | 0 | 1 | 2 | 3 | 4 | >=5 |
| merge_idx[ ][ ] | 0 | bypass | bypass | bypass | n/a | N/a |

TR with cRiceParam equal to 0, i.e., TU is used. The first bin of merge_idx is coded with one context and the remaining bins, if exist, are coded with bypass.

5 Example Embodiments of Intra Prediction in JEM

5.1 Examples of Intra Mode Coding with 67 Intra Prediction Modes

To capture the arbitrary edge directions presented in natural video, the number of directional intra modes is extended from 33, as used in HEVC, to 65. The additional directional modes are depicted as light grey dotted arrows in FIG. 27, and the planar and DC modes remain the same. These denser directional intra prediction modes apply for all block sizes and for both luma and chroma intra predictions.

5.2 Examples of Luma Intra Mode Coding

Figure 27:
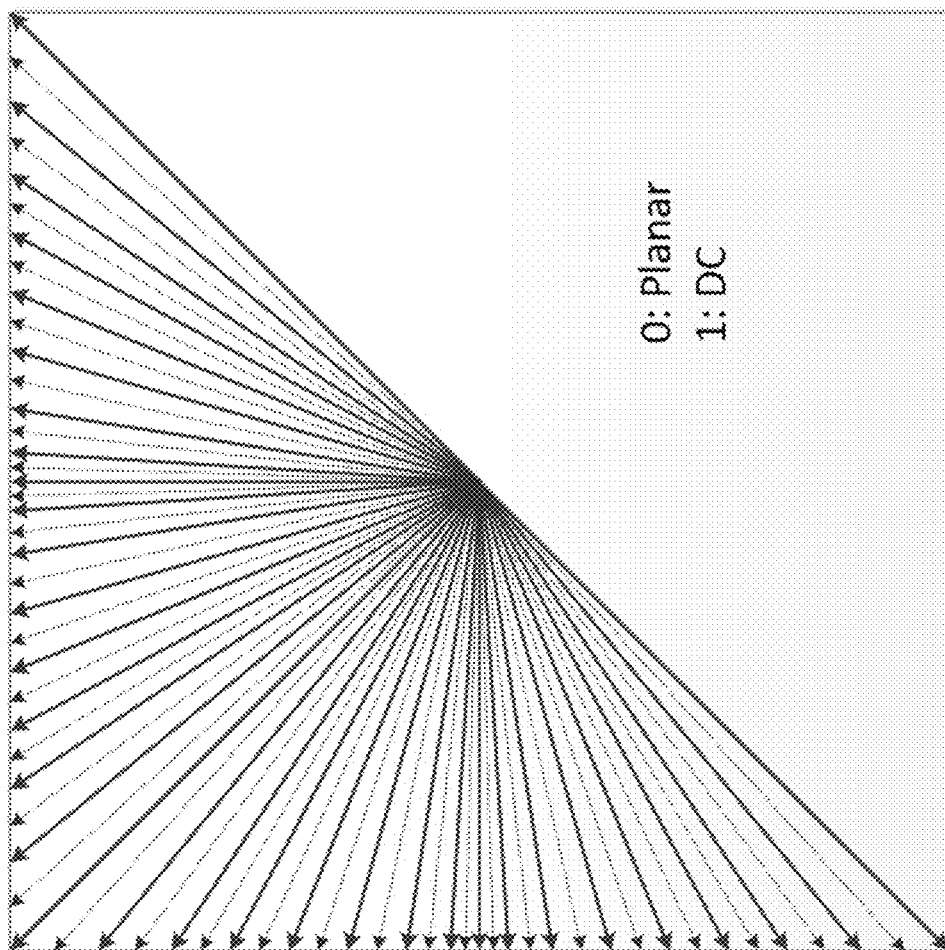
FIG. 27 shows an example of the proposed 67 intra prediction modes.

In JEM, the total number of intra prediction modes has been increased from 35 in HEVC to 67. FIG. 27 depicts the examples of the 67 intra prediction modes.

To accommodate the increased number of directional intra modes, an intra mode coding method with 6 Most Probable Modes (MPMs) is used. Two major technical aspects are involved: 1) the derivation of 6 MPMs, and 2) entropy coding of 6 MPMs and non-MPM modes.

Figure 28:
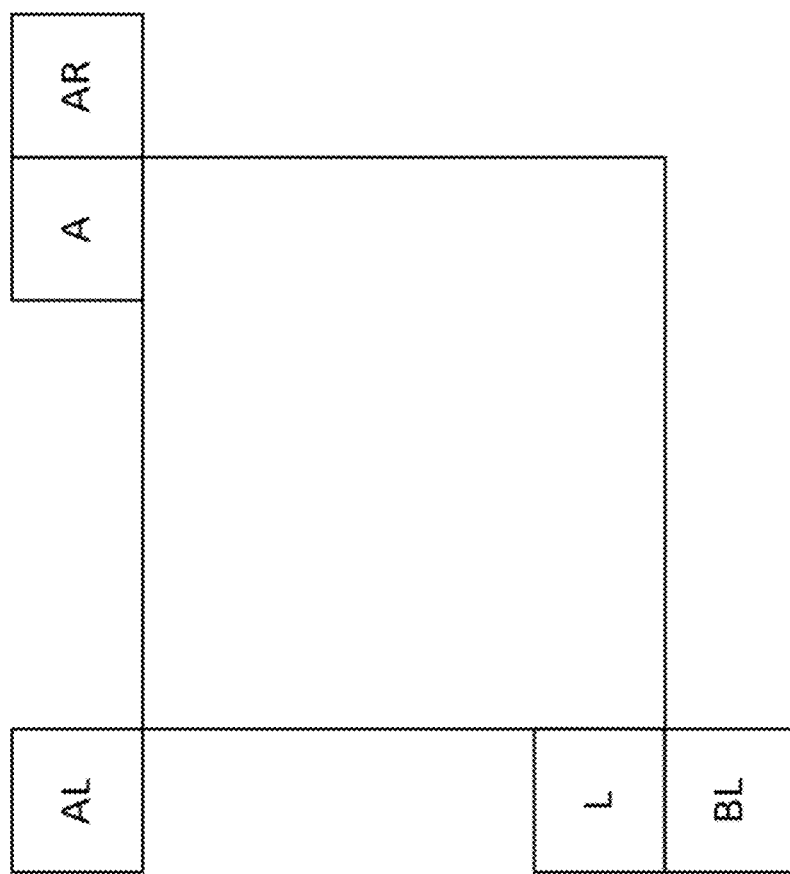
FIG. 28 shows an example of neighboring blocks for Most Probable Mode derivation.

In the JEM, the modes included into the MPM lists are classified into three groups:
  Neighbor intra modes
  Derived intra modes
  Default intra modes Five neighbouring intra prediction modes are used to form the MPM list. Those locations of the 5 neighbouring blocks are the same as those used in the merge mode, i.e., left (L), above (A), below-left (BL), above-right (AR), and above-left (AL) as shown in FIG. 28. An initial MPM list is formed by inserting 5 neighbour intra modes and the planar and DC modes into the MPM list. A pruning process is used to remove duplicated modes so that only unique modes can be included into the MPM list. The order in which the initial modes are included is: left, above, planar, DC, below-left, above-right, and then above-left. For example, pruning may includes operations of (a) comparing with existing entries for uniqueness, then (b) if unique, then adding to the list, and (c) if not unique, then either (c1) not adding or (c2) adding and deleting existing entry that matched such that, after addition, number of entries does not increase.

If the MPM list is not full (i.e., there are less than 6 MPM candidates in the list), derived modes are added; these intra modes are obtained by adding −1 or +1 to the angular modes that are already included in the MPM list. Such additional derived modes are not generated from the non-angular modes (DC or planar).

Finally, if the MPM list is still not complete, the default modes are added in the following order: vertical, horizontal, mode 2, and diagonal mode. As a result of this process, a unique list of 6 MPM modes is generated.

For entropy coding of the selected mode using the 6 MPMs, a truncated unary binarization is used. The first three bins are coded with contexts that depend on the MPM mode related to the bin currently being signalled. The MPM mode is classified into one of three categories: (a) modes that are predominantly horizontal (i.e., the MPM mode number is less than or equal to the mode number for the diagonal direction), (b) modes that are predominantly vertical (i.e., the MPM mode is greater than the mode number for the diagonal direction), and (c) the non-angular (DC and planar) class. Accordingly, three contexts are used to signal the MPM index based on this classification.

The coding for selection of the remaining 61 non-MPMs is done as follows. The 61 non-MPMs are first divided into two sets: a selected mode set and a non-selected mode set. The selected modes set contains 16 modes and the rest (45 modes) are assigned to the non-selected modes set. The mode set that the current mode belongs to is indicated in the bitstream with a flag. If the mode to be indicated is within the selected modes set, the selected mode is signalled with a 4-bit fixed-length code, and if the mode to be indicated is from the non-selected set, the selected mode is signalled with a truncated binary code. The selected modes set is generated by sub-sampling the 61 non-MPM modes as follows:
  Selected modes set={0, 4, 8, 12, 16, 20 . . . 60}
  Non-selected modes set={1, 2, 3, 5, 6, 7, 9, 10 . . . 59}

At the encoder side, the similar two-stage intra mode decision process of HM is used. In the first stage, i.e., the intra mode pre-selection stage, a lower complexity Sum of Absolute Transform Difference (SATD) cost is used to pre-select N intra prediction modes from all the available intra modes. In the second stage, a higher complexity R-D cost selection is further applied to select one intra prediction mode from the N candidates. However, when 67 intra prediction modes is applied, since the total number of available modes is roughly doubled, the complexity of the intra mode pre-selection stage will also be increased if the same encoder mode decision process of HM is directly used. To minimize the encoder complexity increase, a two-step intra mode pre-selection process is performed. At the first step, N (N depends on intra prediction block size) modes are selected from the original 35 intra prediction modes (indicated by black solid arrows in FIG. 27) based on the Sum of Absolute Transform Difference (SATD) measure; At the second step, the direct neighbours (additional intra prediction directions as indicated by light grey dotted arrows in FIG. 27) of the selected N modes are further examined by SATD, and the list of selected N modes are updated. Finally, the first M MPMs are added to the N modes if not already included, and the final list of candidate intra prediction modes is generated for the second stage R-D cost examination, which is done in the same way as HM. The value of M is increased by one based on the original setting in the HM, and N is decreased somewhat as shown below in Table 10.

TABLE 10

Number of mode candidates at the intra mode pre-selection step

| | Intra prediction block size | | | | | |
|---|---|---|---|---|---|---|
| | 4 × 4 | 8 × 8 | 16 × 16 | 32 × 32 | 64 × 64 | >64 × 64 |
| HM | 8 | 8 | 3 | 3 | 3 | 3 |
| JEM with 67 intra prediction modes | 7 | 7 | 2 | 2 | 2 | 2 |

5.3 Examples of Chroma Intra Mode Coding

Figure 29A:
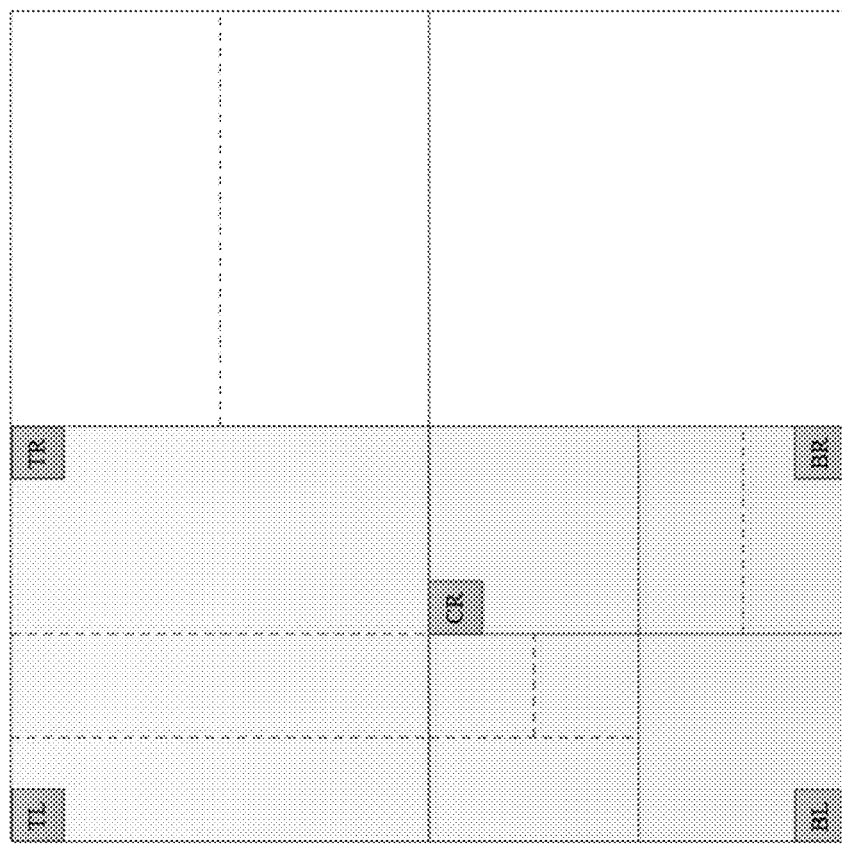
FIGS. 29A and 29B show the corresponding luma and chroma sub-blocks in an I-slice with the QTBT structure.
Figure 29B:
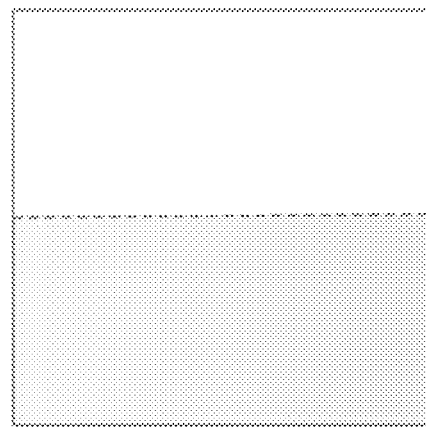

In the JEM, a total of 11 intra modes are allowed for chroma CB coding. Those modes include 5 traditional intra modes and 6 cross-component linear model modes. The list of chroma mode candidates includes the following three parts:
  CCLM modes
  DM modes, intra prediction modes derived from luma CBs covering the collocated five positions of the current chroma block
    The five positions to be checked in order are: center (CR), top-left (TL), top-right (TR), bottom-left (BL) and bottom-right (BR) 4×4 block within the corresponding luma block of current chroma block for I slices. For P and B slices, only one of these five sub-blocks is checked since they have the same mode index. An example of five collocated luma positions is shown in FIG. 29.
  Chroma prediction modes from spatial neighbouring blocks:
    5 chroma prediction modes: from left, above, below-left, above-right, and above-left spatially neighbouring blocks
  Planar and DC modes
  Derived modes are added, these intra modes are obtained by adding −1 or +1 to the angular modes which are already included into the list
  Vertical, horizontal, mode 2

A pruning process is applied whenever a new chroma intra mode is added to the candidate list. The non-CCLM chroma intra mode candidates list size is then trimmed to 5. For the mode signalling, a flag is first signalled to indicate whether one of the CCLM modes or one of the traditional chroma intra prediction mode is used. Then a few more flags may follow to specify the exact chroma prediction mode used for the current chroma CBs.

6. Examples of Existing Implementations

The current HEVC design could take the correlation of current block its neighbouring blocks (next to the current block) to better code the motion information. However, it is possible that that the neighbouring blocks correspond to different objects with different motion trajectories. In this case, prediction from its neighbouring blocks is not efficient.

Prediction from motion information of non-adjacent blocks could bring additional coding gain with the cost of storing all the motion information (typically on 4×4 level) into cache which significantly increase the complexity for hardware implementation.

Unary binarization method works fine for smaller number of allowed merge candidates. However, when the total number of allowed candidate becomes larger, the unary binarization may be sub-optimal.

The HEVC design of AMVP candidate list construction process only invokes pruning among two spatial AMVP candidates. Full pruning (each of the available candidate compared to all others) is not utilized since there is negligible coding loss due to limited pruning. However, if there are more AMVP candidates available, pruning becomes important. Also, when LAMVR is enabled, how to construct the AMVP candidate list should be studied.

7. Example Methods for LUT-Based Motion Vector Prediction

To overcome the drawbacks of existing implementations, LUT-based motion vector prediction techniques using one or more look up tables with at least one motion candidate stored to predict motion information of a block can be implemented in various embodiments to provide video coding with higher coding efficiencies. Each LUT can include one or more motion candidates, each associated with corresponding motion information. Motion information of a motion candidate can include partial or all of the prediction direction, reference indices/pictures, motion vectors, LIC flags, affine flags, Motion Vector Derivation (MVD) precisions, and/or MVD values. Motion information may further include the block position information to indicate where the motion information is coming from.

The LUT-based motion vector prediction based on the disclosed technology, which may enhance both existing and future video coding standards, is elucidated in the following examples described for various implementations. Because the LUTs allow the encoding/decoding process to be performed based on historical data (e.g., the blocks that have been processed), the LUT-based motion vector prediction can also be referred to as History-based Motion Vector Prediction (HMVP) method. In the LUT-based motion vector prediction method, one or multiple tables with motion information from previously coded blocks are maintained during the encoding/decoding process. During the encoding/decoding of one block, the associated motion information in LUTs may be used (e.g., by being added to the motion candidate lists) depending on the coding characteristics of the block. After encoding/decoding the block, LUTs may be updated based on the coding characteristics of the block. That is, the updating of LUTs is based on the encoding/decoding order. The examples of the disclosed technology provided below explain general concepts and are not meant to be interpreted as limiting. In an example, unless explicitly indicated to the contrary, the various features described in these examples may be combined.

With regard to terminology, the following examples an entry of a LUT is a motion candidate. The term motion candidate is used to indicate a set of motion information stored in a look up table. For conventional AMVP or merge modes, AMVP or merge candidates are used for storing the motion information. For example, in some embodiments, motion information can be derived by adding motion vector differences to an AMVP candidate. As will be described below, and in a non-limiting example, the notion of LUTs with motion candidates for motion vector prediction is extended to LUTs with intra prediction modes for intra mode coding, or extended to LUTs with illumination compensation parameters for IC parameter coding or extended to LUTs with filter parameters. The LUT based methods for motion candidates may be extended to other types of coding information, as described in this patent document, existing and future video coding standards.

Examples 1 and 2 advantageously define LUTs as used in the disclosed technology.

Example 1. In one example, the table size (e.g., the number of maximally allowed entries of motion candidates) and/or number of tables may depend on sequence resolution, largest coding unit size, size of merge candidate lists.
  (a) In one example, there is no additional signaling of the table size.
  (b) The table size is inferred to be the same as the signaled maximum merge candidates.
  (c) Alternatively, the table size is inferred to be the same as the signaled maximum merge candidates minus a certain value. The certain value may be defined as how many spatial/temporal neighboring blocks may be accessed in the merge candidate list construction process, e.g., 5 in HEVC.

Example 2. Multiple LUTs may be constructed with different roles.
  (a) In one example, one LUT ($1^{st}$ LUT) may include motion candidates with purely motion information from AMVP coded blocks; and another LUT ($2^{nd}$ LUT) may include motion information from both AMVP and merge coded blocks.
  (b) In one example, one LUT ($1^{st}$ LUT) may include motion candidates with purely uni-prediction; and another LUT ($2^{nd}$ LUT) may include motion candidates with bi-prediction.
  (c) When coding a block, a checking order of LUTs may be defined. For each LUT, multiple motion candidates may be first checked before visiting a second LUT. In one example, for the above case, when coding a block, motion candidates from the $2^{nd}$ LUT are firstly checked, followed by those from the $1^{st}$ LUT, or vice versa.

Examples 3-5 advantageously describe update procedures as used in embodiments of the disclosed technology.

Example 3. A LUT can be updated with motion information associated with the block based on a coding characteristic of the block. For example, the block can be coded with merge or AMVP mode.
  (a) In one example, none of the LUTs is updated after coding/decoding a block with intra mode. In another example, none of the LUTs is updated after coding/decoding a block with intra block copy mode. That is, in some embodiments, the LUTs may be updated only after coding/decoding an inter-coded block.
  (b) In yet another example, none of the LUTs is updated after coding/decoding a block with an affine mode (e.g., affine merge or affine AMVP mode). That is, the LUTs may be updated after coding/decoding a non-affine coded block.

Example 4. Before updating a LUT by adding a motion candidate obtained from a coded block, pruning may be applied.

(a) In one example, the new motion candidate to be added need to be pruned to all existing motion candidates in selected tables. That is, the new motion candidate is compared against all existing motion candidates in selected tables to make sure that there are no duplicated candidates.

(b) Alternatively, the new motion candidates may be only pruned to a certain number of existing motion candidates. For example, it may be compared against the last m motion candidates (m is an integer) in a LUT before selectively adding it as the last entry of the LUT.

(c) In some embodiments, the selected table is the one that is used to construct the motion candidate list for the coded block where the motion candidate is obtained from. In some embodiments, the motion candidate can be used to update partial or all of available LUTs.

Example 5. A LUT may be updated periodically.

(a) A LUT may be updated after coding/decoding a given region size. It means that all blocks within a region will use the same LUT.

(b) In one example, a LUT is updated after coding/decoding every N LCUs, N is an integer like 1 or 2.

(c) In one example, a LUT is updated after coding/decoding every N CUs, N is an integer like 4 or 8. Alternatively, a LUT is updated after coding/decoding every N inter-coded CUs, N is an integer like 4 or 8.

(d) When there are multiple blocks with motion information which may be used to update LUTs, only the last block in coding/decoding order may be used to update LUTs.

(i) Alternatively, only the last block in coding/decoding order that is coded with motion information and allowed to update LUTs may be utilized to update LUTs.

(ii) Alternatively, all blocks that are coded with motion information and allowed to update LUTs may be utilized to update LUTs.

Examples 6-11 advantageously describe using the LUTs in embodiments of the disclosed technology.

Example 6. A LUT may be used when a block is coded with merge or AMVP mode.

(a) In one example, a LUT may not be used when the block is coded with intra mode.

(b) In one example, a LUT may not be used when the block is coded with intra block copy mode.

(c) In one example, a LUT may not be used when the block is coded with affine merge or affine AMVP mode.

(d) The numbers of motion candidates in a LUT to be checked for an AMVP-coded block and a merge coded block may be different.

(i) In one example, the two numbers are set to be the same (e.g., 16, 44).

(ii) Alternatively, the two numbers could be different.

(iii) Alternatively, the number of motion candidates to be checked for an AMVP-coded block should be smaller than that for a merge coded block (e.g., 4 and 16 for AMVP and merge coded blocks, respectively).

(iv) In one example, the two numbers may depend on the LUT size and the maximally allowed AMVP and/or merge candidate number.

Example 7. When a block with certain information, e.g., block mode, is not allowed to use the information from LUTs (such as sub-block coded blocks), the coded motion information associated with the block is not allowed to update LUTs. That is, after coding or decoding such a block, the process of updating LUTs is skipped.

(a) Alternatively, a block, with certain conditions satisfied (such as block mode equal to e.g., affine, or block size equal to e.g., 4×4, or other conditions), is not allowed to use the information from LUTs, but the coded motion information is allowed to update LUTs. (write mode only, only allowed to write to the LUTs)

(b) Alternatively, if the coded motion information of a block with certain conditions satisfied (e.g., the block is triangular prediction mode coded) is not allowed to update LUTs, but the coding/decoding process may still use motion candidates from LUTs. (read mode only, only allowed to read from the LUTs).

(c) In one example, the affine coded blocks are disallowed to use motion candidates from LUTs. Meanwhile, the affine motion are disallowed to update LUTs, i.e., motion candidates couldn't be affine motion.

(i) Alternatively, the derived motion (by affine model) of some sub-blocks (within the current block) are allowed to update LUTs. That is, the motion candidates includes motion information derived from the motion information of the current block.

(ii) Alternatively, LUTs are allowed to be used for deriving the affine model parameters. In this case, the position of blocks are also stored in the LUTs.

Example 8. When there are multiple look up tables, different checking orders of motion candidates in multiple tables may be applied.

(a) For certain blocks, it uses the first m motion candidates from the first LUT, and then check the last n motion candidates (most recently added) from the second LUT. Both m and n are positive integers (>0).

(b) For the first LCU in a new LCU row, it uses the last m motion candidates from the first LUT, and then check the first n motion candidates (most recently) from the second LUT. Both m and n are positive integers (>0).

(c) The certain blocks may be defined as the first LCU in a new LCU row or first coding block in a new LCU row or for coding blocks covering the samples in the first column of the slice.

Example 9. The LUT-based motion vector coding method may be combined with the non-adjacent candidates (e.g., merge candidates or AMVP candidates).

(a) In one example, m non-adjacent candidates and n motion candidates from LUTs may be added. Both m and n are positive integers (>0).

(b) In one example, m non-adjacent blocks may be checked and n motion candidates from LUTs may be checked. It should be noted, when a block is checked or a motion candidate is checked, it is possible that none will be added to the (e.g., merge) candidate list.

(c) In one example, the non-adjacent candidates and motion candidates from LUTs may be added in an interleaved way.

(i) The order of checking non-adjacent blocks is kept unchanged. One candidate from one non-adjacent block is followed by a motion candidate from a LUT.

(ii) The order of checking non-adjacent blocks is kept unchanged. However, if one non-adjacent block is located outside a certain range (e.g., outside the current LCU row), it would be replaced by a motion candidate in a LUT.

(iii) In one example, the order of checking non-adjacent blocks is kept unchanged. However, if one non-adjacent block is coded with intra mode or intra block copy mode, it would be replaced by a motion candidate in a LUT.

Figure 30:
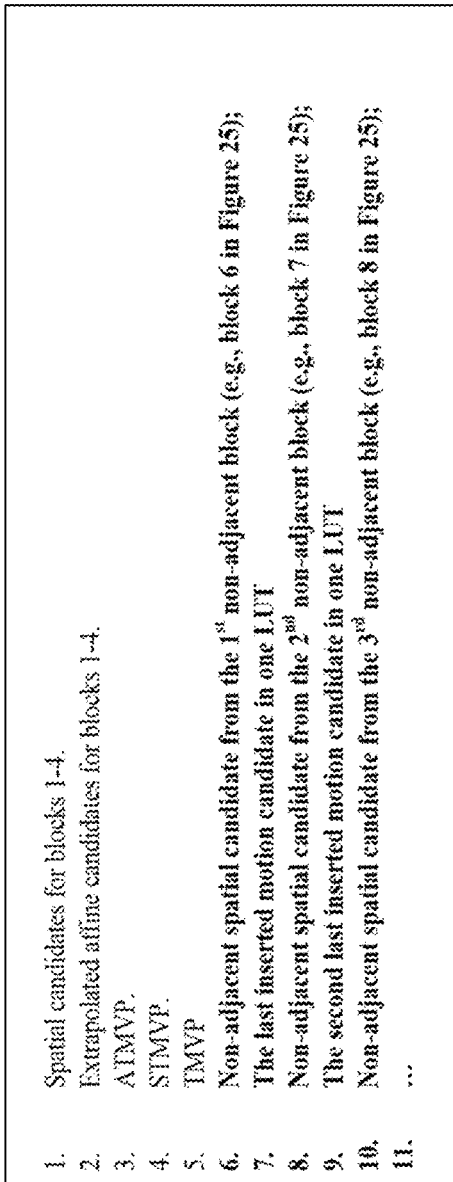
FIG. 30 shows an example of iterative insertion of candidates from non-adjacent blocks and look-up tables (LUTs).
Figure 31:
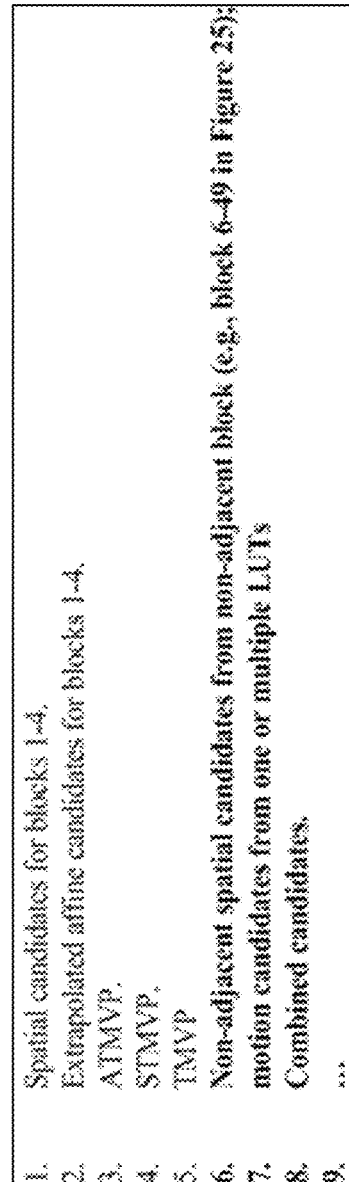
FIG. 31 shows an example of priority-based insertion of candidates from non-adjacent blocks and LUTs.
Figure 32:
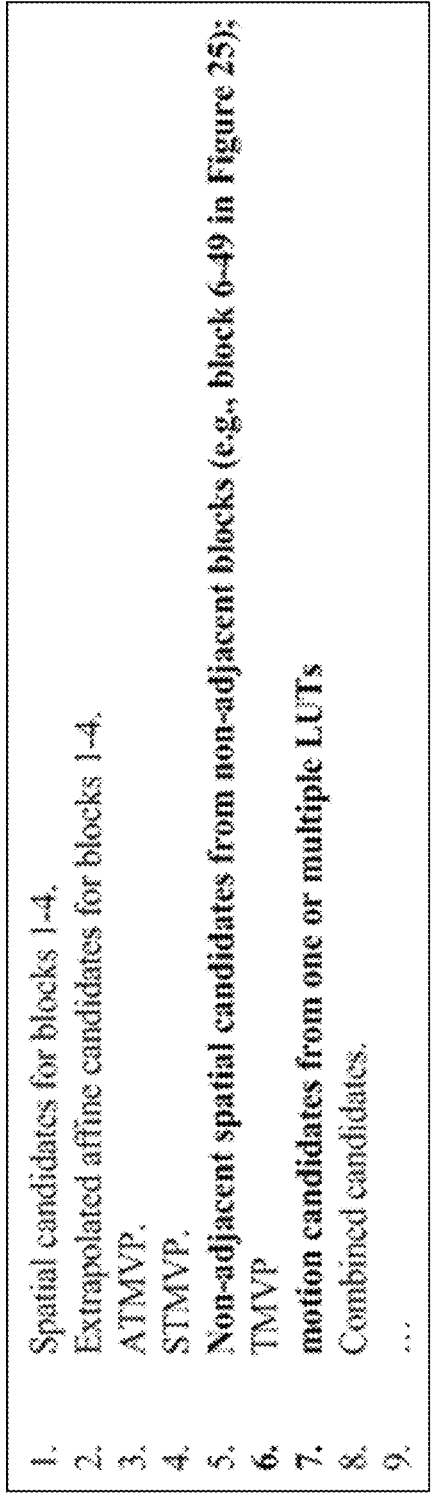
FIG. 32 shows another example of priority-based insertion of candidates from non-adjacent blocks and LUTs.

(iv) An example of checking orders for merge candidate list reconstruction is given in FIG. 30.
(d) In one example, non-adjacent candidates have a higher priority compared to motion candidates from LUTs.
  (i) In this case, all the non-adjacent blocks are checked firstly. If the total number of candidates are still less than the maximumly allowed number, then the LUT-based method is further applied by checking motion candidates from LUTs.
  (ii) Alternatively, motion candidates from LUTs have a higher priority compared to non-adjacent candidates. The LUT-based method is firstly applied by checking motion candidates from LUTs. If the total number of candidates are still less than the maximumly allowed number, the non-adjacent blocks are checked to add non-adjacent candidates to the merge candidate list.
  (iii) Similarly, when both non-adjacent method and LUT-based method are allowed in the AMVP coding process, the priority could be handled in a similar way as described in above examples.
  (iv) An example is shown in FIG. 31.
(e) In one example, the two methods (e.g., non-adjacent method and the LUT-based method) may be invoked not one right after the other. Instead, one method may be applied, then add some other kinds of candidates, and then the second method may be applied. An example is shown in FIG. 32 where the non-adjacent candidates are checked before the TMVP process, and the motion candidates from LUTs are checked afterwards.
(f) Adaptive orders for inserting non-adjacent candidates and motion candidates from LUTs may be performed.
  (i) In one example, all bi-predictive merge candidates from non-adjacent candidates are firstly checked, followed by motion candidates from LUTs, and then uni-predicted non-adjacent candidates.
  (ii) In one example, for one block, it may check non-adjacent candidates before motion candidates from LUTs while for another block, it may check motion candidates from LUTs before non-adjacent candidates.

Example 10. Default motion candidates may be included in LUTs.
  (a) In one example, zero motion vector candidates (with one or multiple reference pictures) are treated as default motion candidates.
  (b) In one example, default motion candidates may be derived from previously coded motion information in current slice/tile or from previously coded motion from different pictures.
  (c) Default motion candidates may be signaled in the bitstream, such as in sequence parameter set (SPS), picture parameter set (PPS), slice header, etc.

Example 11. Reordering of motion candidates in LUT may be applied.
  (a) In one example, after coding one block, a new motion candidate may be obtained from this block. It may be firstly added to LUTs and then the reordering may be applied. In this case, for the subsequence block, it will utilize the reordered LUTs. For example, the reordering happens after finish coding a certain unit (e.g., one LCU, one LCU row, multiple LCUs, etc.).
  (b) In one example, motion candidates in LUTs are not reordered. However, when coding a block, the reordering of motion candidates may be firstly applied, followed by being checked and inserted to the merge/AMVP/or other kinds of motion information candidate list.

Example 12 advantageously describes locally adaptive motion vector resolution (LAMVR) improvements.

Example 12. When multiple motion vector precision is enabled (e.g., when the Integer Motion Vector (IMV) precision tool is used to support 1-pel, 2-pel, 4-pel or sub-pel MV precisions), and for a block with lower MV precision (e.g., integer-precision or lower), the following may apply:
  (a) Rounding is applied to a motion candidate from a LUT. In some embodiments, pruning of the motion candidate is further applied against other AMVP candidates.
  (b) Alternatively, for each AMVP candidate (e.g., derived from spatial and/or temporal neighboring blocks) to be added to the AMVP candidate list, it is firstly rounded and then pruned with other available AMVP candidates.
  (c) Alternatively, all AMVP candidates (e.g., derived from spatial and/or temporal neighboring blocks) are inserted to the AMVP candidate list without being rounded and with pruning. Afterwards, the candidates can be rounded. In one example, after rounding, pruning among the rounded AMVP candidates is further applied. If the total number of available AMVP candidates is less than the maximumly allowed number, LUT-based method may be further applied to add more AMVP candidates.

Example 13 advantageously provides merge index coding embodiments.

Example 13. Instead of using the TR with cRiceParam equal to 0 (or TU), a merge index may be split into two parts and each part may invoke a different binarization method.
  (a) The first part is coded with unary binarization method.
  (b) In one example, the second part may use FL binarization method.
  (c) Alternatively, the second part may use EGk binarization method (wherein k is equal to 0, 1 . . . ).
  (d) The two parts may be defined as (Total number of merge candidate minus N, N) wherein N is a given value. Some examples are shown Table 11. In the example shown in Table 11, total number of merge candidates is 14, and N=7. When the value of merge index is in the range of [0, total number of merge candidate−(N+1)=6], unary binarization method for the first part is applied. When the value of merge index is in the range of [total number of merge candidate−N=7, total number of merge candidate−1=13]), unary binarization method for the first part and FL binarization method for the second part is applied.
  (e) The proposed methods may be invoked only when the merge index is larger than a pre-defined or signaled threshold.

TABLE 11

Bin string of the merge index (total merge number is 15, and N = 8)

| Value of merge index | Bin String |
|---|---|
| 0 | 0 |
| 1 | 1 0 |
| 2 | 1 1 0 |
| 3 | 1 1 1 0 |
| 4 | 1 1 1 1 0 |

TABLE 11-continued

Bin string of the merge index (total merge number is 15, and N = 8)

| Value of merge index | Bin String | | | | | | | | | |
|---|---|---|---|---|---|---|---|---|---|---|
| 5  | 1 | 1 | 1 | 1 | 1 | 0 |   |   |   |   |
| 6  | 1 | 1 | 1 | 1 | 1 | 1 | 0 |   |   |   |
| 7  | 1 | 1 | 1 | 1 | 1 | 1 | 1 | 0 | 0 | 0 |
| 8  | 1 | 1 | 1 | 1 | 1 | 1 | 1 | 0 | 0 | 1 |
| 9  | 1 | 1 | 1 | 1 | 1 | 1 | 1 | 0 | 1 | 0 |
| 10 | 1 | 1 | 1 | 1 | 1 | 1 | 1 | 0 | 0 | 1 |
| ... | | | | | | | | | | |
| binIdx | 0 | 1 | 2 | 3 | 4 | 5 | 6 | 7 | 8 | 9 |

Examples 14-16 advantageously provides embodiments for LUTs with intra prediction modes and intra mode prediction from non-adjacent blocks.

Example 14. Similar to the usage of LUTs with motion candidates for motion vector prediction, it is proposed that one or multiple LUTs may be constructed, and/or updated to store intra prediction modes from previously coded blocks and LUTs may be used for coding/decoding an intra-coded block.
  (a) When the LUT-based method is applied, number of entries for each LUT is the same, e.g., equal to total number of allowed intra predictions.
  (b) When the LUT-based method is applied, a variable (i.e., cnt) may be further assigned for each intra prediction mode to record how many times the intra prediction mode has been used in previously coded blocks.
  (c) When updating a LUT with a selected intra perdition mode, the associated cnt will be modified, such as increasing by 1.

Example 15. Intra prediction modes of non-adjacent blocks may be used as intra prediction mode predictors for coding an intra-coded block.

Example 16. Alternatively, LUTs and non-adjacent based methods may be jointly utilized.
  (a) In one example, the intra prediction modes in either LUTs or non-adjacent blocks may be used in the MPM list construction process.
  (b) Alternatively, the intra prediction modes in either LUTs or non-adjacent blocks may be used to re-order non-MPM intra prediction modes.

Examples 17-19 advantageously provides embodiments for LUTs with IC parameters and IC parameter derivation from non-adjacent blocks.

Example 17. Similar to the usage of LUTs with motion candidates for motion vector prediction, it is proposed that one or multiple LUTs may be constructed, and/or updated to store illumination parameters from previously coded blocks and LUTs may be used for coding/decoding an IC-coded block.
  (a) After coding a block/a region, if one or multiple blocks are coded with the IC mode, the corresponding IC parameters may be used to update LUTs.
  (b) Before coding a new picture/slice/LCU row, LUTs may be initialized with signaled IC parameters (e.g., derived based on the whole picture/slice/LCU row).

Example 18. Non-adjacent based methods may be applied wherein when deriving IC parameters for the current block, instead of using the spatial neighbors as a template as depicted in FIG. 25, the spatial neighbors of a non-adjacent block may be utilized to avoid degrading parallelism of the codec.
  (c) In one example, the IC parameters are stored for each IC-coded block.

Example 19. LUTs and non-adjacent based methods may be jointly utilized.
  (d) In one example, a parameter list of IC parameters may be constructed like the merge/AMVP candidate list. An index of IC parameters may be signaled.
  (e) The rule of adding IC parameters from non-adjacent blocks and LUTs may be similar to that for the motion vector coding in AMVP or merge modes.

8. Additional Embodiments for LUT-Based Motion Vector Prediction

Figure 33:
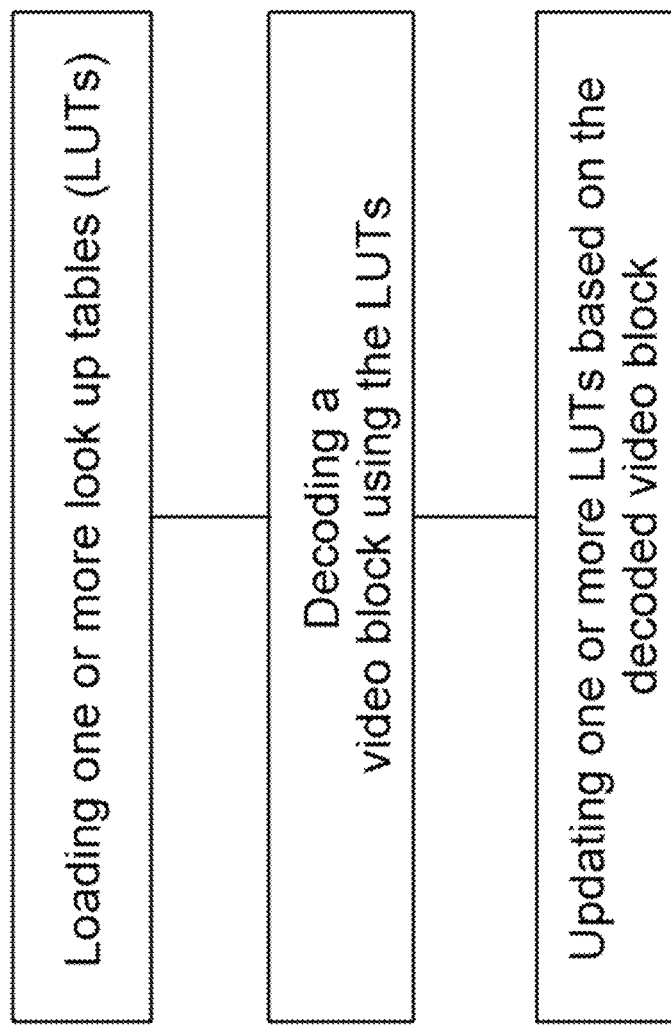
FIG. 33 shows a coding flow for an example of the LUT-based MVP/intra mode prediction/IC parameters with updating after one block.
Figure 34:
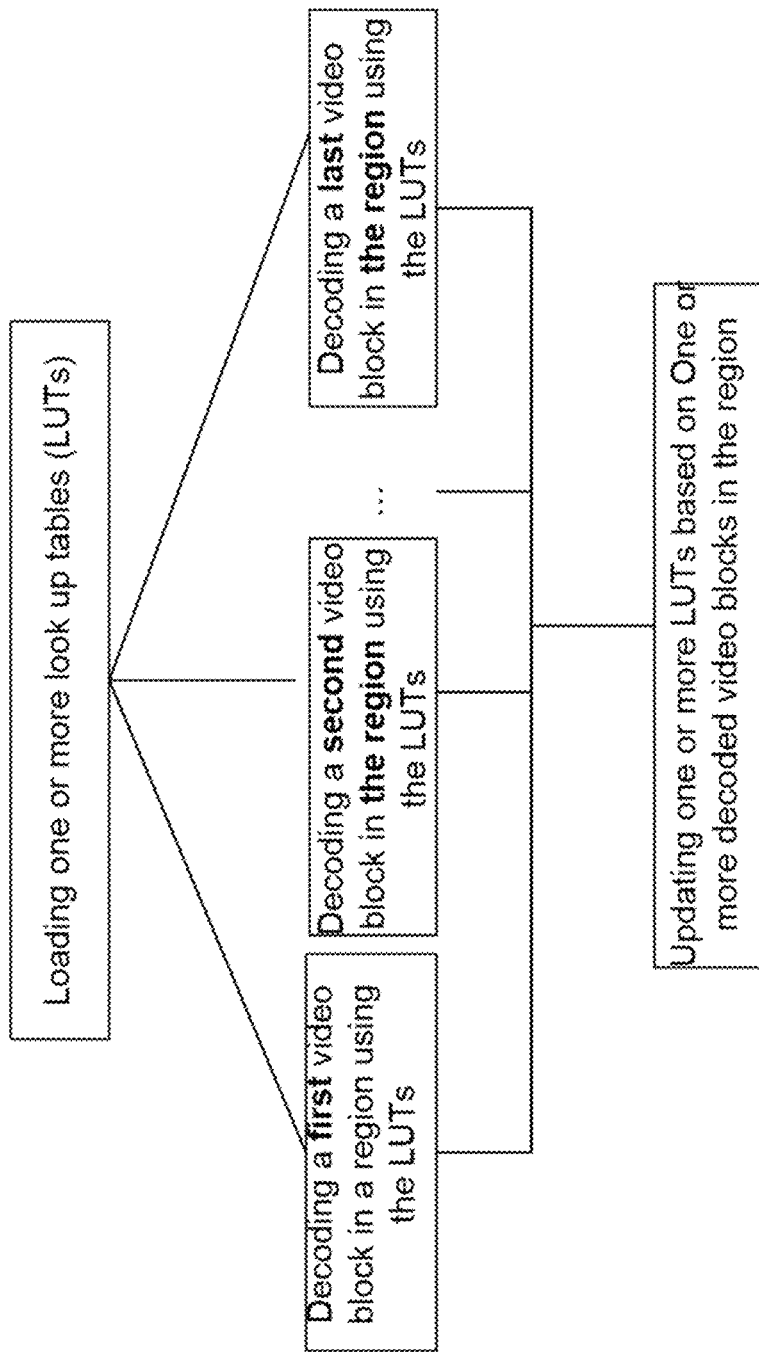
FIG. 34 shows a coding flow for an example of the LUT-based MVP/intra mode prediction/IC parameters with updating after one region.

An example of the coding flow for the LUT-based prediction methods is depicted in FIG. 33. In the context of Example 5, the updating process is done after decoding a region. An example is depicted in FIG. 34 to avoid frequently updating LUTs.

The examples described above may be incorporated in the context of the methods described below, e.g., method 3500, which may be implemented at a video decoder and/or video encoder.

Figure 35:
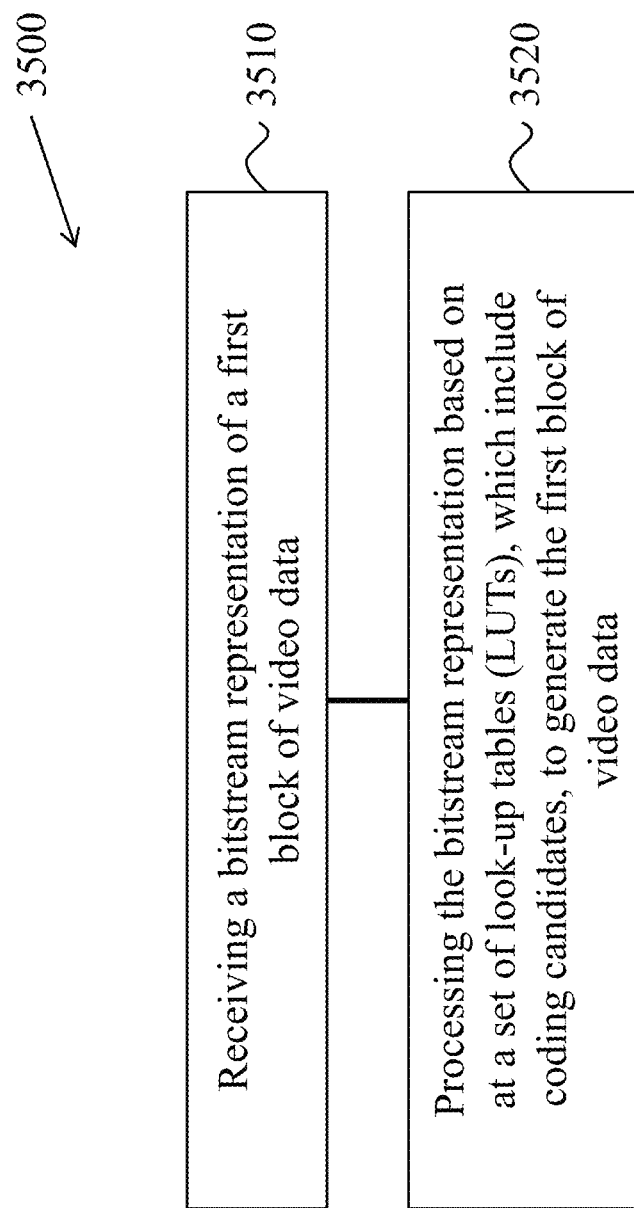
FIG. 35 shows a flowchart of an example method for video coding in accordance with the presently disclosed technology.

FIG. 35 shows a flowchart of an exemplary method for video coding, which may be implemented in a video encoder. The method 3500 includes, at step 3510, receiving a bitstream representation of a first block of video data.

The method 3500 includes, at step 3520, processing the bitstream representation based on at a set of look-up tables (LUTs), which includes coding candidates, to generate the first block of video data.

In some embodiments, the coding candidates include motion candidates. In other embodiments, a number of LUTs in the set of LUTs or a size of a LUT in the set of LUTs is based on a sequence resolution, a largest coding unit (LCU) size or a size of a merge or Advanced Motion Vector Prediction (AMVP) candidate list. In an example, the size of the LUT is not signaled. In another example, the size of the LUT is equal to a maximum number of merge candidates. In yet another example, the size of the LUT is less than a maximum number of merge candidates by a fixed value, where the fixed value is based on a number of temporal or spatial neighboring blocks that can be accessed in the merge or AMVP candidate list.

In some embodiments, a first LUT of the set of LUTs includes motion candidates with motion information only from Advanced Motion Vector Prediction (AMVP) coded blocks, and a second LUT of the set of LUTs includes motion candidates with motion information from AMVP and merge coded blocks. In other embodiments, a first LUT of the set of LUTs includes motion candidates with only uni-prediction, and a second LUT of the set of LUTs includes motion candidates with only bi-prediction. In an example, the motion candidates in the second LUT are checked before the motion candidates in the first LUT are checked. In another example, the motion candidates in the second LUT are checked after the motion candidates in the first LUT are checked.

In some embodiments, the method 3500 further includes updating, based on a coding characteristic of the first block of video data, a subset of the set of LUTs, wherein the subset excludes at least one LUT in the set of LUTs.

In some embodiments, the method 3500 further includes refraining from using, based on a coding characteristic of the first block of video data, at least one LUT of the set of LUTs.

The above examples could be applied to LUT-based methods for other coding information, such as updating LUTs after a region size is reached.

In an example, the coding characteristic indicates that the first block of video data is intra-coded. In another example, the coding characteristic indicates that the first block of video data is intra block copy (IBC) coded. In yet another example, the coding characteristic indicates that the first block of video data is affine merge coded or affine Advanced Motion Vector Prediction (AMVP) coded.

In some embodiments, the method 3500 further includes obtaining a new motion candidate from a coded block, and pruning the set of LUTs prior to adding the new motion candidate to the at set of LUTs. Various examples of pruning may be implemented. In an example, the new motion candidate is pruned to each of the motion candidates in a subset of the set of LUTs. In another example, the new motion candidate is pruned to each of the motion candidates in the single LUT. In yet another example, the new motion candidate is pruned to a subset of the motion candidates in the set of LUTs.

In some embodiments, the method 3500 further includes periodically updating at least one LUT in the set of LUTs.

In some embodiments, the method 3500 further includes receiving a bitstream representation of a second block of video data, and refraining from using or updating, based on a coding characteristic of the second block of video data, the set of LUTs. In an example, the coding characteristic indicates that the second block of video data has a predetermined size or is affine coded.

In some embodiments, the coding candidates comprise intra prediction mode candidates. In other embodiments, the coding candidates comprise candidate illumination compensation (IC) parameters. In yet other embodiments, the coding candidates comprise candidate filtering parameters.

In some embodiments, the disclosed technology may be used to provide another method for video coding. This method includes receiving a bitstream representation of a block of video data, and processing the bitstream representation based on coding candidates from non-adjacent blocks, where the coding candidates are non-motion candidates.

In some embodiments, the disclosed technology may be used to provide another method for video coding. This method includes receiving a bitstream representation of a block of video data, and processing, using multiple motion vector (MV) precisions and based on an Advanced Motion Vector Prediction (AMVP) candidate list, the bitstream representation to generate the block of video data, where the block of video data comprises low MV precision, and where each AMVP candidate is rounded and pruned with available AMVP candidates prior to insertion into the AMVP candidate list.

In some embodiments, the disclosed technology may be used to provide another method for video coding. This method includes receiving a bitstream representation of a block of video data, and processing, using merge index coding, the bitstream representation to generate the block of video data, where the bitstream representation comprises a merge index that is split into a first part and a second part, wherein the first part is processed by a first binarization method, and wherein the second part is processed by a second binarization method that is different from the first binarization method.

For example, the first binarization method is a unary binarization method. For example, the second binarization method is a fixed-length (FL) binarization method. For example, the second binarization method is a $k^{th}$ order Exp-Golomb ($EG_k$) binarization method.

9. Example Implementations of the Disclosed Technology

Figure 36:
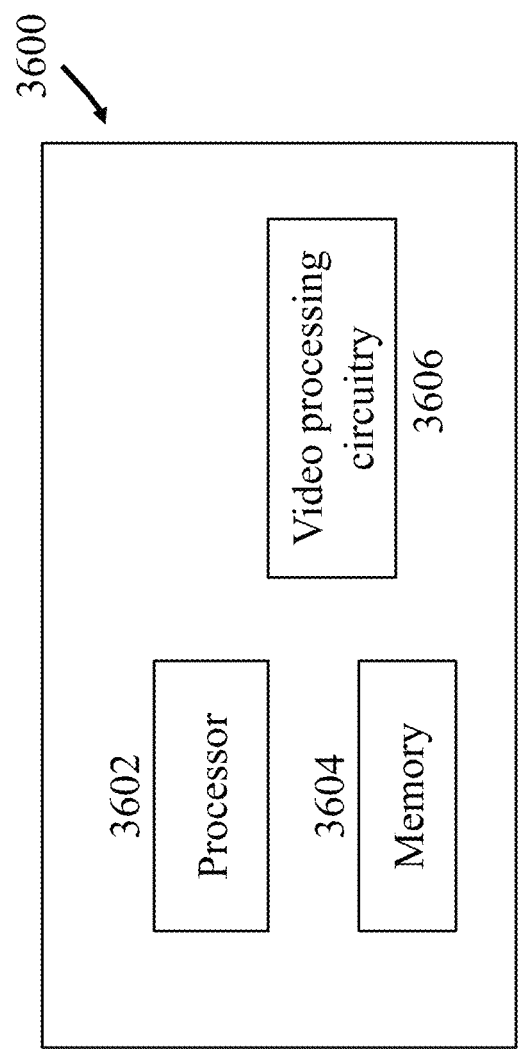
FIG. 36 is a block diagram of an example of a hardware platform for implementing a visual media decoding or a visual media encoding technique described in the present document.

FIG. 36 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods (including, but not limited to, method 3500) described in the present document. The memory (memories) 3604 may be used for storing data and code used for implementing the methods and techniques described herein. The video processing hardware 3606 may be used to implement, in hardware circuitry, some techniques described in the present document.

In some embodiments, the video coding methods may be implemented using an apparatus that is implemented on a hardware platform as described with respect to FIG. 36.

Figure 37:
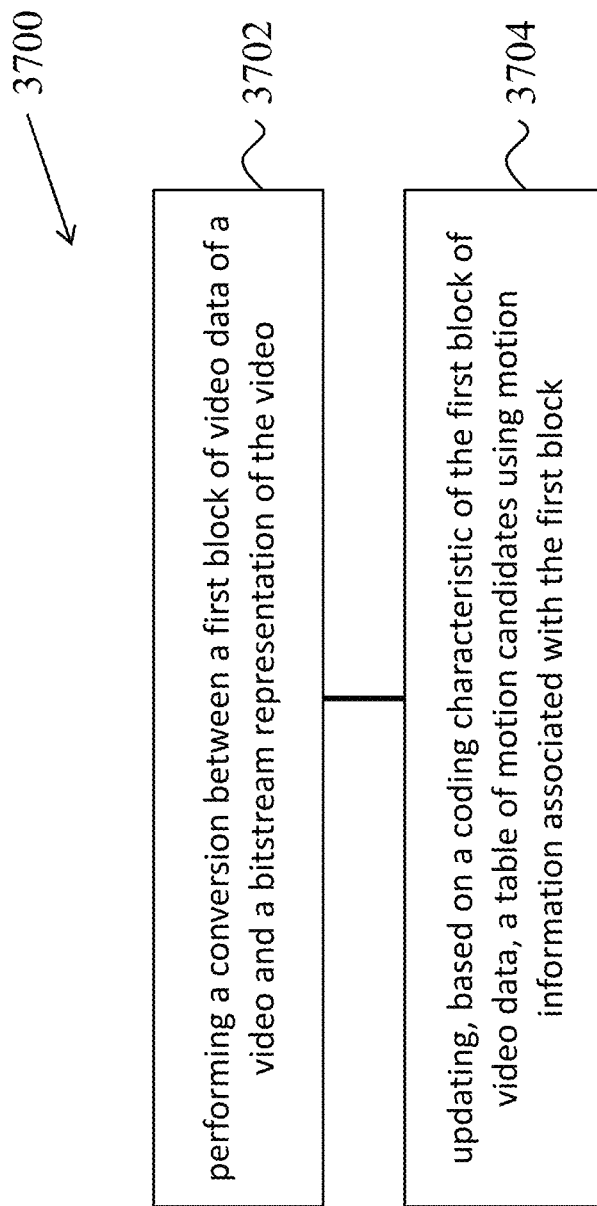
FIG. 37 shows a flowchart of an example method for video processing in accordance with the presently disclosed technology.

FIG. 37 is a flowchart of an example method 3700 for video processing in accordance with the presently disclosed technology. The method 3700 includes performing a conversion between a first block of video data of a video and a bitstream representation of the video including the first block (3702) and updating, based on a coding characteristic of the first block of video data, a table of motion candidates using motion information associated with the first block (3704).

In some embodiments, the coding characteristic indicates that the first block of video data is coded using a merge mode. In some embodiments, the coding characteristic indicates that the first block of video data is coded using Advanced Motion Vector Prediction (AMVP) mode. In some embodiments, the coding characteristic indicates that the first block of video data is not intra-coded. In some embodiments, the coding characteristic indicates that the first block of video data is not intra block copy (IBC) coded. In some embodiments, the coding characteristic indicates that the first block of video data is inter-coded. In some embodiments, the coding characteristic indicates that the first block of video data is not affine coded.

In some embodiments, the method includes performing a second conversion between a second block of video data of the video and a bitstream representation of the video based on the table of motion candidates. In some embodiments, the method further includes refraining from updating, based on a second coding characteristic of the second block of video data, the table of motion candidates using motion information associated with the second block.

In some embodiments, the second coding characteristic indicates that the second block of video data is affine AMVP coded. In some embodiments, the second coding characteristic indicates that the second block of video data is affine merge coded. In some embodiments, the second coding characteristic indicates that the second block of video data is intra coded.

In some embodiments, the method includes performing a third conversion between a third block of video data of the video and a bitstream representation of the video without using the table of motion candidates. In some embodiments, the method includes updating, based on a third coding characteristic of the third block of video data, the table of motion candidates using motion information associated with the third block. The third coding characteristic may indicate that the third block of video data is coded using a merge mode or an Advanced Motion Vector Prediction (AMVP) mode.

In some embodiments, the updating comprises updating the table of motion candidates periodically. In some embodiments, the updating comprises updating the table of motion candidates each time after a given region of a video frame is processed. In some embodiments, the given region includes a slice. In some embodiments, the given region includes N largest coding units (LCUs), N being an integer. N can be 1 or 2. In some embodiments, the given region includes N coding units (CUs) or N inter-coded coding units (CUs), N being an integer. N can be 4 or 8.

In some embodiments, the first block is a last block in a plurality of blocks in a given region associated with motion information for updating the table. The method further includes refraining from updating the table using motion information of other blocks in the plurality of blocks. In some embodiments, the method includes updating the table of motion candidates using motion information associated with a plurality of blocks in a given region.

In some embodiments, the motion information associated with a block includes one or more intra prediction modes for intra mode coding. In some embodiments, the motion information associated with a block includes one or more illumination compensation (IC) parameters for IC parameter coding. In some embodiments, the motion information associated with a block includes one or more filter parameters.

Figure 38:
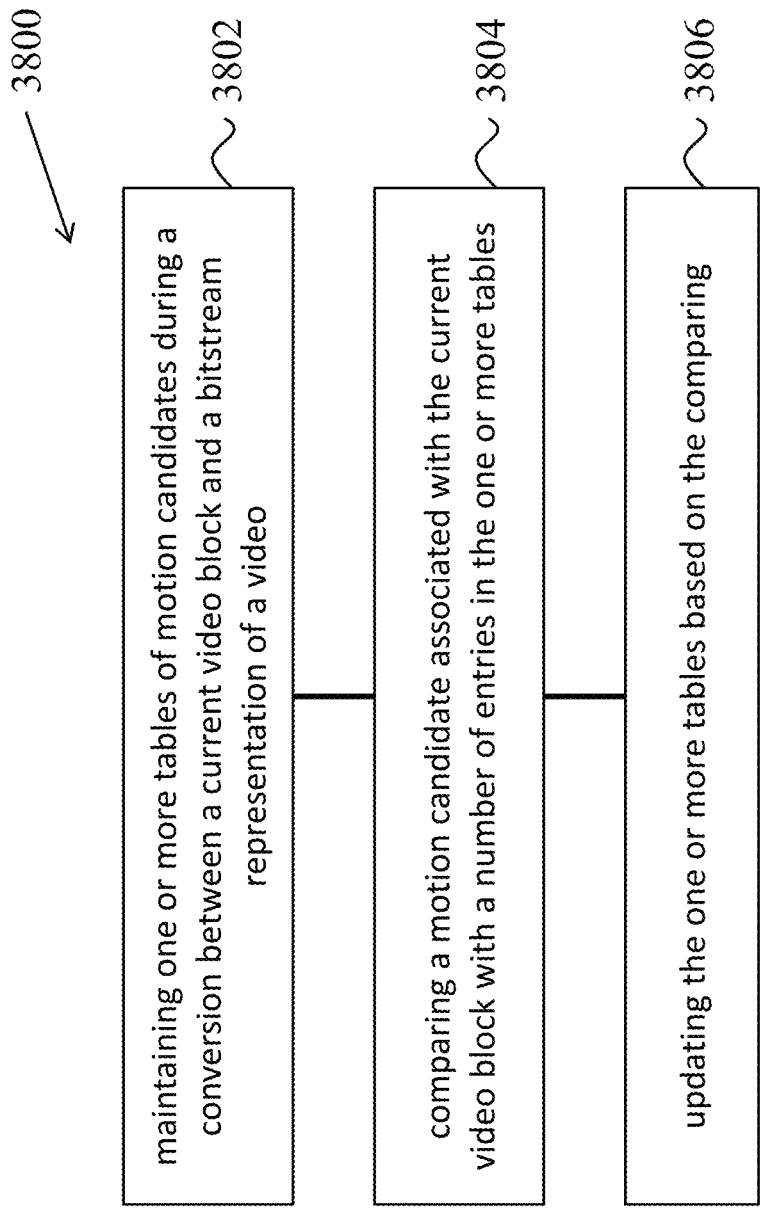
FIG. 38 shows another flowchart of an example method for video processing in accordance with the presently disclosed technology.

FIG. 38 is a flowchart of an example method 3800 for video processing in accordance with the presently disclosed technology. The method 3800 includes, at operation 3802, maintaining one or more tables of motion candidates during a conversion between a current video block and a bitstream representation of a video. The method 3800 includes, at operation 3804, comparing a motion candidate associated with the current video block with a number of entries in the one or more tables. The method 3800 includes, at operation 3806, updating the one or more tables based on the comparing.

In some embodiments, the number of entries corresponds to all entries in the one or more tables. In some embodiments, the number of entries is m, m being an integer. In some embodiments, the m entries are last m entries in one of the one or more tables.

In some embodiments, the updating comprises adding the motion candidate to one of the one or more tables. In some embodiments, the updating comprises adding the motion candidates as a last entry of one of the one or more tables.

In some embodiments, the one or more tables include no duplicated entries. In some embodiments, the method further includes performing a conversion of a second video block that is subsequent to the current video block and the bitstream representation of the video using the updated one or more tables.

Figure 39:
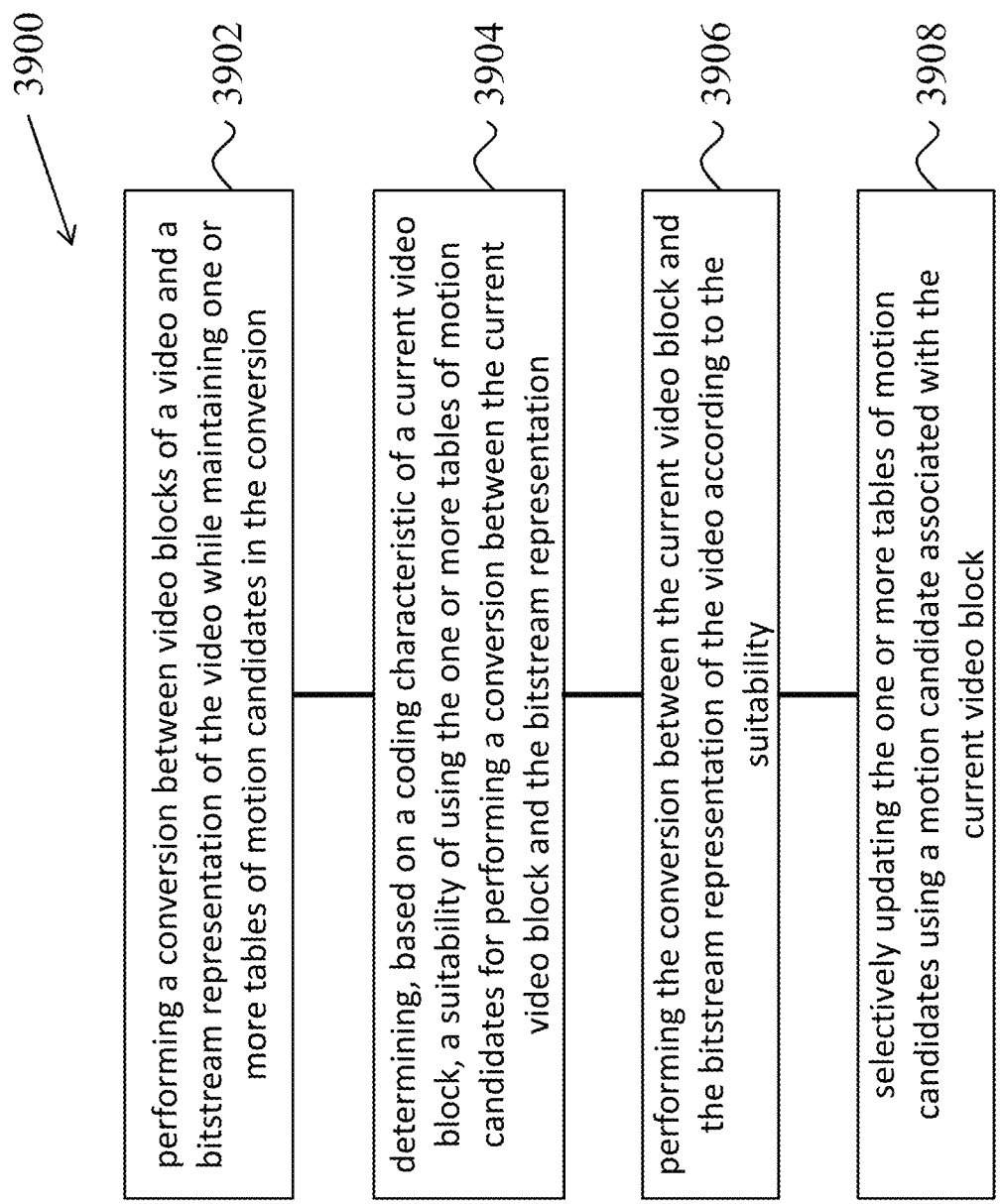
FIG. 39 shows another flowchart of an example method for video processing in accordance with the presently disclosed technology.

FIG. 39 is a flowchart of an example method 3900 for video processing in accordance with the presently disclosed technology. The method 3900 includes, at operation 3902, performing a conversion between video blocks of a video and a bitstream representation of the video while maintaining one or more tables of motion candidates in the conversion. The method 3900 includes, at operation 3904, determining, based on a coding characteristic of a current video block in the video blocks, a suitability of using the one or more tables of motion candidates for performing a conversion between the current video block and the bitstream representation of the video. The method 3900 includes, at operation 3906, performing the conversion between the current video block and the bitstream representation of the video according to the suitability. The method also includes, at operation 3908, selectively updating the one or more tables of motion candidates using a motion candidate associated with the current video block.

In some embodiments, the suitability indicates that the one or more tables of motion candidates are not suitable to be used for performing the conversion between the current video block and the bitstream representation of the video. The coding characteristic can indicate that the current video block is sub-block coded, affine coded, or has a predefined block size. In some embodiments, the updating is skipped according to the coding characteristic. In some embodiments, the updating is performed according to the coding characteristic. For example, the updating can include updating the one or more tables of motion candidates using motion information of a set of sub-blocks within the current video block.

In some embodiments, the suitability indicates that the one or more tables of motion candidates are suitable to be used for performing the conversion between the current video block and the bitstream representation of the video. In some embodiments, the updating is skipped according to the coding characteristic. For example, the coding characteristic can indicate that the current video block is triangular prediction mode coded. In some embodiments, the updating is performed according to the coding characteristic. For example, the coding characteristic can indicate that the current video block is affine coded. The updating can include storing a position of the current video block in the one or more tables for deriving affine parameters.

In some embodiments, the motion candidate includes motion information of the current video block. In some embodiments, the motion candidate includes information derived from motion information of the current video block. In some embodiments, a motion candidate is associated with motion information including at least one of: a prediction direction, a reference picture index, motion vector values, an intensity compensation flag, an affine flag, a motion vector difference precision, or motion vector difference value. In some embodiments, the motion candidates comprise multiple merge candidates used for merge-coded blocks. In some embodiments, the motion candidates comprise intra prediction modes used for intra-coded blocks. In some embodiments, the motion candidates comprise multiple illumination compensation (IC) parameters used for IC-coded blocks. In some embodiments, the motion candidates comprise filter parameters used in the filtering process.

Figure 40:
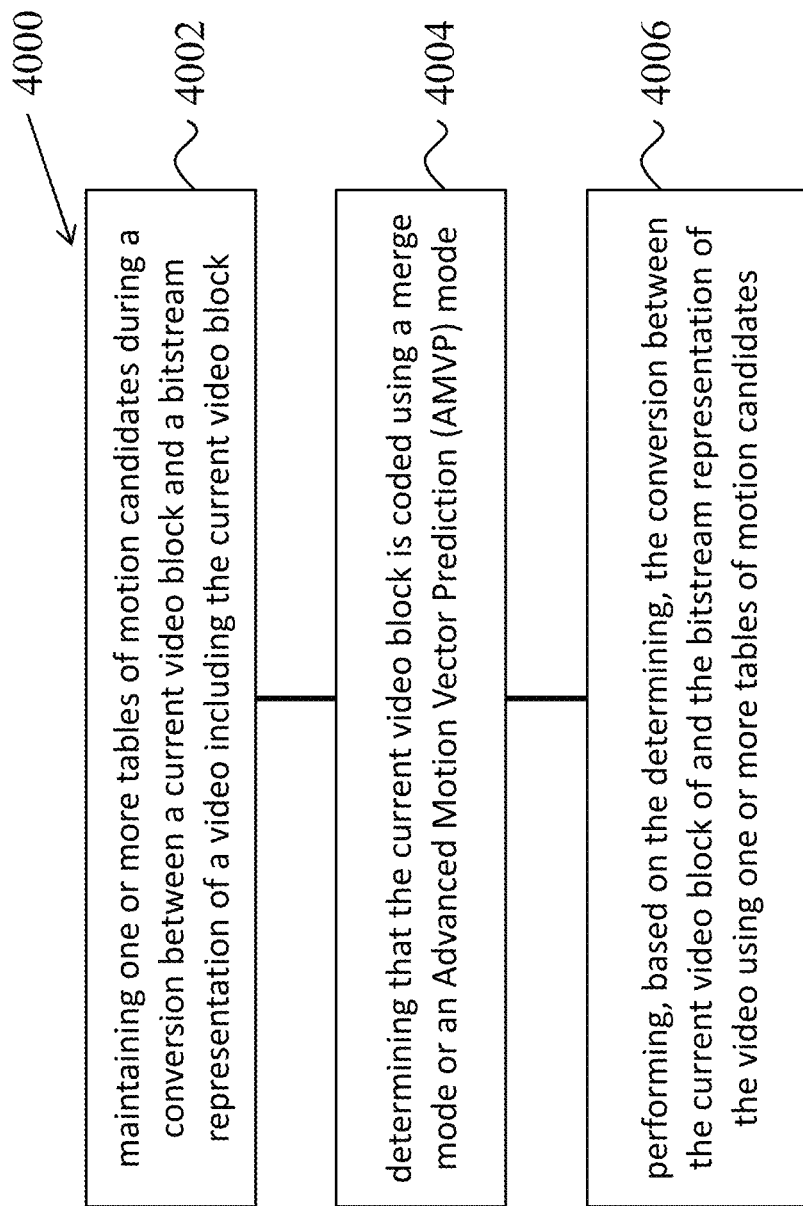
FIG. 40 shows another flowchart of an example method for video processing in accordance with the presently disclosed technology.

FIG. 40 is a flowchart of an example method 4000 for video processing in accordance with the presently disclosed technology. The method 4000 includes, at operation 4002, maintaining one or more tables of motion candidates during a conversion between a current video block and a bitstream representation of a video including the current video block. The method 4000 includes, at operation 4004, determining that the current video block is coded using a merge mode or an Advanced Motion Vector Prediction (AMVP) mode. The method 4000 includes, at operation 4006, performing, based on the determining, the conversion between the current video block of and the bitstream representation of the video using one or more tables of motion candidates.

In some embodiments, the method includes refraining from using the one or more tables of motion candidates upon determining that the current video block is intra-coded. In some embodiments, the method includes refraining from using the one or more tables of motion candidates upon determining that the current video block is intra block copy (IBC) coded. In some embodiments, the method includes refraining from using the one or more tables of motion candidates upon determining that the current video block is affine merge coded or affine Advanced Motion Vector Prediction (AMVP) coded.

In some embodiments, the using of the one or more tables of motion candidates comprises checking the motion candidates in the one or more tables in an order. In some embodiments, the checking comprises checking a set of first m motion candidates in a first table of the one or more tables checking a set of last n motion candidates in a second table of the one or more tables. Both m and n are positive integers. In some embodiments, the set of the last n motion candidates are a set of motion candidates most recently added to the second table. In some embodiments, the checking comprises checking a set of last m motion candidates in a first table of the one or more tables and checking a set of first n motion candidates in a second table of the one or more tables. Both m and n are positive integers. In some embodiments, the set of the first n motion candidates are a set of motion candidates most recently added to the second table.

In some embodiments, the one or more tables of motion candidates comprise one or more default motion candidates. In some embodiments, the one or more default motion candidates comprise one or more zero motion vector candidates that correspond to one or more reference pictures. In some embodiments, the one or more default motion candidates are derived from previously coded motion information. In some embodiments, the one or more default motion candidates are signaled in a Sequence Parameter Set (SPS), a Picture Parameter Set (PPS), or a slice header in the bitstream representation. In some embodiments, a motion candidate is associated with motion information including at least one of: a prediction direction, a reference picture index, motion vector values, an intensity compensation flag, an affine flag, a motion vector difference precision, or motion vector difference value. In some embodiments, the motion candidates comprise multiple merge candidates used for merge-coded blocks. In some embodiments, the motion candidates comprise intra prediction modes used for intra-coded blocks. In some embodiments, the motion candidates comprise multiple illumination compensation (IC) parameters used for IC-coded blocks. In some embodiments, the motion candidates comprise filter parameters used in the filtering process.

In some embodiments, the method includes updating one or more tables based on the motion information of the current video block after performing the conversion. In some embodiments, the method further includes performing a conversion between a subsequent video block of the video and the bitstream representation of the video based on the updated tables.

Figure 41:
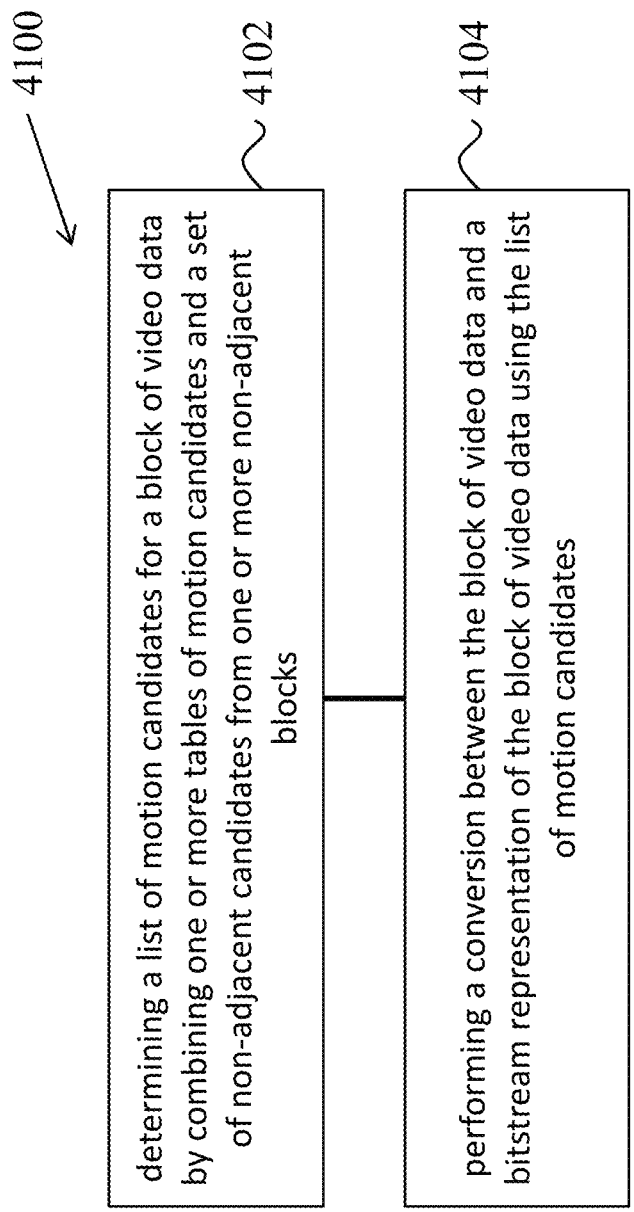
FIG. 41 shows another flowchart of an example method for video processing in accordance with the presently disclosed technology.

FIG. 41 is a flowchart of an example method 4100 for video processing in accordance with the presently disclosed technology. The method 4100 includes, at operation 4102, determining a list of motion candidates for a block of video data of a video by combining one or more tables of motion candidates and a set of non-adjacent candidates from one or more non-adjacent blocks. The method 4100 includes, at operation 4104, performing a conversion between the block of video data and a bitstream representation of the video using the list of motion candidates.

In some embodiments, the combining comprises checking m candidates from the set of non-adjacent candidates and checking n motion candidates from the one or more tables of motion candidates. In some embodiments, the combining comprises adding at least one of the m candidates from the set of non-adjacent candidates to the list of motion candidates. In some embodiments, the combining comprises adding at least one of the n motion candidates from the one or more tables of motion candidates to the list of motion candidates.

In some embodiments, the combining comprises checking candidates from the set of non-adjacent candidates and the one or more tables of motion candidates in an interleaved manner. In some embodiments, the checking comprises checking a non-adjacent candidate from the set of non-adjacent candidates prior to checking a motion candidate from the one or more tables. In some embodiments, the checking comprises checking bi-predictive motion candidates from the set of non-adjacent candidates, checking motion candidates from the one or more tables of motion candidates, and checking uni-predictive motion candidates from the set of non-adjacent candidates.

In some embodiments, the checking comprises checking a non-adjacent candidate from the set of non-adjacent candidates and replacing, based on a coding characteristic of a non-adjacent block associated with the non-adjacent candidate, the non-adjacent candidate with a motion candidate from the one or more tables of motion candidates. In some embodiments, the coding characteristic of the non-adjacent block indicates that the non-adjacent block is located outside a predefined range. The predefined range can include a current row of a largest coding unit. In some embodiments, the coding characteristic of the non-adjacent block indicates that the non-adjacent block is intra coded or intra block copy coded.

In some embodiments, the set of non-adjacent candidate has a higher priority than the one or more tables of motion candidates. The combining can comprise checking all candidates from the set of non-adjacent candidates before checking the set of tables of motion candidates. In some embodiments, the one or more tables of motion candidates has a higher priority than the set of non-adjacent candidates. The combining can comprise checking all candidates from the set of tables of motion candidates before checking the set of non-adjacent candidates.

In some embodiments, the list of motion candidates is obtained by further combining candidates generated from a specified motion prediction method. The specified motion prediction method can include a Temporal Motion Vector Predictor (TMVP) method.

In some embodiments, a motion candidate is associated with motion information including at least one of: a prediction direction, a reference picture index, motion vector values, an intensity compensation flag, an affine flag, a motion vector difference precision, or motion vector difference value. In some embodiments, the list of motion candidates comprises multiple merge candidates used for merge-coded blocks. In some embodiments, the list of motion candidates comprises intra prediction modes used for intra-coded blocks. In some embodiments, the list of motion candidates comprises multiple illumination compensation (IC) parameters used for IC-coded blocks. In some embodiments, the list of motion candidates comprises filter parameters used in the filtering process.

In some embodiments, the block of video data is coded using a merge mode and the set of non-adjacent candidates includes multiple merge candidates. In some embodiments, the block of video data is coded using an Advanced Motion Vector Prediction (AMVP) mode and the set of non-adjacent candidates includes multiple AMVP candidates.

Figure 42:
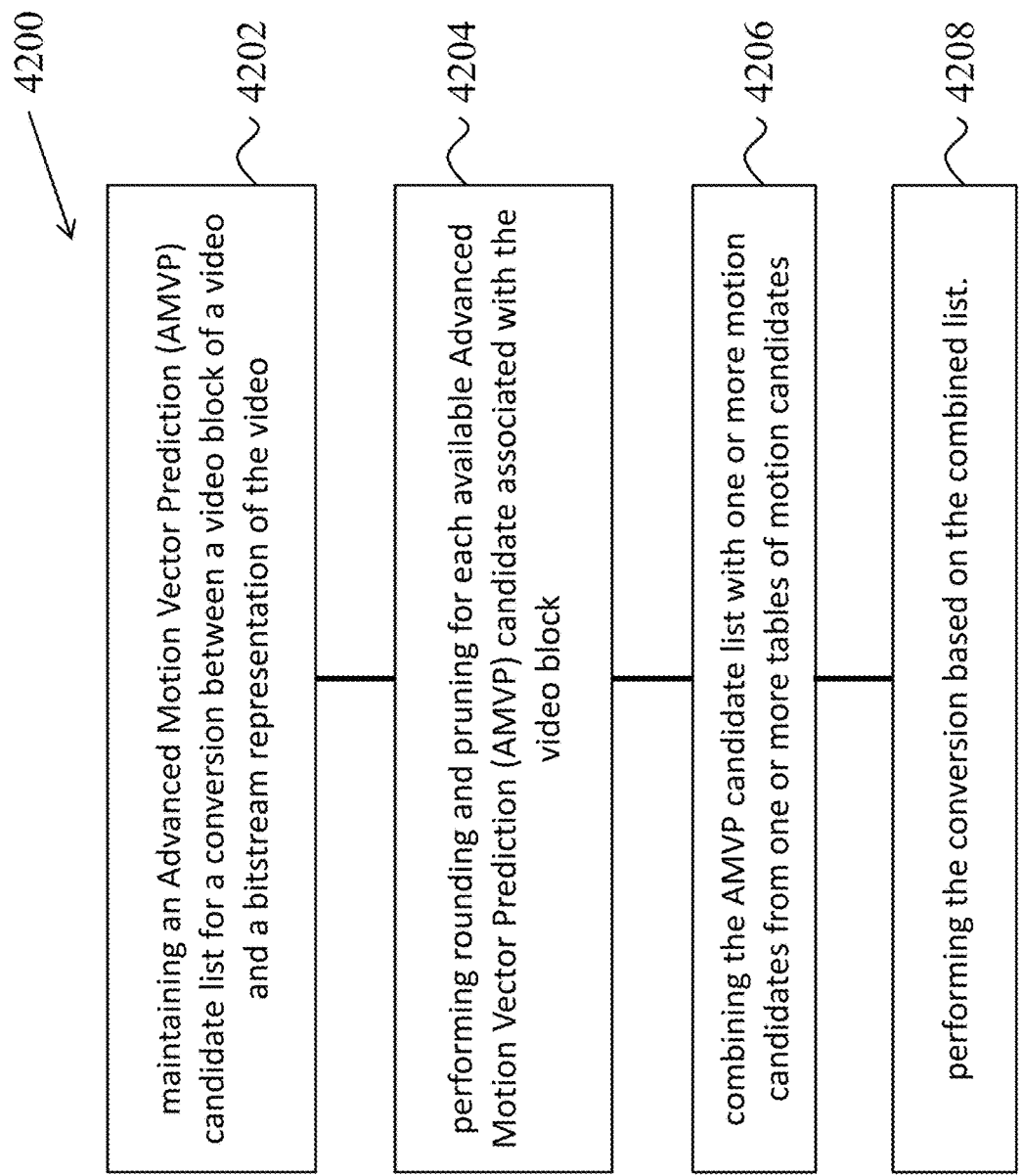
FIG. 42 shows another flowchart of an example method for video processing in accordance with the presently disclosed technology.

FIG. 42 is a flowchart of an example method 4200 for video processing in accordance with the presently disclosed technology. The method 4200 includes, at operation 4202, maintaining an Advanced Motion Vector Prediction (AMVP) candidate list for a conversion between a video block of a video and a bitstream representation of the video with a motion vector precision of M-Pel or sub-pel selected from multiple available motion vector precisions. M is a positive integer. The method 4200 includes, at operation 4204, performing, for each available Advanced Motion Vector Prediction (AMVP) candidate associated with the video block: rounding the AMVP candidate, comparing the rounded AMVP candidate against existing candidates in the AMVP candidate list, and adding the AMVP candidate to the AMVP candidate list upon determining that the rounded AMVP candidate is different than the existing candidates. The method 4200 includes, at operation 4206, combining the AMVP candidate list with one or more motion candidates from one or more tables of motion candidates to obtain a combined list. The method 4200 also includes, at operation 4208, performing the conversion based on the combined list.

In some embodiments, each available AMVP candidate is derived from spatial or temporal neighboring blocks of the video block. In some embodiments, the combining is performed in case a number of candidates in the list of AMVP candidates being smaller than a predefined threshold.

In some embodiments, the method includes rounding each of the one or more motion candidates before the combining. In some embodiments, the combining includes, for each of the one or more motion candidates, comparing the motion candidate with existing AMVP candidates in the AMVP candidate list and adding the motion candidate to the combined list upon determining that the motion candidate is different than the existing AMVP candidates.

In some embodiments, a motion candidate is associated with motion information including at least one of: a prediction direction, a reference picture index, motion vector values, an intensity compensation flag, an affine flag, a motion vector difference precision, or motion vector difference value. In some embodiments, the motion candidates comprise multiple merge candidates used for merge-coded blocks. In some embodiments, the motion candidates comprise intra prediction modes used for intra-coded blocks. In some embodiments, the motion candidates comprise multiple illumination compensation (IC) parameters used for IC-coded blocks. In some embodiments, the motion candidates comprise filter parameters used in the filtering process. In some embodiments, the method includes updating one or more tables based on the motion information of the video block after performing the conversion. In some embodiments, the method further includes performing a conversion between a subsequent video block of the video and the bitstream representation of the video based on the updated tables.

Figure 43:
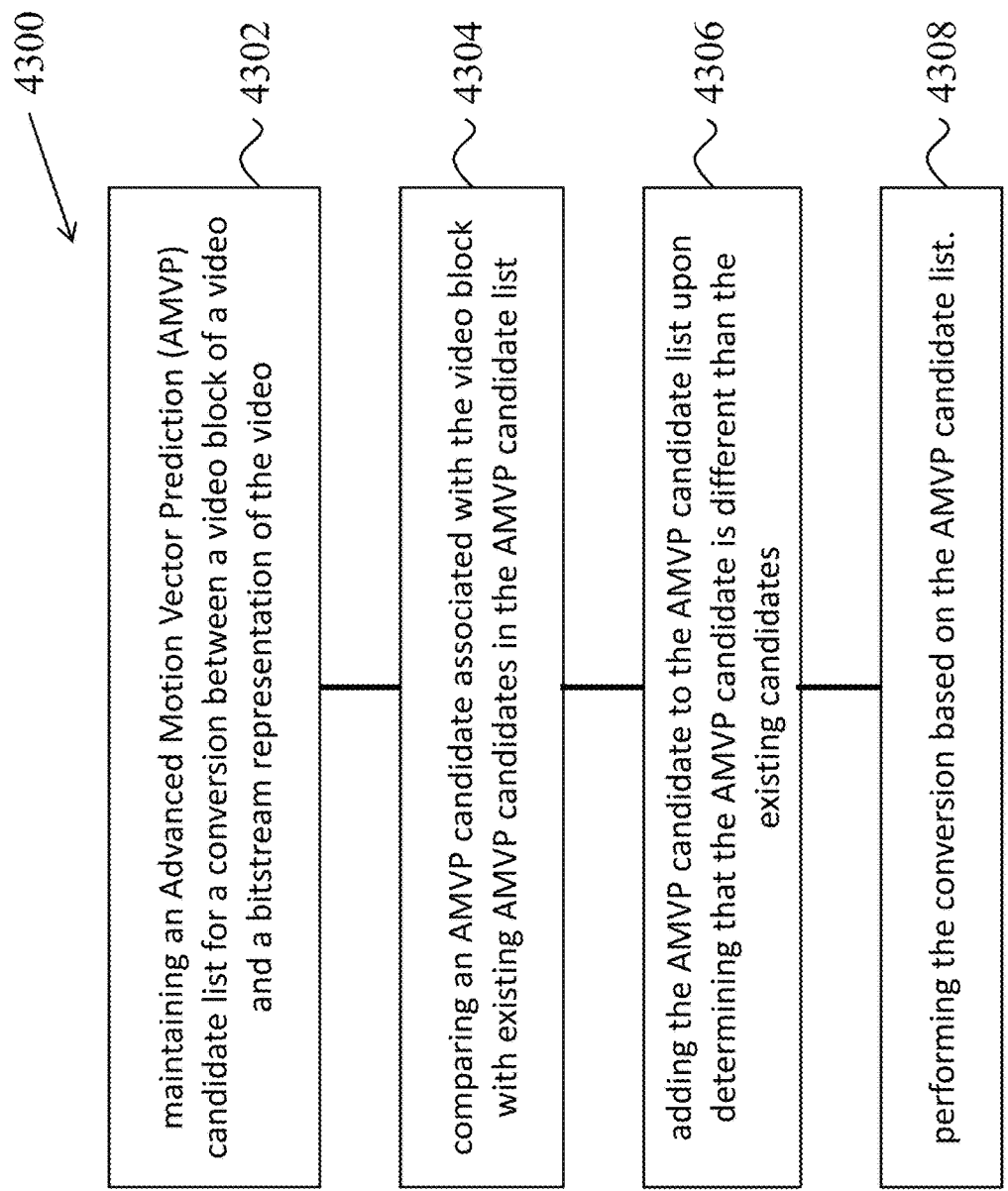
FIG. 43 shows another flowchart of an example method for video processing in accordance with the presently disclosed technology.

FIG. 43 is a flowchart of an example method 4300 for video processing in accordance with the presently disclosed technology. The method 4300 includes, at operation 4302, maintaining an Advanced Motion Vector Prediction (AMVP) candidate list for a conversion between a video block of a video and a bitstream representation of the video with a motion vector precision of M-Pel or sub-pel selected from multiple available motion vector precisions. M is a positive integer. The method 4300 includes, at operation 4304, comparing an AMVP candidate associated with the video block with existing AMVP candidates in the AMVP candidate list. The method 4300 includes, at operation 4306, adding the AMVP candidate to the AMVP candidate list upon determining that the AMVP candidate is different than the existing candidates. The method 4300 also includes, at operation 4308, performing the conversion based on the AMVP candidate list.

In some embodiments, the method includes rounding the AMVP candidate prior to comparing the AMVP candidate with the existing AMVP candidates. In some embodiments, the method includes rounding all candidates in the AMVP candidate list after adding the AMVP candidate to the list. In some embodiments, the method includes pruning all candidates in the AMVP candidate list to remove any duplicated entry.

FIG. 44 is a flowchart of an example method 4400 for video processing in accordance with the presently disclosed technology. The method 4400 includes, at operation 4402, performing, using a merge index, a conversion between a block of video data of a video and a bitstream representation of the video. The bitstream representation comprises the merge index indicative of a merge candidate for the conversion. The merge index is split into a first part and a second part. The first part is coded using a first binarization method, and the second part is coded using a second binarization method that is different from the first binarization method.

In some embodiments, the first binarization method is a unary binarization method. In some embodiments, the second binarization method is a fixed-length (FL) binarization method. Alternatively, the second binarization method can be a kth order Exp-Golomb (EGk) binarization method. In some embodiments, due to the merge index is greater than a pre-defined or signaled threshold, the merge index is split into the first part and the second part.

Figure 45:
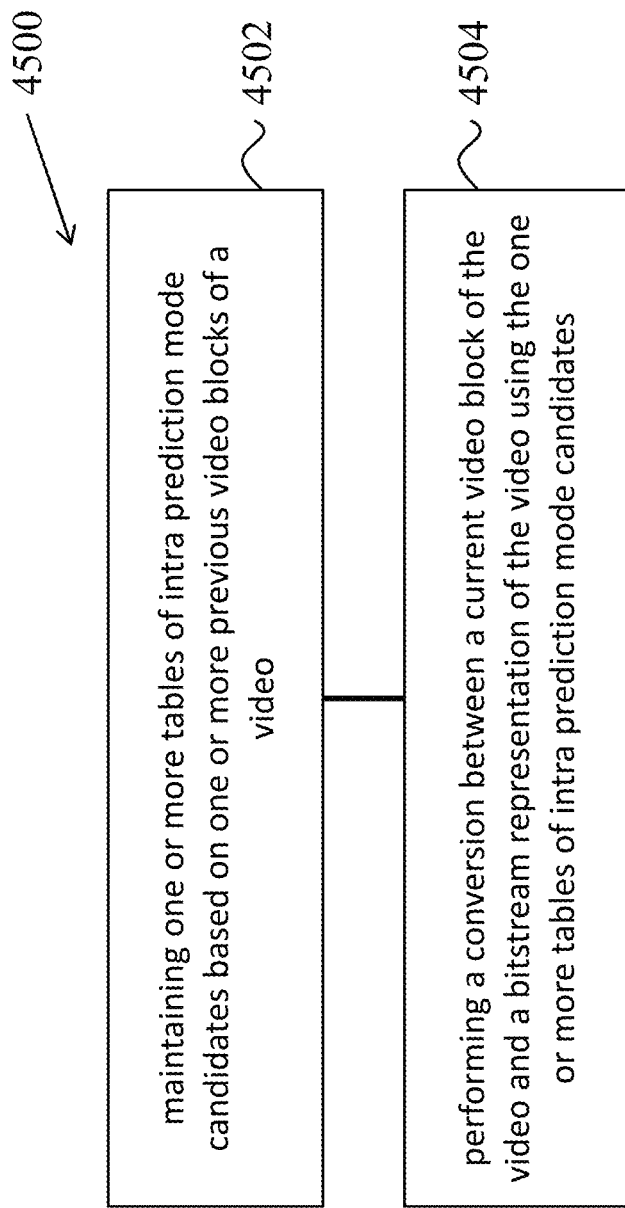
FIG. 45 shows another flowchart of an example method for video processing in accordance with the presently disclosed technology.

FIG. 45 is a flowchart of an example method 4500 for video processing in accordance with the presently disclosed technology. The method 4500 includes, at operation 4502, maintaining one or more tables of intra prediction mode candidates based on one or more previous video blocks of a video. The method 4500 includes, at operation 4504, performing a conversion between a current video block of the video and a bitstream representation of the video using the one or more tables of intra prediction mode candidates.

In some embodiments, a size of each table in the one or more tables of intra prediction mode candidates is identical. In some embodiments, the size of each table is equal to a total number of supported types of the intra prediction mode candidates.

In some embodiments, the method includes assigning a counter to each type of the intra prediction mode candidates. The counter indicates the number of times the corresponding type is used in previously coded blocks. In some embodiments, the method includes modifying the counter in case one of the one or more tables is updated with an intra prediction mode candidate of the corresponding type.

In some embodiments, the method includes updating the one or more tables of intra prediction mode candidates based on the current video block. In some embodiments, the method further includes performing a second conversion between a subsequent video block of the video and the bitstream representation of the video using the updated one or more tables of intra prediction mode candidates.

Figure 46:
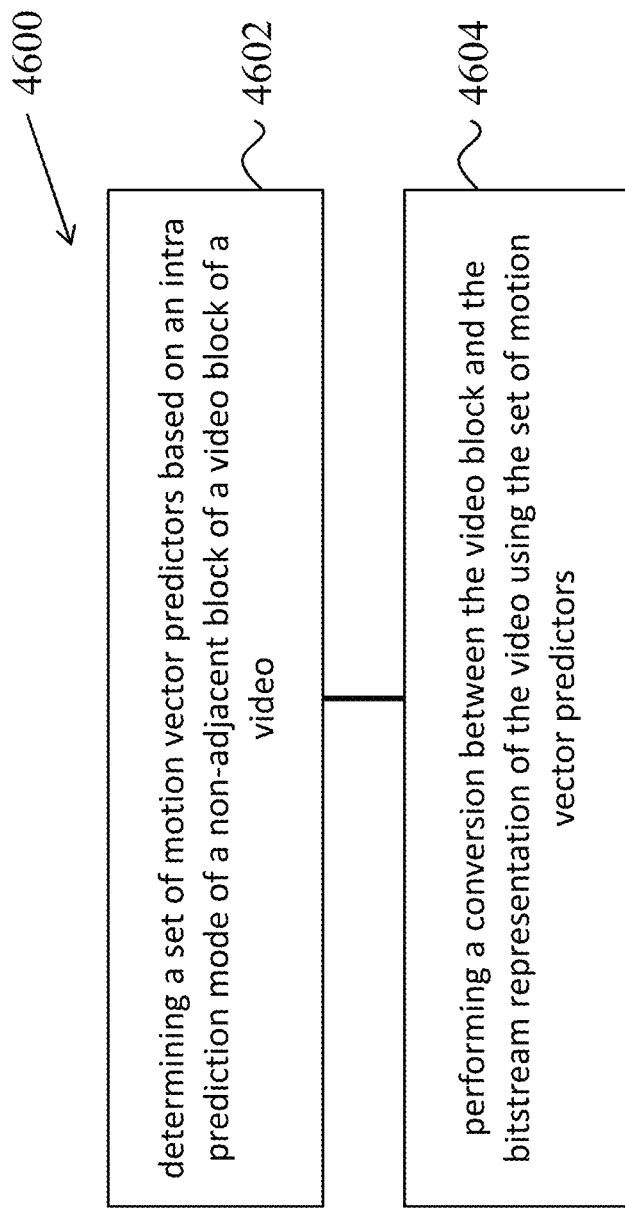
FIG. 46 shows another flowchart of an example method for video processing in accordance with the presently disclosed technology.

FIG. 46 is a flowchart of an example method 4600 for video processing in accordance with the presently disclosed technology. The method 4600 includes, at operation 4602, determining a set of intra prediction mode predictors based on an intra prediction mode of a non-adjacent block of a video block of a video. The method 4600 includes, at operation 4604, performing a conversion between the video block and the bitstream representation of the video using the set of intra prediction mode predictors.

In some embodiments, the above methods 4500 and 4600 include constructing a Most Probable Mode (MPM) list based on at least one of: the one or more tables of prediction mode candidates or the intra prediction mode of the non-adjacent block. In some embodiments, the method includes re-ordering non Most Probable Mode (MPM) intra prediction modes based on at least one of: the one or more tables of prediction mode candidates or the intra prediction mode of the non-adjacent block.

Figure 47:
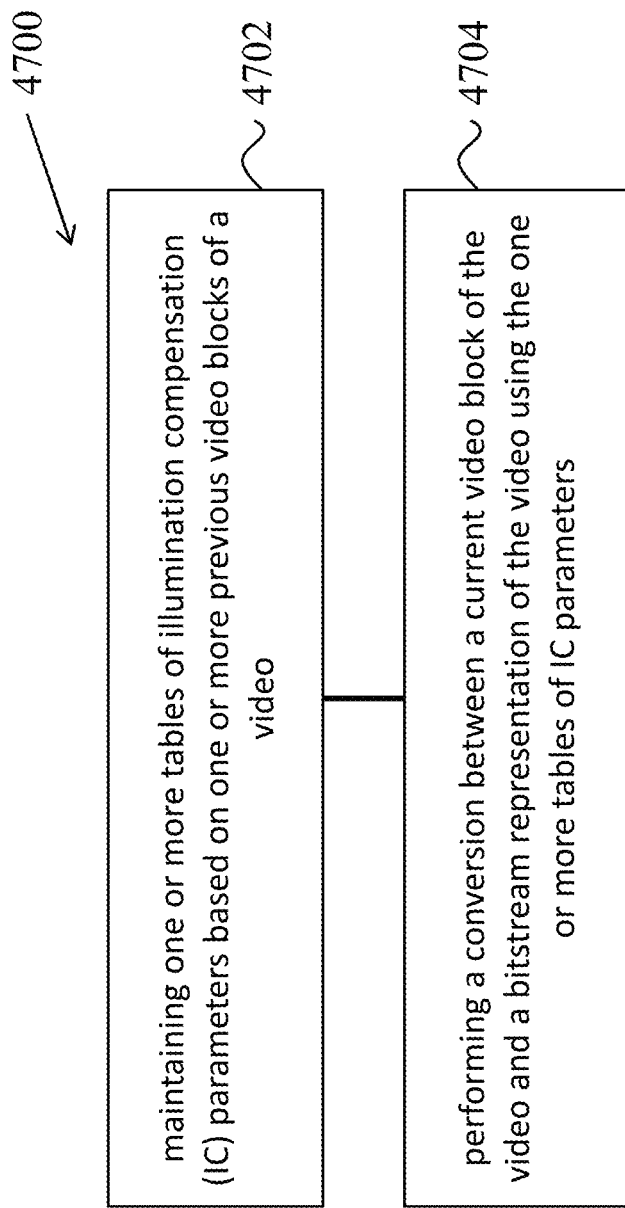
FIG. 47 shows another flowchart of an example method for video processing in accordance with the presently disclosed technology.

FIG. 47 is a flowchart of an example method 4700 for video processing in accordance with the presently disclosed technology. The method 4700 includes, at operation 4702, maintaining one or more tables of illumination compensation (IC) parameters based on one or more previous video blocks of a video. The method 4700 includes, at operation 4702, performing a conversion between a current video block of the video and a bitstream representation of the video using the one or more tables of IC parameters.

In some embodiments, the current video block is IC-coded. In some embodiments, the method includes initializing the one or more tables of IC parameters before performing a conversion of a coded region of video data. The coded region can include a picture, a slice, or a largest coding unit row.

In some embodiments, the method includes updating the one or more tables of IC parameters based on IC parameters of the current video block. In some embodiments, the method includes performing a second conversion between a subsequent video block of the video and the bitstream representation of the video using the updated one or more tables of IC parameters. The subsequent block of video data can be illumination compensation IC coded.

Figure 48:
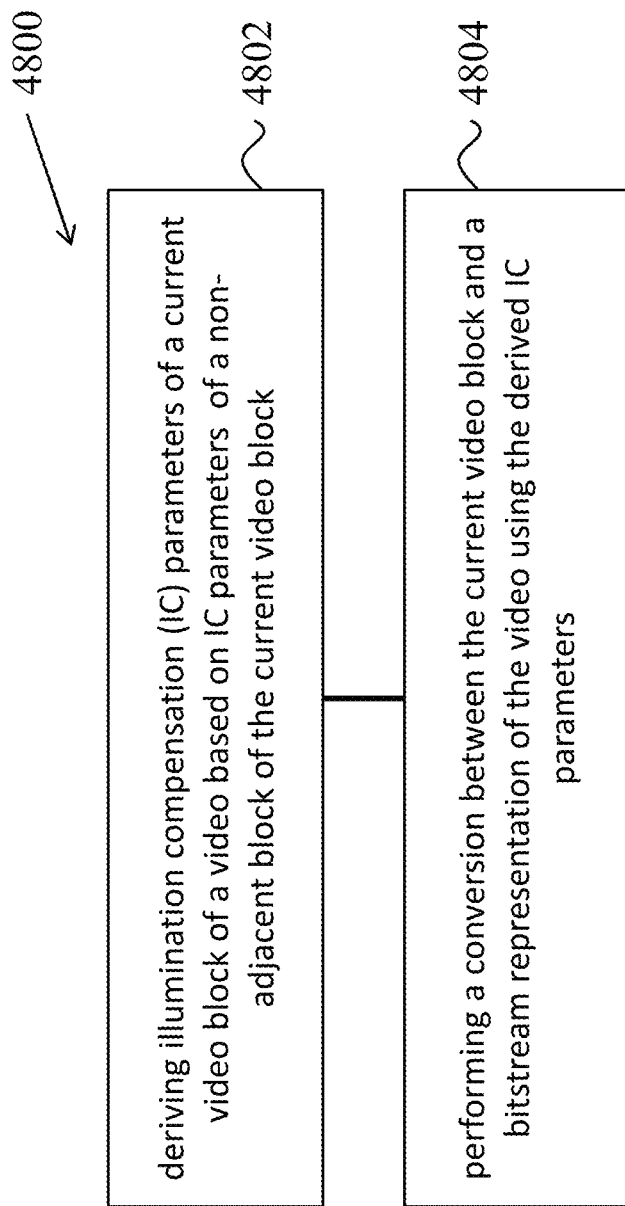
FIG. 48 shows yet another flowchart of an example method for video processing in accordance with the presently disclosed technology.

FIG. 48 is a flowchart of an example method 4800 for video processing in accordance with the presently disclosed technology. The method 4800 includes, at operation 4802, deriving illumination compensation (IC) parameters of a current video block of a video based on IC parameters of a non-adjacent block of the current video block. The method 4800 includes, at operation 4804, performing a conversion between the current video block and a bitstream representation of the video using the derived IC parameters.

In some embodiments, the above methods 4700 and 4800 include constructing a list of IC candidates wherein each IC candidate is associated with corresponding IC parameters. The IC candidate can be assigned an index. The index of an IC candidate can be signaled for a video block in the bitstream representation.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
   maintaining a motion vector prediction candidate list for a conversion between a video block of a video and a bitstream of the video, wherein the video block corresponds to a motion vector precision of M-Pel or sub-pel selected from multiple motion vector precisions, M being a positive integer; and
   performing the conversion based on the motion vector prediction candidate list,
   wherein the maintaining the motion vector prediction candidate list comprises:
      performing a rounding operation to a first motion vector prediction candidate associated with the video block based on the motion vector precision, wherein the first motion vector prediction candidate is derived from one of a spatial or a temporal neighboring block of the video block;
      comparing the rounded first motion vector prediction candidate against at least one existing candidate in the motion vector prediction candidate list;
      adding the rounded first motion vector prediction candidate to the motion vector prediction candidate list based on the comparing result; and
      selectively adding one or more second motion vector prediction candidates to the motion vector prediction candidate list, wherein the one or more second motion vector prediction candidates are acquired based on one or more tables of motion candidates, wherein the one or more tables comprise one or more motion candidates derived from one or more blocks previously converted, and wherein a motion candidate in the one or more tables is associated with motion information including at least one of: a prediction direction, a reference picture index, motion vector values, a filter parameter used in a filtering process,
      wherein the one or more second motion vector prediction candidate are added into the motion vector prediction candidate list in response to a current number of candidates in the motion vector prediction candidate list being smaller than a maximumly allowed number.

2. The method of claim 1, wherein the performing the conversion comprises:
   decoding the video block from the bitstream.

3. The method of claim 1, wherein the performing the conversion comprises:
   encoding the video block into the bitstream.

4. The method of claim 1, wherein the motion vector prediction candidate list is an Advanced Motion Vector Prediction (AMVP) candidate list.

5. The method of claim 1, wherein the maintaining further comprises:
   performing a rounding operation to the one or more second motion vector prediction candidates before the addition of the one or more second motion vector prediction candidates into the motion vector prediction candidate list.

6. The method of claim 1, wherein the maintaining further comprises:
   comparing the second motion vector prediction candidate with existing motion vector prediction candidates in the motion vector prediction candidate list; and
   adding the second motion vector prediction candidate to the motion vector prediction candidate list upon determining that the second motion vector prediction candidate is different than the existing motion vector prediction candidates.

7. The method of claim 1, wherein the motion candidate in the table is also associated with motion information including at least one of: an intensity compensation flag, an affine flag, a motion vector difference precision, or motion vector difference value.

8. The method of claim 1, further comprising:
   updating the one or more tables based on motion information of the video block derived based on the motion vector candidate list.

9. The method of claim 8, further comprising:
   performing a conversion between a subsequent video block of the video and the bitstream of the video based on the updated one or more tables.

10. The method of claim 1, wherein each motion vector prediction candidate in the motion vector prediction candidate list is rounded before being added into the candidate list.

11. An apparatus for processing video data comprising a processor and a non-transitory memory with instructions thereon, wherein the instructions upon execution by the processor, cause the processor to:
   maintain a motion vector prediction candidate list for a conversion between a video block of a video and a bitstream of the video, wherein the video block corresponds to a motion vector precision of M-Pel or sub-pel selected from multiple motion vector precisions, M being a positive integer; and
   perform the conversion based on the motion vector prediction candidate list,
   wherein the maintaining the motion vector prediction candidate list comprises:
      performing a rounding operation to a first motion vector prediction candidate associated with the video block, wherein the first motion vector prediction candidate is derived from one of a spatial or a temporal neighboring block of the video block;
      comparing the rounded first motion vector prediction candidate against at least one existing candidate in the motion vector prediction candidate list, adding the rounded first motion vector prediction candidate to the motion vector prediction candidate list based on the comparing result; and selectively adding one or more second motion vector prediction candidates to the motion vector prediction candidate list, wherein the one or more second motion vector prediction candidates are acquired based on one or more tables of motion candidates, wherein the one or more tables comprise one or more motion candidates derived from one or more blocks previously converted, and wherein a motion candidate in the one or more tables is associated with motion information including at least one of: a prediction direction, a reference picture index, motion vector values, a filter parameter used in a filtering process, wherein the one or more second motion vector prediction candidate are added into the motion vector prediction candidate list in response to a current number of candidates in the motion vector prediction candidate list being smaller than a maximumly allowed number.

12. The apparatus of claim 11, wherein the instructions upon execution by the processor, further cause the processor to:

perform a rounding operation to the one or more second motion vector prediction candidates before the addition of the one or more second motion vector prediction candidates into the motion vector prediction candidate list.

13. A non-transitory computer-readable storage medium storing instructions that cause a processor to:

maintain a motion vector prediction candidate list for a conversion between a video block of a video and a bitstream of the video, wherein the video block corresponds to a motion vector precision of M-Pel or sub-pel selected from multiple motion vector precisions, M being a positive integer; and perform the conversion based on the motion vector prediction candidate list, wherein the maintaining the motion vector prediction candidate list comprises:

performing a rounding operation to a first motion vector prediction candidate associated with the video block, wherein the first motion vector prediction candidate is derived from one of a spatial or a temporal neighboring block of the video block;

comparing the rounded first motion vector prediction candidate against at least one existing candidate in the motion vector prediction candidate list, adding the rounded first motion vector prediction candidate to the motion vector prediction candidate list based on the comparing result; and selectively adding one or more second motion vector prediction candidates to the motion vector prediction candidate list, wherein the one or more second motion vector prediction candidates are acquired based on one or more tables of motion candidates, wherein the one or more tables comprise one or more motion candidates derived from one or more blocks previously converted, and a motion candidate in the one or more tables is associated with motion information including at least one of: a prediction direction, a reference picture index, motion vector values, a filter parameter used in a filtering process, wherein the one or more second motion vector prediction candidate are added into the motion vector prediction candidate list in response to a current number of candidates in the motion vector prediction candidate list being smaller than a maximumly allowed number.

14. A non-transitory computer-readable recording medium storing a bitstream which is generated by a method performed by a video processing apparatus, wherein the method comprises:

maintaining a motion vector prediction candidate list for a conversion between a video block of a video and a bitstream of the video, wherein the video block corresponds to a motion vector precision of M-Pel or sub-pel selected from multiple motion vector precisions, M being a positive integer; and performing the conversion based on the motion vector prediction candidate list, wherein the maintaining the motion vector prediction candidate list comprises:

performing a rounding operation to a first motion vector prediction candidate associated with the video block, wherein the first motion vector prediction candidate is derived from one of a spatial or a temporal neighboring block of the video block;

comparing the rounded first motion vector prediction candidate against at least one existing candidate in the motion vector prediction candidate list, adding the rounded first motion vector prediction candidate to the motion vector prediction candidate list based on the comparing result; and selectively adding one or more second motion vector prediction candidates to the motion vector prediction candidate list, wherein the one or more second motion vector prediction candidates are acquired based on one or more tables of motion candidates, wherein the one or more tables comprise one or more motion candidates derived from one or more blocks previously converted, and wherein a motion candidate in the one or more tables is associated with motion information including at least one of: a prediction direction, a reference picture index, motion vector values, a filter parameter used in a filtering process, wherein the one or more second motion vector prediction candidate are added into the motion vector prediction candidate list in response to a current number of candidates in the motion vector prediction candidate list being smaller than a maximumly allowed number.

* * * * *